United States Patent
Matthews et al.

(10) Patent No.: US 12,485,716 B2
(45) Date of Patent: Dec. 2, 2025

(54) VEHICULAR SYSTEMS FOR RETRIEVAL, TRANSPORTATION, AND/OR DEPOSITION OF PAYLOADS AND METHODS THEREOF

(71) Applicant: Venturi Astrolab, Inc., Hawthorne, CA (US)

(72) Inventors: Jaret B. Matthews, El Segundo, CA (US); Russell D. Billing, Long Beach, CA (US); Andrew J. Welter, Los Angeles, CA (US); Craig Western, San Francisco, CA (US)

(73) Assignee: Venturi Astrolab, Inc., Hawthorne, CA (US)

( * ) Notice: Subject to any disclaimer, the term of this patent is extended or adjusted under 35 U.S.C. 154(b) by 760 days.

(21) Appl. No.: 17/650,237

(22) Filed: Feb. 7, 2022

(65) Prior Publication Data
US 2023/0249509 A1 Aug. 10, 2023

(51) Int. Cl.
*B60G 17/00* (2006.01)
*B62D 6/00* (2006.01)
(Continued)

(52) U.S. Cl.
CPC ............... *B60G 17/00* (2013.01); *B62D 6/00* (2013.01); *B62D 9/00* (2013.01); *B62D 61/00* (2013.01)

(58) Field of Classification Search
CPC . B60G 17/00; B62D 6/00; B62D 9/00; B62D 61/00; B25J 5/007; B25J 9/0084
See application file for complete search history.

(56) References Cited

U.S. PATENT DOCUMENTS

| | | | | |
|---|---|---|---|---|
| 4,932,491 A | * | 6/1990 | Collins, Jr. | ............ B62D 49/08 280/5.2 |
| 11,812,678 B2 | * | 11/2023 | Beaujot | ................ A01B 51/026 |

(Continued)

FOREIGN PATENT DOCUMENTS

| | | |
|---|---|---|
| CN | 111618848 A | 9/2020 |
| EP | 2698307 A2 | 2/2014 |

OTHER PUBLICATIONS

Machine translation of EP 2698307 (Wedler Feb. 19, 2014) from https://worldwide.espacenet.com/ (Year: 2014).*

(Continued)

*Primary Examiner* — Valentin Neacsu
*Assistant Examiner* — Michael R Stabley
(74) *Attorney, Agent, or Firm* — Stinson LLP

(57) ABSTRACT

Some embodiments of the disclosure are directed to vehicular retrieval, transportation, and/or deposition of payloads. In some embodiments, a vehicle is configured to identify and approach, via a plurality of propulsion components, a respective payload. In some embodiments, the vehicle is configured to adjust a height of a chassis of the vehicle, via the plurality of control legs, with respect to a reference to position interior portions of the chassis around a surface of the respective payload. In some embodiments, the vehicle is configured to engage with, via a latching system, the respective payload. In some embodiments, the vehicle is configured to transport the respective payload, via the plurality of propulsion components, to a respective target location. In some embodiments, the vehicle is configured to disengage from the respective payload, via the latching system, to deposit the respective payload at the respective target location.

24 Claims, 23 Drawing Sheets

(51) Int. Cl.
  *B62D 9/00* (2006.01)
  *B62D 61/00* (2006.01)

(56) References Cited

U.S. PATENT DOCUMENTS

| | | |
|---|---|---|
| 11,872,924 B2 * | 1/2024 | Beaujot ................ B60P 1/6481 |
| 2014/0342834 A1 | 11/2014 | Tappener |
| 2017/0227969 A1 | 8/2017 | Murray et al. |
| 2020/0031472 A1 | 1/2020 | Martens |
| 2021/0276642 A1 | 9/2021 | Gillett |
| 2021/0283783 A1 | 9/2021 | Gillett |
| 2022/0300011 A1 | 9/2022 | Chen et al. |
| 2023/0249601 A1 | 8/2023 | Matthews et al. |
| 2023/0251661 A1 | 8/2023 | Matthews et al. |

OTHER PUBLICATIONS

International Search Report received for PCT Patent Application No. PCT/US2023/062162, mailed on Aug. 21, 2023, 6 pages.
Non-Final Office Action received for U.S. Appl. No. 17/650,240, mailed on Mar. 11, 2024, 35 pages.
Harrison et al., "Next Generation Rover for Lunar Exploration", Big Sky, MT, USA, IEEE, Piscataway, NJ, USA, Mar. 1, 2008, pp. 1-14.
Non-Final Office Action received for U.S. Appl. No. 17/650,240, mailed on Apr. 17, 2025, 35 pages.
Final Office Action received for U.S. Appl. No. 17/650,240, mailed on Sep. 4, 2024, 38 pages.

* cited by examiner

# VEHICULAR SYSTEMS FOR RETRIEVAL, TRANSPORTATION, AND/OR DEPOSITION OF PAYLOADS AND METHODS THEREOF

FIELD OF THE DISCLOSURE

This disclosure relates generally to vehicles, such as on-road vehicles and off-road vehicles including rover systems for retrieval, transportation, and/or deposition of payloads, and more particularly, to providing vehicle and rover systems with improved terrain maneuverability and/or adaptability for the retrieval, transportation, and/or deposition of payloads.

BACKGROUND OF THE DISCLOSURE

Currently, there is a vacuum in the lunar economy. On the surface of the Moon, for example, there exist few solutions for transporting modular payloads, which may store supplies, tools, scientific samples, food, etc., from one location on the Moon's surface (e.g., a landing zone, a lunar lander, etc.) to another location on the Moon's surface (e.g., a lunar base or outpost, a stationary lunar rover vehicle, lunar lander, etc.). In addition to the transportation of modular payloads, few systems exist for the transportation and/or relocation of large payloads on the surface of the Moon, such as the relocation of lunar landers, which traditionally are incapable of being operated (e.g., driven) for relocation/transportation. Moreover, there is a need for these transportation solutions to be modularly configured for the ease and efficiency of initial deposition on the surface of the Moon (or other planetary body).

SUMMARY

This summary is provided to introduce a selection of concepts in a simplified form that are further described below in the Detailed Disclosure. This summary is not intended to identify key features of the claimed subject matter, nor is it intended to be used as an aid in determining the scope of the claimed subject matter.

Some embodiments of the disclosure are directed to a rover. In some embodiments, the rover comprises a chassis, a plurality of control legs coupled to the chassis, and a plurality of propulsion components coupled to the plurality of control legs. In some embodiments, the rover further comprises one or more processors. In some embodiments, the plurality of control legs each includes a suspension system in communication with the one or more processors, wherein the suspension system is controllable by the one or more processors to cause the plurality of control legs to selectively raise and/or lower the chassis with respect to a reference (e.g., a surface on which the rover is placed, gravity, etc.). In some embodiments, the plurality of propulsion components each includes a motor assembly in communication with the one or more processors, wherein the motor assembly is controllable by the one or more processors to drive the plurality of propulsion components and selectively cause a motion of the rover. In some embodiments, the rover further comprises a latching system provided within interior portions of the chassis, wherein the latching system is configured to interlock with a payload.

Some embodiments of the disclosure are directed to the retrieval, transportation, and/or deposition of payloads. In some embodiments, the rover is configured to identify and approach, via the plurality of propulsion components, a respective payload. In some embodiments, the rover is configured to adjust a height of the chassis, via the plurality of control legs, with respect to the reference to position the interior portions of the chassis around a surface of the respective payload. In some embodiments, the rover is configured to engage with, via the latching system, at least a portion of the respective payload. In some embodiments, the rover is configured to adjust the height of the chassis, via the plurality of control legs, with respect to the reference to maintain the respective payload at one or more respective orientations with respect to the reference. In some embodiments, the rover is configured to transport the respective payload, via the plurality of propulsion components, to a respective target location. In some embodiments, at the respective target location, the rover is configured to adjust the height of the chassis, via the plurality of control legs, with respect to a reference and disengage from the portion of the respective payload, via the latching system, to deposit the respective payload at the respective target location.

Some embodiments of the disclosure are directed to multi-rover collaboration. In some embodiments, a first rover is in communication with a second rover. In some embodiments, one or more processors of the first rover are configured to communicate with one or more processors of the second rover to perform a joint action. In some embodiments, the one or more processors of the first rover are configured to selectively control components of the suspension system, the motor assembly, and/or the latch system of the first rover to perform a first part of the joint action. In some embodiments, the one or more processors of the second rover are configured to selectively control components of the suspension system, the motor assembly, and/or the latch system of the second rover to perform a second part of the joint action.

Some embodiments of the disclosure are directed to latching interfaces of a rover. In some embodiments, the rover comprises a latch system including a plurality of latches configured to selectively interlock with a corresponding first plurality of latch receptacles of a respective payload for the retrieval, transportation, and/or deposition of the respective payload by the rover. In some embodiments, the rover comprises a second plurality of latch receptacles disposed on exterior portions of the chassis of the rover. In some embodiments, the second plurality of latch receptacles correspond to the first plurality of latch receptacles. In some embodiments, a spatial arrangement of the second plurality of latch receptacles on the exterior portions of the chassis of the rover corresponds to a spatial arrangement of the first plurality of latch receptacles on exterior portions of the respective payload. In some embodiments, the second plurality of latch receptacles of the rover are configured to interlock with a latching interface of an external system for the retrieval, transportation, and/or deposition of the rover by the external system.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawings are not necessarily drawn to scale and certain may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings.

DETAILED DESCRIPTION

In the following description, reference is made to the accompanying drawings which form a part hereof, and in which it is shown by way of illustration specific examples that may be practiced. It is to be understood that other examples may be used and structural changes may be made without departing from the scope of the examples of the disclosure.

Generally described, the present systems and methods thereof provide one or more vehicles or rovers for the retrieval, transportation, and/or deposition of payloads. A rover (e.g., a lunar rover) operating on the surface of the Moon or other planetary body may be configured to (e.g., autonomously) locate a respective payload, retrieve (e.g., lift) the respective payload, and transport the respective payload to a respective destination on the surface of the Moon. The rover may be provided with a plurality of subsystems including intercommunicated and/or intercoupled components that enable the rover to perform such actions. The rover may be further configured to adapt to unevenness in terrain (e.g., unevenness in the surface of the Moon) during transportation of the respective payload. In instances where retrieval, transportation, and/or deposition of large payloads are required, the rover may be configured to function in tandem with one or more additional rovers of the same or similar build to coordinate large-scale retrievals, transportation, and/or deposition of the large payloads. The rover may be configured for adaptive utility, ranging from operation of a functional module to doubling as a rover vehicle. The rover may be configured for ease of transition between multiple modes of transport (e.g., initial deposition on the surface of the Moon and subsequent retrieval from the surface of the Moon). Such rovers and associated processes will be described below.

As used herein, the term "rover" refers to a robotic device or a robotic vehicle configured to move across and/or explore a (e.g., planetary) surface. The rover may be a partially or fully autonomous robotic vehicle. As a robotic vehicle, the rover may be configured to transport members of a human spaceflight crew. The rover may be comprised of hardware-based systems including electrical components in communication with one or more (e.g., internal and/or external) central processing units. Although various embodiments are described herein with reference to a rover, it should be understood that the features and/or descriptions of such embodiments are optionally applicable to an on-road and/or off-road vehicle, more generally.

Figure 1A:
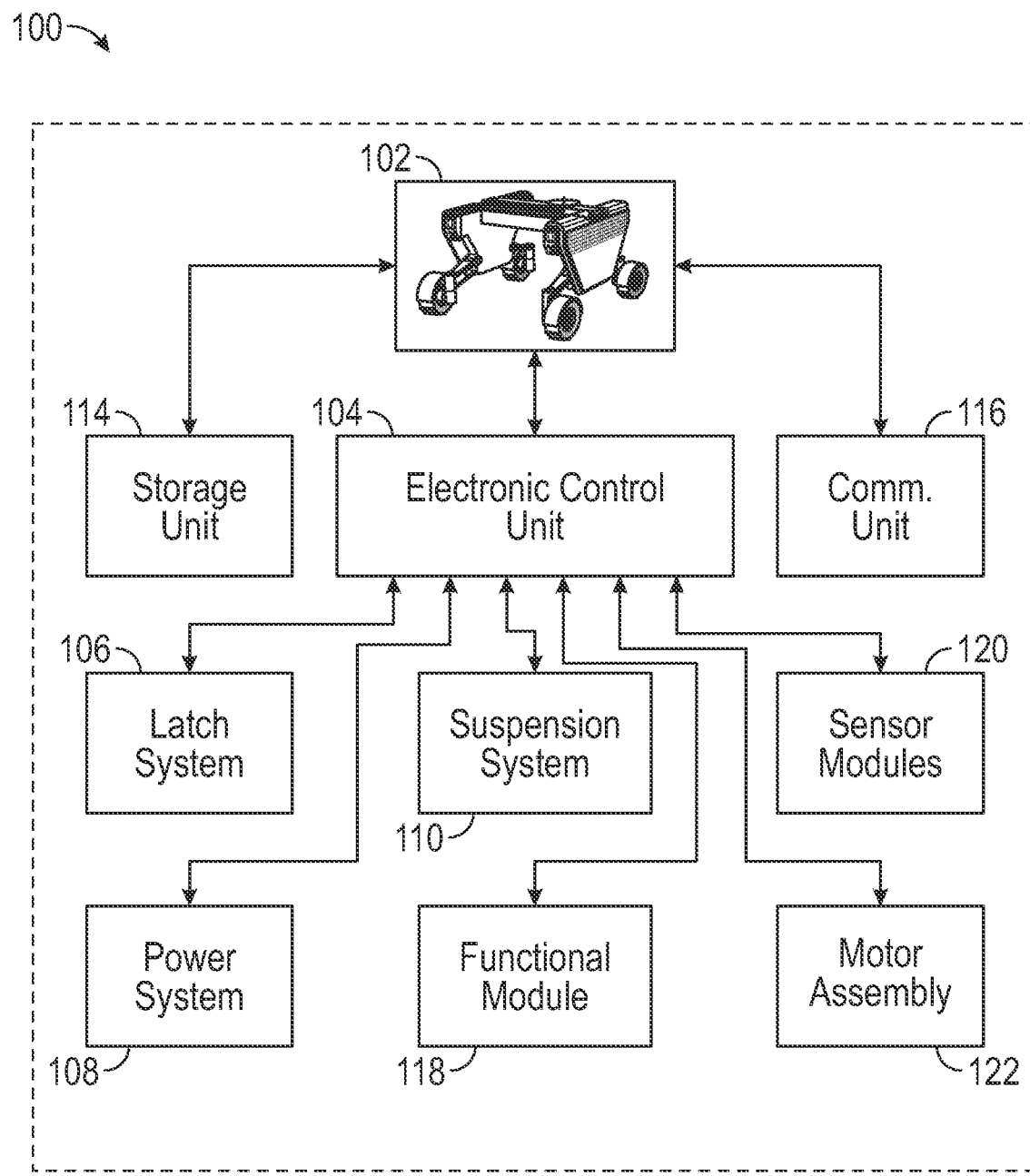
FIGS. 1A-1B are schematic views of exemplary systems for implementing rovers according to some embodiments of the disclosure.
Figure 1B:
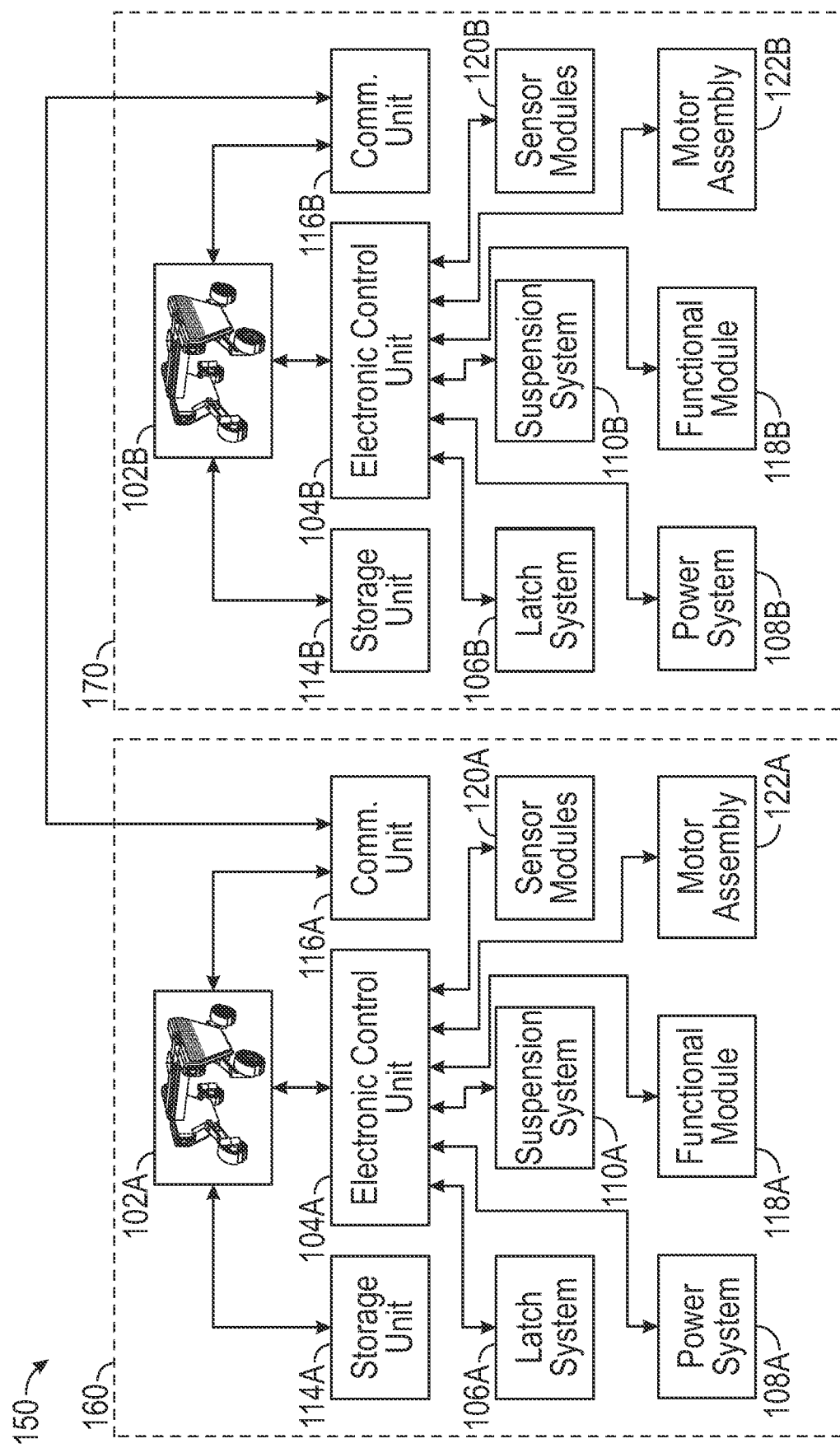

FIGS. 1A-1B are schematic views of exemplary systems for implementing rovers according to some embodiments of the disclosure. The components of the systems 100 and/or 150, as well as the components of other systems, hardware architectures, and software architectures discussed herein, may be combined, omitted, or organized into different architectures for various examples.

Generally, in FIG. 1A, the system 100 may include a vehicle/rover 102 with an electronic control unit (ECU) 104 that executes one or more applications, operating systems, rover systems and subsystem executable instructions, among others. In some embodiments, the ECU 104 may include one or more respective microprocessors, one or more application-specific integrated circuit(s) (ASIC), or other similar devices. The ECU 104 may also include respective internal processing memory, an interface circuit, and bus lines for transferring data, sending commands, and communicating with the plurality of components of the rover 102. The ECU 104 may also include a respective communication device (not shown) for sending data internally to components of the rover 102. In some embodiments, the ECU may be configured to communicate with communications unit 116 for communicating with externally hosted computing systems (e.g., external to the rover 102).

In an exemplary embodiment, the ECU 104 may additionally communicate with a storage unit 114 (e.g., memory, such as a computer-readable storage medium that stores instructions for the various functions or applications implemented by the system 100) to execute one or more applications, operating systems, rover systems and subsystem executable instructions, and the like that are stored on the storage unit 114. In one or more embodiments, the storage unit 114 may be accessed by the rover systems and subsystems to store data, for example, one or more images, graph-based representations, or otherwise, of a surrounding environment of the rover 102, one or more sets of locational coordinates (e.g., GPS/DGPS coordinates), and/or rover dynamic data associated with dynamic rover parameters of the rover 102.

In some embodiments, the ECU 104 may be configured to communicate with the rover latch/retrieval system 106 of the rover 102 to operate the rover 102 to (e.g., autonomously)

control one or more retrieval functions of the rover 102. The one or more retrieval functions of the rover may include, but are not limited to, engaging with a respective payload to lift the respective payload for subsequent transportation of the respective payload, and disengaging with the respective payload to deposit the respective payload. In some embodiments, the ECU 104 may be configured to communicate with power system 108 of the rover 102 to supply power to the rover 102. In some embodiments, the power system 108 includes battery modules electrically coupled to power distribution and charging circuitry for supplying power to the systems of the rover 102, such as the ECU 104, the communications unit 116, and the like.

In some embodiments, the ECU 104 may be configured to communicate with the rover suspension system 110 to operate the rover 102 to control one or more suspension functions of the rover 102. The one or more suspension functions may include, but are not limited to, raising and/or lowering the rover 102 with respect to a reference (e.g., a surface on which the rover 202 is configured to be placed or operate (e.g., the surface of a moon)), and adapting to one or more portions of unevenness during transportation of a respective payload. In some embodiments, the ECU 104 may be configured to communicate with the rover motor assembly 122 to operate the rover 102 to control one or more driving functions of the rover 102. The one or more driving functions may include, but are not limited to, steering, braking, accelerating, turning, and the like.

In some embodiments, the ECU 104 may be configured to selectively communicate with one or more subsystems of a rover functional module 118 that may be selectively interfaced with the rover 102. For example, when a respective functional module 118 is interfaced with the rover 102, the ECU 104 may communicate with one or more subsystems of the respective functional module 118 to electrically and communicatively interface the rover to the respective functional module 118 to enable one or more specialized functions. The one or more specialized functions may include manual operation of the rover 102 (e.g., as a rover vehicle), and operation of the rover 102 as a scientific rover (e.g., for the collection of data samples).

In some embodiments, the ECU 104 may additionally be configured to operably control one or more sensor modules 120 of the rover 102. The one or more sensor modules 120 may include one or more sensors (not shown), such as cameras, proximity sensors, ultraviolet light sensors, audio sensors, and the like, that are positioned at one or more positions on or in the rover 102 to capture information (e.g., images, light intensities, sound waves, etc.) of at least the external surrounding environment of the rover 102 (e.g., a predetermined area located around (such as front/side/behind/below) the rover 102).

In particular, the one or more sensors that are positioned in or on the rover 102 may be configured to capture data about (e.g., images of) payloads, rovers, surface integrity (e.g., integrity of the lunar terrain), users (e.g., astronauts), or more generally any agents or structures in an environment of the rover 102 to be analyzed by the ECU 104. In some embodiments, the one or more sensors may be configured to capture data of the above and transmit respective image/sound/light/motion/etc. data to the ECU 104. The ECU 104 may be configured to process the transmitted data to recognize locations, actions, existences, etc. of one or more agents/structures in an environment of the rover 102. The ECU 104 may be configured to, using the processed data, selectively (e.g., and autonomously) control the various systems described above (e.g., latch system 106, suspension system 110, motor assembly 122, etc.) to operate the rover 102 to perform various actions, including retrieving, transporting, and depositing modular payloads, as will be described later.

In some embodiments, as illustrated in FIG. 1B, system 150 can be divided between multiple rover systems. For example, a first rover system 160 optionally includes a rover 102a, storage unit 114a, communications unit 116a, latch system 106a, power system 108a, suspension system 110a, a functional module 118a, sensor modules 120a, and motor assembly 122a, optionally communicating over ECU 104a. A second rover system 170 optionally includes a rover 102b, storage unit 114b, communications unit 116b, latch system 106b, power system 108b, suspension system 110b, a functional module 118b, sensor modules 120b, and motor assembly 122b, optionally communicating over ECU 104b. The details of the components for rover systems 150 and 170 are similar to the corresponding components discussed above with respect to system 100 and are not repeated here for brevity. The first rover system 160 and the second rover system 170 optionally communicate via a wired or wireless connection (e.g., via communications unit 116a-116b) between the two systems. It should be understood that, in embodiments in which the system 150 includes additional rovers (e.g., one, two, three, four, etc. additional rovers), the additional rovers may be configured to communicate in a similar manner (e.g., communicatively interfaced via the communications unit of each respective rover).

Figure 2A:
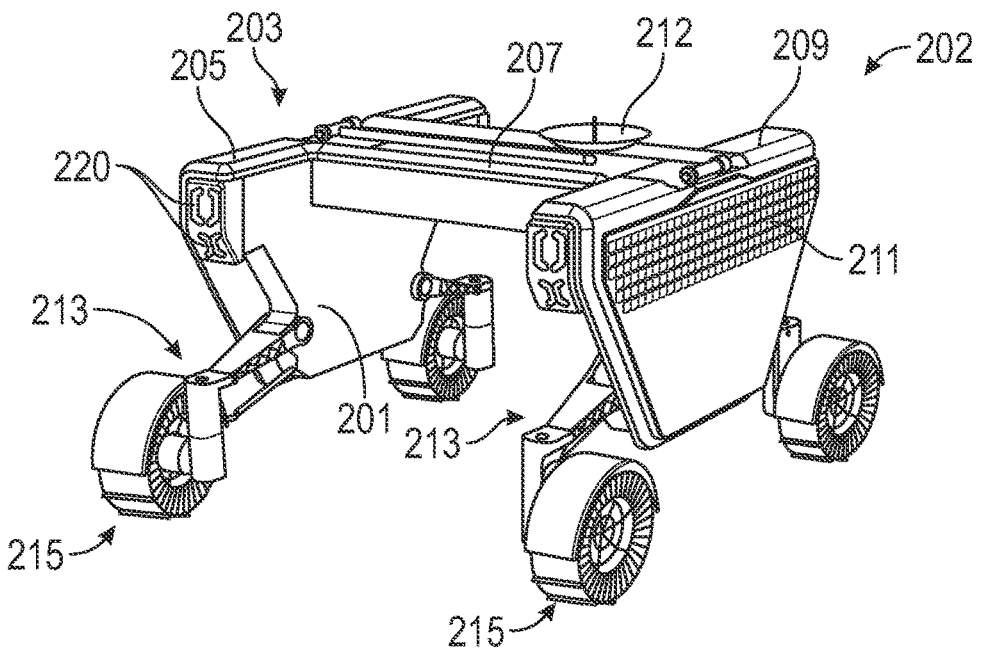
FIGS. 2A-2B illustrate a perspective view and a partially sectional perspective view, respectively, of an example rover according to some embodiments of the disclosure.
Figure 2B:
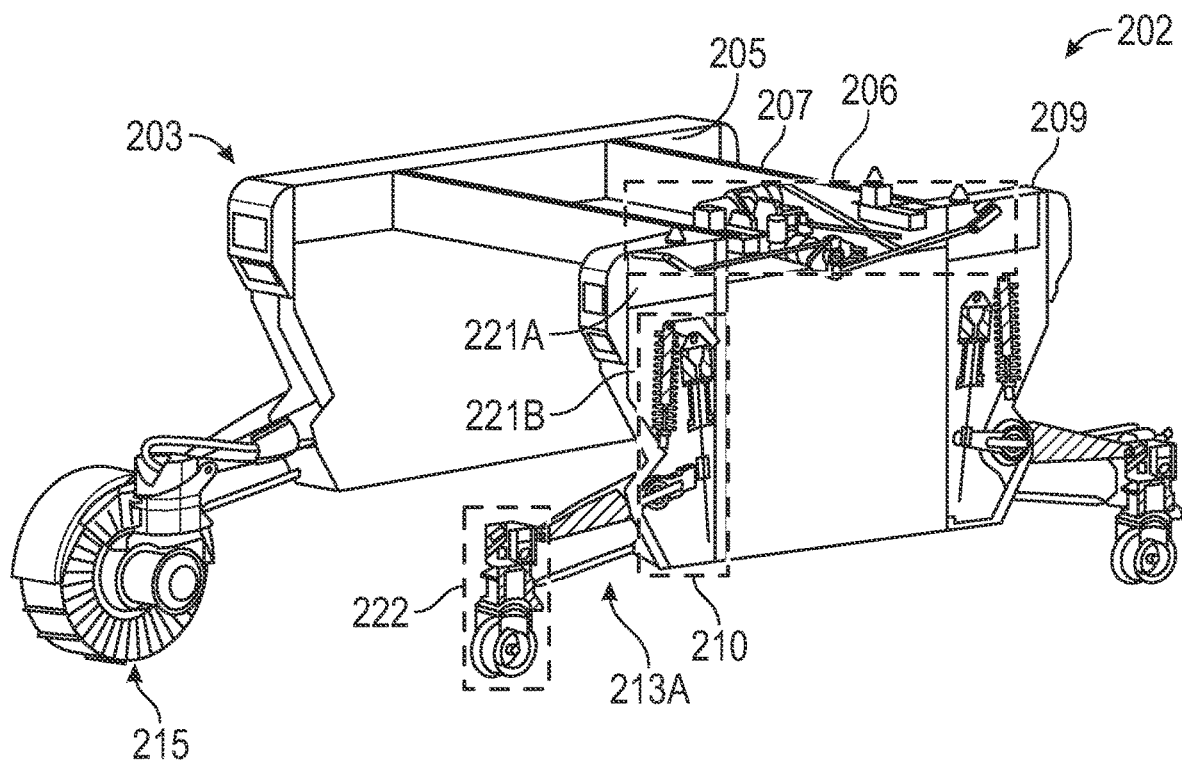

FIGS. 2A-2B illustrate a perspective view and a partially sectional perspective view, respectively, of an example rover 202 according to some embodiments of the disclosure. As discussed herein later, the rover 202 may be characterized by adaptive utility enabled by the various subsystems of the rover 202, which are optionally, extensively contained within a central body cavity of the rover 202. As shown in FIG. 2A, the rover 202 may comprise a chassis 203 forming the central body of the rover 202. In some embodiments, the chassis 203 may comprise a first side (e.g., left side in the view of FIG. 2A) 205, a second side (e.g., right side in the view of FIG. 2B) 209, and a medial member 207 joining top portions of the first side 205 and the second side 209. For example, from a top view, the chassis 203 may have an "H" shape formed by the first side 205, the second side 209, and the medial member 207. As shown in FIG. 2A, in some embodiments, the chassis 203 of the rover 202 includes an interior 201 (e.g., formed by the interior surfaces of the first side 205, the second side 209, and the medial member 207) configured to at least partially surround a respective modular payload, as discussed in more detail later.

In some embodiments, the rover 202 may comprise a plurality of control legs 213 coupled to the chassis 203. For example, as shown in FIG. 2A, a first pair of control legs are coupled to the first side 205 of the chassis 203, and a second pair of control legs 213 are coupled to the second side 209 of the chassis 203. As discussed in more detail with reference to FIGS. 3A-3C, the plurality of control legs each optionally comprise the same or similar exemplary components. For example, as discussed in detail later, the plurality of control legs 213 may each comprise a suspension system (e.g., corresponding to suspension system 110 in FIGS. 1A-1B) configured to be controlled (e.g., by ECU 104 in FIGS. 1A-1B) to selectively raise and/or lower the plurality of control legs 213, to thus raise and/or lower the chassis 203 with respect to the reference (e.g., the lunar surface).

In some embodiments, the rover 202 may comprise a plurality of propulsion components (e.g., wheels) 215 coupled to the plurality of control legs 213. For example, as shown in FIG. 2A, a first pair of propulsion components are coupled to the first pair of control legs on the first side 205 of the chassis 203, and a second pair of propulsion components are coupled to the second pair of control legs on the second side 209 of the chassis 203. In some embodiments, the plurality of propulsion components 215 are each configured to be driven by a motor assembly (e.g., corresponding to motor assembly 122 in FIGS. 1A-1B) associated with a given control leg 213 coupled to the propulsion component 215. In some embodiments, as discussed in more detail later, the plurality of propulsion components 215 may each be selectively driven by a corresponding motor assembly to cause movement of the rover 202 in a respective direction. While the plurality of propulsion components 215 are illustrated in FIG. 2A as being wheels, it should be understood that, in some embodiments, alternative types of propulsion components may be provided, such as tracks, sleds, travois, spheres, and the like.

In some embodiments, the rover 202 may further comprise one or more sensors 220 (e.g., corresponding to the sensor modules 120 in FIGS. 1A-1B). As shown in FIG. 2A, the one or more sensors 220 may be disposed at one or more external front and/or rear portions of the rover 202 to capture the external surrounding environment of the rover 202. For example, the one or more sensors 220 may be disposed at external front and/or rear portions of the rover 202, including, but not limited to frontal and/or rear portions of the first side 205 of the chassis 203, and/or frontal and/or rear portions of the second side 209 of the chassis 203. In some embodiments, the one or more sensors 220 may include RGB cameras that may capture RGB bands that are configured to capture rich information about object appearance, as well as relationships and interactions between the rover 202 and objects (e.g., modular payloads, craters, rocks, other rovers, etc.) within the surrounding environment of the rover 202. As discussed previously with respect to FIGS. 1A-1B, the sensory information captured by the one or more sensors 220 may be converted into data by the ECU 104 for use in the operations of the rover 202.

In some embodiments, the rover 202 may include one or more deployable exterior components for use by various systems of the rover 202. For example, as shown in FIG. 2A, the rover 202 may comprise a deployable solar panel array 211 for use by the rover power system (e.g., corresponding to power system 108 in FIGS. 1A-1B) in charging one or more battery modules of the rover 202. As another example, the rover 202 may comprise a deployable high-gain antenna 212 for use by the rover communications unit (e.g., corresponding to communications unit 116 in FIGS. 1A-1B) in communications with externally hosted computing systems and/or command centers.

As mentioned above, the chassis may house a plurality of various components that form the systems and subsystems of the rover 202. In highly concentrated environments (e.g., like a moon), dust, dirt, soil, and other substance mitigation can be vital for the effective and long-lasting performance of the rover 202. Accordingly, as discussed below, the major systems of the rover 202, such as the suspension system, the motor assembly, the latching system, and the ECU may be disposed within portions of the chassis 203.

FIG. 2B illustrates example systems contained within a side (e.g., the second side 209) and a portion of the medial member 207 of the chassis 203. It should be understood that the components illustrated in FIG. 2B and described herein with respect to the second side 209 also optionally apply to those components of the first side 205. As shown in FIG. 2B, a given side of the chassis 203, such as the second side 209, may include internal compartments/portions for housing the various components of the rover 202. For example, for a respective control leg, a portion of the respective control leg is integral to the side of the chassis 203 to which the respective control leg is coupled (e.g., is contained within a cavity formed by the side of the chassis 203 to which the respective control leg is coupled). For the control leg 213a coupled to side 209 of chassis 203, a portion of the control leg 213a includes a first lower compartment 221B of the second side 209 of the chassis 203. In some embodiments, the suspension system 210 of a respective control leg (e.g., control leg 213a) may be disposed within a lower compartment (e.g., lower compartment 221B) of the cavity of the side of the chassis 203 to which the respective control leg is coupled (e.g., the second side 209), as shown. The suspension system 210 will be described in more detail with reference to FIGS. 3A-3C, below.

In some embodiments, as shown in FIG. 2B, the rover latching system 206 may be disposed within the cavity of the medial member 207 of the chassis 203. In some embodiments, components of the latching system 206 may additionally or alternatively be disposed within upper compartments of a given side of the chassis 203. For example, as shown in FIG. 2B, some components of the latching system 206 are disposed within a first upper compartment of the cavity of the second side 209 of the chassis 203. The latching system 206 will be described in more detail with reference to FIGS. 5A-5H, below.

As mentioned above, each propulsion component of the plurality of propulsion components 215 of the rover 202 may be configured to be driven by a motor assembly 222 associated with a given control leg coupled to the propulsion component. As discussed in more detail below, the motor assembly 222 optionally includes a steering actuator and a wheel actuator each configured to produce a respective propulsion-producing movement of the propulsion component.

Figure 3A:
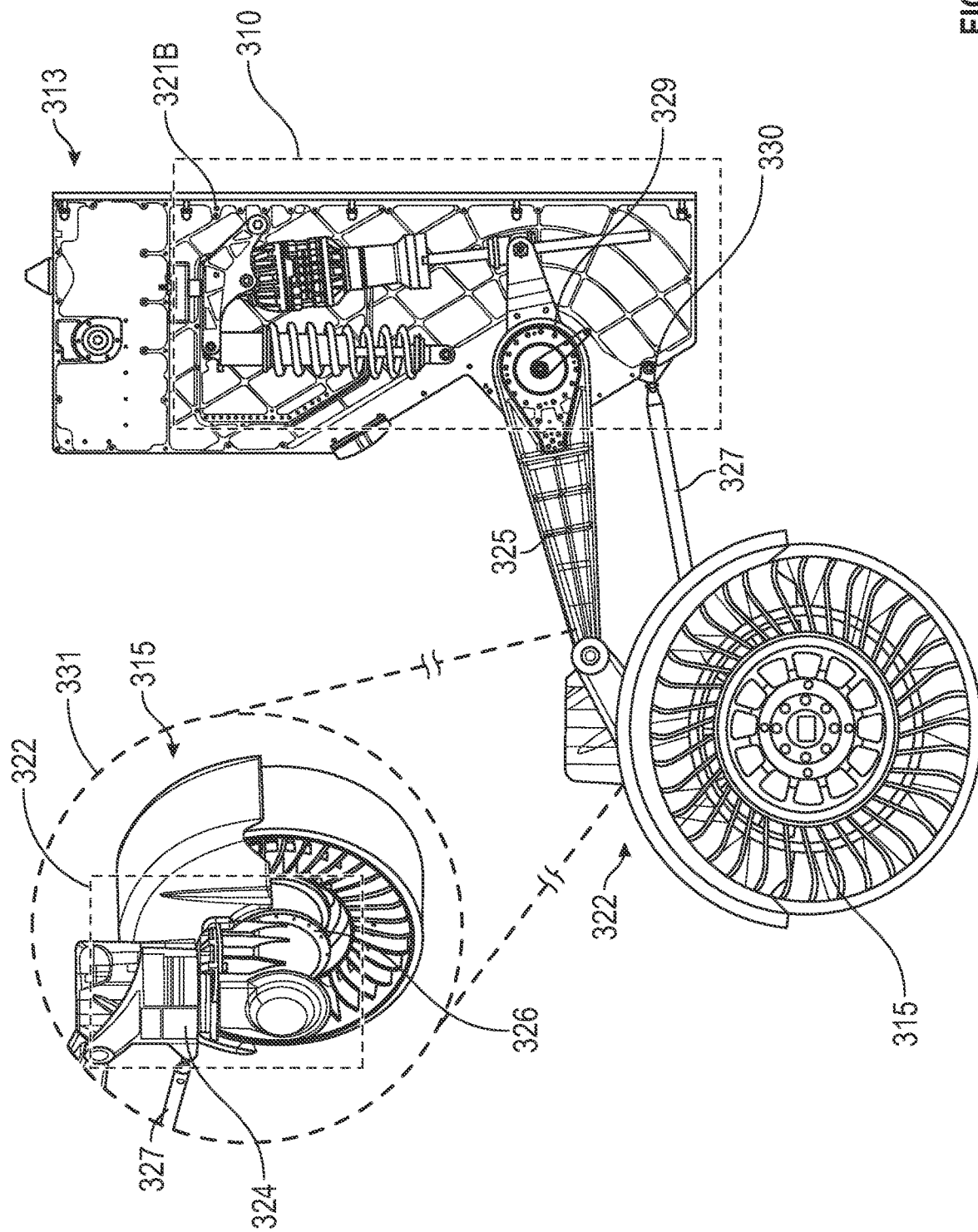
FIGS. 3A-3C illustrate examples of a suspension system and a motor assembly of a rover according to some embodiments of the disclosure.
Figure 3B:
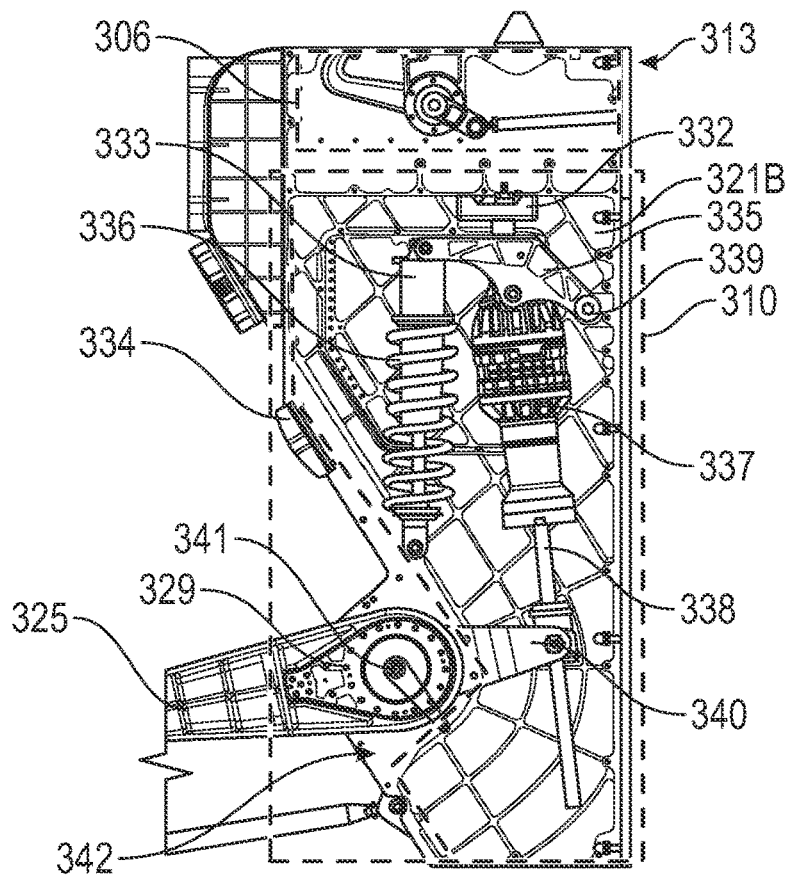
Figure 3C:
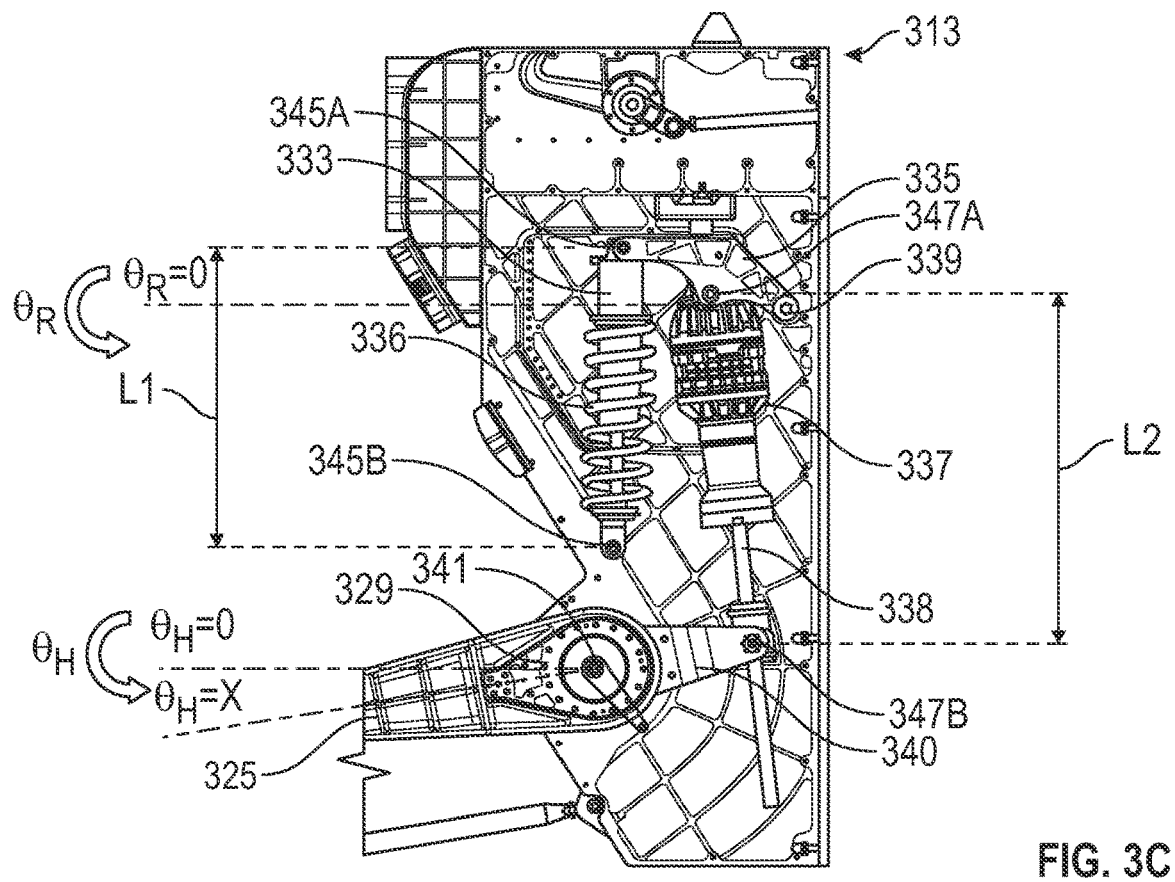

FIGS. 3A-3C illustrate examples of a suspension system 310 and a motor assembly 322 of a rover according to some embodiments of the disclosure. In some examples, suspension system 310 optionally corresponds to suspension system 210, and motor assembly 322 optionally corresponds to motor assembly 222, shown in FIG. 2B. As described above with reference to FIGS. 2A-2B, the suspension system 310 of a given control leg 313 may be disposed within a portion of the chassis 203, such as within lower compartment 321B, as shown in FIG. 3A. As discussed below, the suspension system 310 and the motor assembly 322 may be controllable to selectively operate movement, maneuverability, and adaptability functions of the rover. It should be understood that the below descriptions of the various suspension system and motor assembly components of the control leg 313 shown in FIGS. 3A-3C optionally apply for each control leg of the plurality of control legs (e.g., the plurality of control legs 213).

As shown in FIG. 3A, the suspension system 310 of the control leg 313 may comprise a first coupling 329 and a second coupling 330 disposed within the lower compartment 321B of the control leg 313. In some embodiments, the control leg 313 may comprise an upper four-bar link 325 coupled to the first coupling 329. Additionally, in some embodiments, the control leg 313 may comprise a lower four-bar link 327 coupled to the second coupling 330, as shown in FIG. 3A. In some embodiments, the first coupling 329 optionally couples the upper four-bar link 325 to the suspension system 310, which, as discussed in more detail below, is configured to cause a movement of the upper four-bar link 325 or respond to (e.g., absorb or deflect) a movement by the upper four-bar link 325. For example, the upper four-bar link 325 may be configured to be raised or lowered (e.g., with respect to the surface on which the rover is placed) in response to upward or downward movements of the propulsion component 315 or in response to operations of the suspension system 310, as discussed herein later. In some embodiments, the second coupling 329 optionally provides provision for rotational movement of the lower four-bar link 327. For example, the lower four-bar link 327 may be configured to rotate bidirectionally (e.g., clockwise or counterclockwise) in response to upward or downward movements of the propulsion component 315 or in response to upward or downward movements of the upper four-bar link 327. For example, in some instances, an upward (e.g., with respect to the surface on which the rover is placed) motion of the propulsion component optionally causes the upper four-bar link 325 and the lower four-bar link 327 to move upwardly in accordance with the upward motion of the propulsion component 315. Similarly, a downward motion of the propulsion component optionally causes the upper four-bar link 325 and the lower four-bar link 327 to move downwardly in accordance with the downward motion of the propulsion component 315.

As mentioned above, the control leg 313 may be associated with the motor assembly 322. In some embodiments, the motor assembly 322 may be coupled between the upper four-bar link 325 and the lower four-bar link 327 and the propulsion component 315. As shown in the perspective view 331 in FIG. 3A, the motor assembly 322 optionally comprises a steering actuator 324 and a wheel actuator 326. As shown, the upper four-bar link 325 of the control leg 313 may be associated with (e.g., coupled to) the steering actuator 324, and the lower-four bar link 327 may be associated with (e.g., coupled to) the wheel actuator 326. In some embodiments, the steering actuator 324 is optionally configured to cause a first propulsion-producing movement of the propulsion component 315 coupled to the control leg 313 associated with the steering actuator 324. For example, the steering actuator 324 is configured to cause the propulsion component 315 to revolve/spin (e.g., a yaw rotational motion about a vertical axis through a center of the propulsion component) to steer the propulsion component 315 (e.g., cause the wheel to turn left or right). In some embodiments, the wheel actuator 326 is configured to cause a second propulsion-producing movement of the propulsion component 315 coupled to the control leg 313 associated with the wheel actuator 326. For example, the wheel actuator 326 is configured to cause the propulsion component to rotate (e.g., a pitch rotational motion about an axis perpendicular to the a center of the propulsion component) to drive the propulsion component 315 (e.g., cause the wheel to accelerate, decelerate, coast, etc.).

As discussed herein, the suspension system 310 of the control leg 313 may enable the control leg 313 to be selectively raised and/or lowered with respect to the chassis of the rover and/or the surface on which the rover is operating. As shown in FIG. 3B, the suspension system 310 may comprise a rocker arm 335 disposed within the lower compartment 321B of the chassis portion of control leg 313. As shown, in some embodiments, a first portion of the rocker arm 335 may be coupled to a rocker shaft 333, which optionally includes a spring 336. In some embodiments, the spring 336 may have a predefined rate or spring constant chosen for resisting a change in orientation of the rocker arm 335, which will be discussed in more detail later. In some embodiments, the rocker arm 335 may comprise a rocker angular encoder (e.g., resolver) 339, as shown in FIG. 3B. In some embodiments, a second portion of the rocker arm 335 may be coupled to a linear actuator 337, which optionally includes a commutator angular encoder (e.g., resolver) (not shown). As shown in FIG. 3B, in some embodiments, the linear actuator 337 may also include a pin/rod 338 extending a length between a first portion of the linear actuator 337 and a second portion of the linear actuator 337. In some embodiments, the linear actuator 337 may be a screw/thread based actuator configured to increase a length of the rod 338 that is between the first portion and the second portion of the linear actuator 337. In some embodiments, the suspension system 310 may comprise a yoke coupling 340 coupled between the second portion of the linear actuator 337 and the first coupling 329. In some embodiments, as discussed in more detail below, the yoke coupling 340 and the first coupling 329 move together synchronously (e.g., are fixed with respect to the other). As shown in FIG. 3B, in some embodiments, the first coupling 329 may include a link angular encoder (e.g., resolver) 341.

In some embodiments, the suspension system 310 may be provided with one or more supporting components within the lower compartment 321B of control leg 313. For example, the suspension system 310 may be provided with a rocker bump stop 332 disposed above the rocker arm 335 in FIG. 3B. In some embodiments, the rocker bump stop 332 may limit a rotation of the rocker arm 335 to protect the rocker arm 335 from potential collisions with components above the rocker arm (e.g., collisions with components of the latching system 306, which could damage the rocker arm 335, for example). The suspension system 310 may also be provided with a leg bump stop 334 disposed above the upper four-bar link 325. The leg bump stop 334 may be positioned (at least partially) external to the lower compartment 321B, such that an upward movement of the upper four-bar link 325 is prevented from causing the upper four-bar link 325 to collide with the exterior portion of the chassis, which could damage the upper four-bar link 325 and/or the first coupling 329 and yoke coupling 340.

As mentioned above, the various components of the suspension system 310 may be disposed and contained within the chassis portion of control leg 313 (e.g., within lower compartment 321B) for dust mitigation. For example, as shown in FIG. 3B, housing the suspension system 310 within the chassis portion creates a boundary (e.g., represented by dashed lines) 342 between the exterior of the rover and the various components of the suspension system 310. The boundary 342 may prevent dust, soil, and other substances (e.g., lunar substances) from entering the interior of the chassis and contacting and building up on or near the suspension system components, which thus advantageously maintains system integrity and prolongs system life.

As outlined above, the various components of the suspension system 310 are communicatively linked (e.g., via physical connections), such that the components may be configured to move and function fluidly via a chain of interconnected motion. In some embodiments, the rover ECU (e.g., corresponding to ECU 104 in FIGS. 1A-1B) may be in communication with the linear actuator 337 (including the commutator resolver (not shown)), the rocker resolver 339, and the link resolver 341. It should be understood that, while not explicitly shown, the ECU may communicate with the linear actuator 337, the rocker resolver 339, and the link resolver 341 via any suitable communication means (e.g., wired or wireless communication means). As described below, the ECU may be configured to determine and evaluate a plurality of suspension system parameters for operating the rover to perform one or more suspension functions.

FIG. 3C illustrates examples of the plurality of suspension system parameters that may be computed and evaluated based on angular encoder (e.g., resolver) readings. As mentioned above, the ECU may be in communication with the rocker resolver 339 and the link resolver 341. In some embodiments, the rocker resolver 339 and/or the link resolver 341 may be rotary transformers configured to measure degrees of rotation. For example, the rocker resolver 339 may measure degrees of rotation of the rocker arm 335, and the link resolver 341 may measure degrees of rotation of the first coupling 329 (and thus the upper four-bar link 325 coupled to the first coupling 329).

As mentioned above with reference to FIGS. 3B, in some embodiments, a first end of the rocker shaft 333 may be coupled to the rocker arm 335. In some embodiments, a second end of the rocker shaft 333 is optionally anchored to a respective location within the chassis portion (i.e., the lower compartment 321b in FIG. 3B) of control leg 313. In one or more embodiments, the rocker shaft 333 is optionally anchored to a respective location adjacent to the linear actuator 337, as shown in FIG. 3C, such that an orientation of the rocker shaft 333 (and spring 336) is substantially vertical with respect to the reference. In one or more embodiments, the second end of the rocker shaft 333 is optionally anchored to a respective location adjacent to the rocker arm 335, as shown in FIG. 5B, for example, such that an orientation of the rocker shaft 333 is substantially horizontal with respect to the top surface of the chassis. Additionally or alternatively, in some embodiments, the orientation of the rocker shaft 333 may be evaluated with respect to the surface on which the rover is placed. Additionally or alternatively, in some embodiments, the orientation of the rocker shaft 333 may be evaluated with respect to a respective orientation of linear actuator 337. In FIG. 3C, a first end of the rocker shaft 333 is coupled to the first portion of the rocker arm 335 via a first fastener 345a, and a second end of the rocker shaft 333 is anchored to the respective location via a second faster 345b (e.g., a bolt, screw, pin, or any suitable fastener). Similarly, a first end of the linear actuator 337 is coupled to the second portion of the rocker arm 335 via a third fastener 347a (e.g., a bolt, screw, pin, or any suitable fastener), and a second end of the linear actuator 337 is coupled to the yolk coupling 340 via a fourth fastener 347b (e.g., a bolt, screw, pin, or any suitable fastener).

In some embodiments, the fasteners discussed above may provide pivot and/or anchor points about which various components of suspension system 310 may or may not be configured to rotate and/or move. In some examples, in FIG. 3C, the first fastener 345a, which couples the first end of the rocker shaft 333 to the first portion of the rocker arm 335, may provide a pivot point between the rocker shaft 333 and the rocker arm 335. The second fastener 345b may fix the second end of the rocker shaft 333 to the respective location within the lower compartment of the control leg 313 (e.g., and thus prevents movement of the rocker shaft 333 about the second fastener 345b). In some examples, the third fastener 347a, which couples the first end of the linear actuator 337 to the second portion of the rocker arm 335, may provide a pivot point between the linear actuator 337 and the rocker arm 335. In some examples, the fourth fastener 347b, which couples the second end of the linear actuator 337 to the yoke coupling 340, may provide a pivot point between the linear actuator 337 and the yoke coupling 340 (e.g., and thus the first coupling 329 and the upper four-bar link 325 coupled to the first coupling 329).

In some embodiments, the plurality of suspension parameters may include effective lengths, which are defined as between respective fasteners coupled to the rocker shaft 333 and the linear actuator 337. For example, as shown in FIG. 3C, a first effective length L1 may be defined between the first fastener 345a, which couples the first end of the rocker shaft 333 to the rocker arm 335, and the second fastener 345b, which anchors the second end of the rocker shaft within the chassis portion of control leg 313. In some embodiments, the first effective length L1 may be a known value for a given orientation of the rocker arm 335 (e.g., for a level rocker arm, in which the rocker shaft 333 is fully or substantially extended). A second effective length L2 may be defined between the third fastener 347a, which couples the first end of the linear actuator to the rocker arm 335, and the fourth fastener 347b, which couples the second end of the linear actuator to the yoke coupling 340. In some embodiments, the second effective length L2 may be a known value for a given length of the linear actuator pin 338. As described in more detail later, the first effective length L1 may change (e.g., increase or decrease) in response to a change in orientation of the rocker arm 335. The second effective length L2 may change in response to a change in a length of the linear actuator pin 338. In some embodiments, the length of the linear actuator pin 338 changes in response to operation of the linear actuator 337, as discussed in more detail later.

In some embodiments, the plurality of suspension parameters may include angular encoder (e.g., resolver) angles, which are measured using the rocker resolver 339 and the link resolver 341. For example, as shown in FIG. 3C, a first resolver angle, OR, may be measured using the rocker resolver 339. The first resolver angle is optionally an angle of rotation of the rocker arm 335 measured with respect to the reference (e.g., the surface on which the rover is configured to be placed, and/or the pivot point at which the rocker arm 335 is coupled to the chassis (e.g., via second fastener 345b coupling the rocker shaft 333 to the chassis)). As such, when the rocker arm 335 is in a first respective orientation (e.g., when the surface on which the rover is placed is flat), the first resolver angle is effectively zero ("0"), as shown in FIG. 3C. A change in the first effective length L1 (e.g., due to a change in the length of the rocker shaft 333) optionally corresponds to a rotation in the rocker arm 335 with respect to the reference above, and thus changes the value of the first resolver angle. A second resolver angle, OH, may be measured using the link resolver 341. The second resolver angle is optionally an angle of rotation of the first coupling 329 (and thus the upper four-bar link 325 coupled to the first coupling 329) measured with respect to the reference. As such, when the first coupling 329 is in a first respective orientation (e.g., when the surface on which the rover is placed is flat), the second resolver angle is effectively zero, as shown in FIG. 3C. A change in the second effective length L2 (e.g., due to a change in the length of the linear actuator pin 338) optionally corresponds to a rotation in the first coupling 329 with respect to the reference, and thus changes the value of the second resolver angle (e.g., to have a value of "X"), as shown.

Accordingly, in some embodiments, the rover ECU may compute the plurality of suspension parameters using the rocker resolver 339 and the link resolver 341, and the known distances of the first effective length L1 and the second effective length L2 at respective orientations of the rocker arm 335 and the first coupling 329, respectively. As discussed in more detail with reference to FIGS. 5A-6B, computation of the above-described plurality of suspension parameters may enable the rover to be operated to retrieve, transport, and/or deposit modular payloads, as well as adapt to unevenness in the terrain during such transportation.

Figure 4:
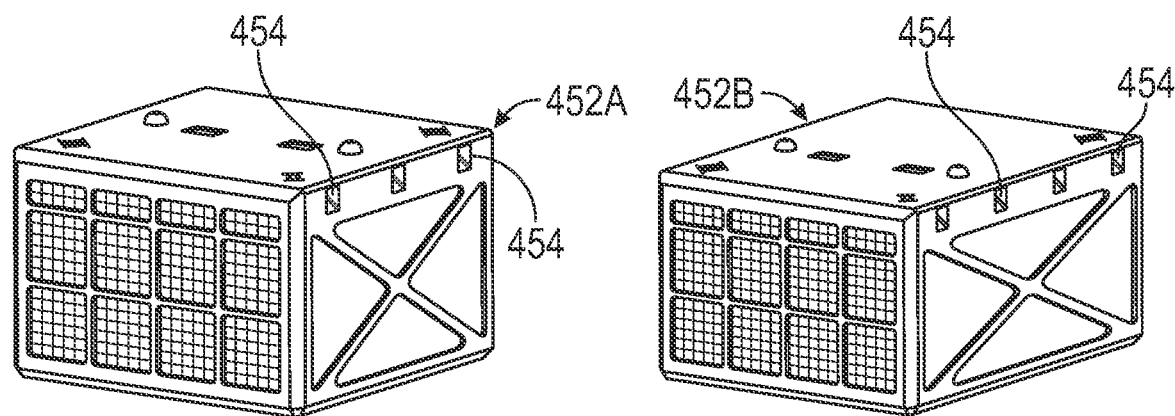
FIG. 4 illustrates examples of modular payloads configured to be retrieved, transported, and/or deposited by a rover according to some embodiments of the disclosure.

FIG. 4 illustrates examples of modular payloads 452a-452b configured to be retrieved, transported, and/or deposited by a rover according to some embodiments of the disclosure. The modular payloads 452a-452b shown in FIG. 4 are examples of payloads that may need to be transported on planetary surfaces (e.g., the surface of a moon). As shown, the modular payloads may be cuboidal in shape, and may vary in size (e.g., volume), depending on the number, size, type, fragility, etc. of the contents of the payloads.

In some embodiments, the modular payloads 452a-452b may each comprise a plurality of latch receptacles 454. As shown in FIG. 4, the plurality of latch receptacles 454 may be disposed along one or more sides of each of the modular payloads 452-452b. For example, the plurality of latch receptacles 454 may be provided along one side, two sides, or three sides of each of the modular payloads 452a-452b. In some embodiments, the plurality of latch receptacles 454 may be located within the upper 1, 2, 3, 5, 10, 20, 30 or 50 percent of the height dimension of the modular payloads 452a-452b. In some embodiments, a number of the plurality of latch receptacles 454 provided may vary depending on the size (e.g., depending on the length and/or width) of the modular payload. For example, the first modular payload 452a optionally includes the dimensions of 1.5 m×1.5 m×1 m, and is provided with six latch receptacles (e.g., three latch receptacles disposed along both sides of the modular payload 452a). The second modular payload 452b optionally includes the dimensions of 1.5 m×2 m×1 m, and is provided with eight latch receptacles (e.g., four latch receptacles disposed along both sides of the modular payload 452b).

Conventionally, few mobility platforms exist for the deposition and/or transportation of modular payloads on planetary surfaces (e.g., the surface of a moon). For example, with current technologies, modular payloads, such as those shown in FIG. 4, may be deposited on the surface of the Moon after landing (e.g., by a crane on a planetary lander) and then manually transported over the lunar surface (e.g., manually carried and/or lifted onto a lunar rover vehicle and subsequently driven) by a user (e.g., an astronaut). Moreover, the payloads may have to be transported serially, exhausting time and resources that could be better spent towards exploration, scientific sample collection, construction, or other lunar mission objectives. Thus, there is a need for providing a single mobility platform configured to autonomously retrieve, transport, and deposit such modular payloads without the need for direct user input or intervention.

Accordingly, as described herein, the rover latching system (e.g., corresponding to latching system 106 in FIGS. 1A-1B) may correspond to the plurality of latch receptacles 454 of the modular payloads 452a-452b. In some embodiments, the plurality of latch receptacles 454 are optionally configured to (e.g., shaped to) receive (e.g., become latched with) a corresponding plurality of latches of the rover latching system, which will be described in more detail with respect to FIGS. 5F-5H. For example, as discussed in more detail with reference to FIGS. 5F-5H, the rover latching system may be configured to interface with the plurality of latch receptacles 454, thus having a configuration of latch receptacles corresponding to the number of the plurality of latch receptacles and the distance between respective pairs of latch receptacles of the plurality of latch receptacles. In some such embodiments, when the plurality of latch receptacles 454 become latched with the plurality of latches, the modular payload becomes attached to the chassis of the rover.

Rover Retrieval, Transportation, and/or Deposition of Payloads

Attention is now directed towards example operations of the rover in retrieving a respective modular payload for the subsequent transportation and/or deposition of the respective modular payload. The respective modular payload may be located at a respective location on a planetary surface (e.g., the surface of a moon) which, for ease of illustration and explanation, is an even (e.g., substantially flat) location on the planetary surface. As described previously herein, the various autonomous operations of the systems of the rover described below may be (at least substantially) controlled by the rover ECU.

Figure 5A:
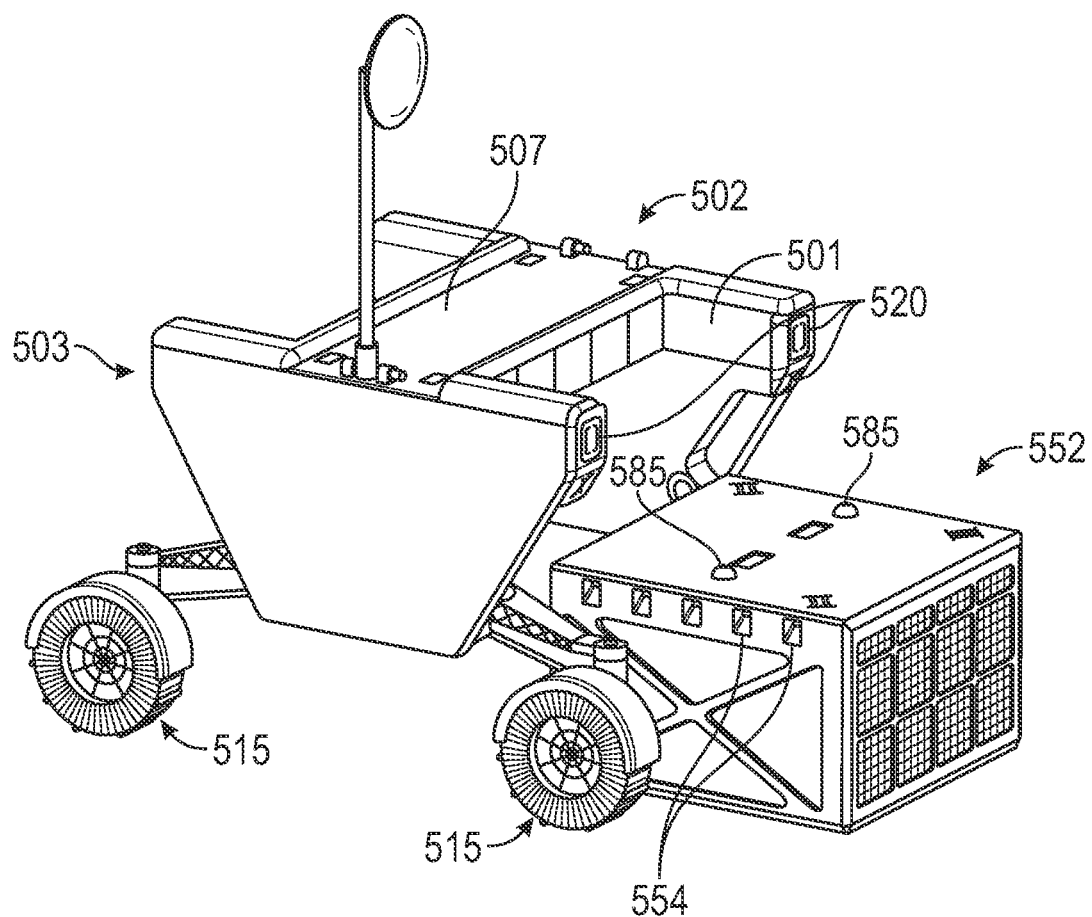
FIGS. 5A-5H illustrate an example of retrieval of a modular payload using a rover according to some embodiments of the disclosure.
Figure 5B:
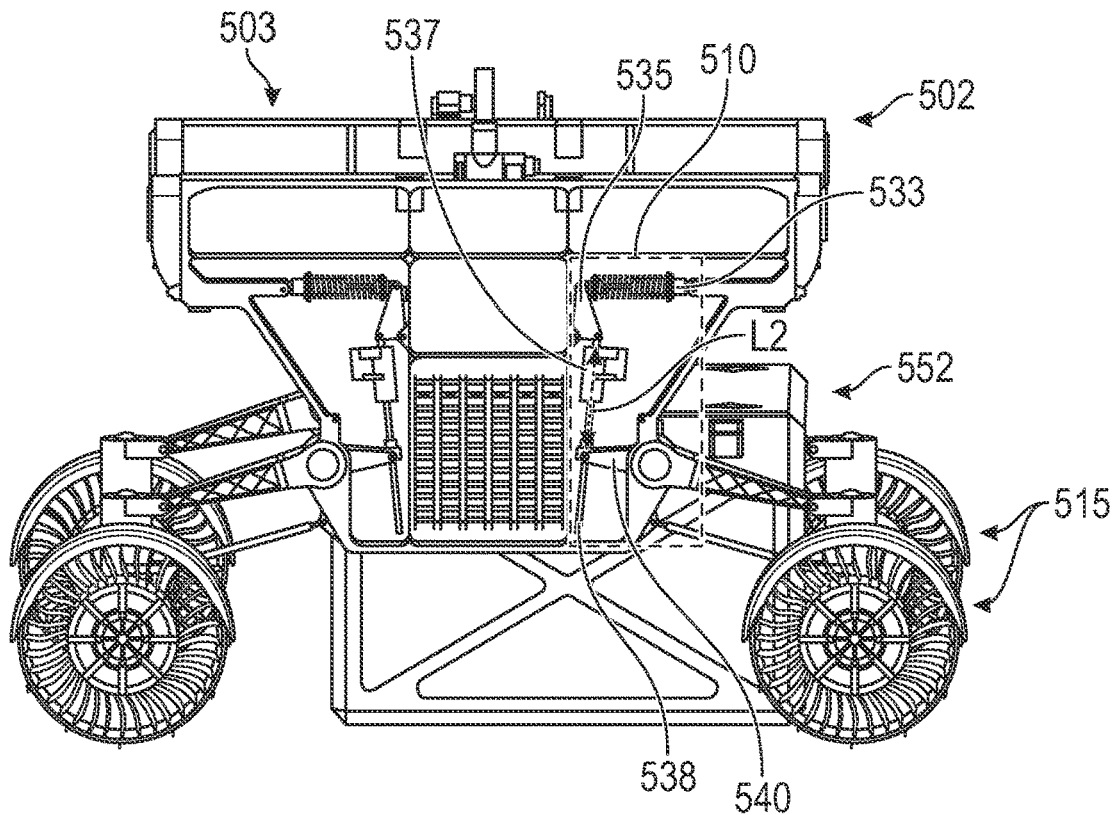

FIGS. 5A-5H illustrate an example of autonomous retrieval of a modular payload 552 using a rover 502 according to some embodiments of the disclosure. In some embodiments, the rover 502 optionally corresponds to rover 202 shown in FIGS. 2A-2B, and modular payload 552 optionally corresponds to modular payload 452 shown in FIG. 4. In some embodiments, the rover 502 may, via the one or more sensors 520, detect and identify a location of the modular payload 552 on the lunar surface. As shown in FIG. 5A, after identifying the location of the modular payload 552, the rover 502 may be operated (e.g., via the rover ECU) to autonomously approach the modular payload 552. For example, the ECU may drive the plurality of propulsion components 515 (e.g., using the motor assembly (e.g., corresponding to motor assembly 322 in FIG. 3A) associated with each propulsion component) to drive the rover 502 toward the modular payload 552.

As discussed above with reference to FIG. 4, the modular payload 552 may comprise a plurality of latch receptacles 554 disposed along two sides of the modular payload 552 (e.g., along a first side of the modular payload 552 and along a second side, opposite the first side), as shown in FIG. 5A. As the rover 502 is driven toward the modular payload 552, the ECU may utilize data (e.g., image data) captured via the one or more sensors 520 to position the interior 501 of the chassis 503 around the modular payload 552. Particularly, as discussed below, the rover 502 may position itself above the modular payload 552 to retrieve the modular payload 552.

As shown in FIG. 5B, when the rover 502 is positioned above the modular payload 552, the plurality of propulsion components 515 optionally ceases to be driven, such that the rover 502 remains stationary above the modular payload 552. In some embodiments, the rover 502 may cease driving forward when the rover 502 detects that all or a substantial portion (e.g., a threshold amount of a top surface (e.g., for a 1.5 m×2 m×1 m modular payload, the threshold amount is equal to an area of the top surface, defined by 1.5 m×2 m)) of the modular payload 552 is positioned below the rover 502. In some embodiments, the modular payload 552 comprises a plurality of conical protrusions 585. Referring back to FIG. 5A, the plurality of conical protrusions 585 may be positioned on the top surface of the modular payload 552, wherein a first end of a respective conical protrusion 585 is coupled to the top surface of the modular payload 552 and a second, smaller end of the respective conical protrusion 585 is pointed upward and away from the top surface of the modular payload 552. In some embodiments, the rover 502 may comprise a plurality of conic recessions (not shown) configured to receive the plurality of conic protrusions 585.

For example, the plurality of conic recessions (not shown) may be disposed in an interior portion (e.g., the underside) of the medial portion 507 of the chassis 503 of the rover 502. In some embodiments, the rover 502 may utilize sensor data captured via the one or more sensors 520 to position the plurality of conic recessions (not shown) above the plurality of conic protrusions 585, as shown in FIG. 5B. In some embodiments, the plurality of conic recessions (not shown) of the rover 502 may comprise proximity sensors configured to detect a presence of the plurality of conic protrusions 585 when the plurality of conic protrusions 585 enter the plurality of conic recessions of the rover 502.

As shown in the detailed view in FIG. 5B, the rover 502 comprises the suspension system 510 (e.g., corresponding to suspension system 310 in FIGS. 3A-3B) within the chassis 503. As discussed above with reference to FIGS. 3A-3C, the suspension system 510 may include the rocker shaft 533 (including the spring), the rocker arm 535, and the linear actuator 537 including the pin 538. In some embodiments, when the rover 502 is positioned above the modular payload 552, the suspension system 510 of each control leg (e.g., corresponding to control leg 313 in FIGS. 3A-3C) may be operated (e.g., by the rover ECU) to initiate the process of retrieving the modular payload 552. Particularly, the linear actuator 537 may be operated to cause a lengthening of the pin 538 (e.g., with respect to the yoke coupling 540) to increase the second effective length (e.g., L2 in FIG. 3C) and thus lower the chassis 503 with respect to a reference (e.g., the surface on which the rover 502 is placed, or a point or plane on/along a bottom surface of the chassis 503) and toward the top surface of the modular payload 552, as discussed below.

Figure 5C:
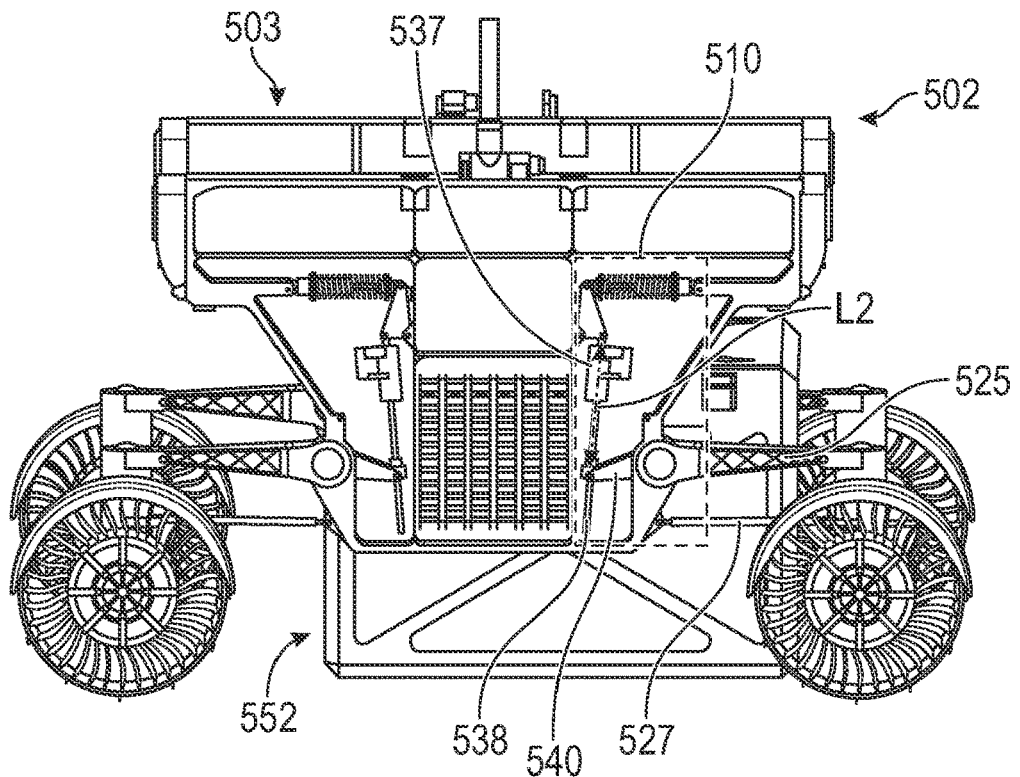
Figure 5D:
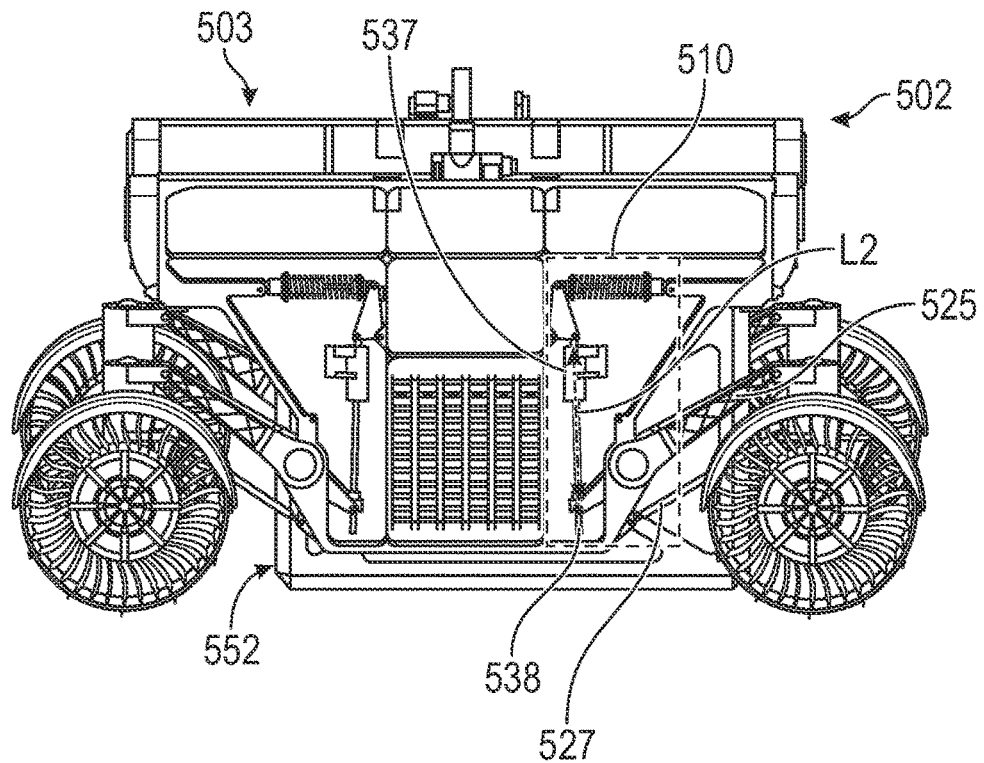

As shown in FIG. 5C, as a portion of the pin 538 that is between the linear actuator 537 and the yoke coupling 540 increases for each control leg of the rover 502, the chassis 503 of the rover 502 is lowered with respect to the reference (e.g., the surface on which the rover 502 is placed) and thus oriented closer toward the top surface of the modular payload 552. In some embodiments, as the second effective length L2 increases (e.g., as the distance between the linear actuator 537 and the yoke coupling 540 increases), a respective orientation of the upper four-bar link 525 and a respective orientation of the lower four-bar link 527 changes for each control leg of the rover 502. Referring back to FIGS. 3A-3C, the linear actuator 337 may be operated to cause a rotation (e.g., yaw rotational motion in a first respective direction (e.g., counterclockwise direction)) of the rod 338 coupled between the first portion of the linear actuator 337 and the second portion of the linear actuator. As the rod 338 is rotated, for example, the portion of the rod 338 that is between the yoke coupling 340 and the linear actuator 337 may increase in length. As mentioned above, the spring 336 of the rocker shaft 333 optionally has a respective spring rate, which may enable the rocker arm 335 to resist moving (e.g., resist pitch rotational motion about the third fastener 347a) as the linear actuator 337 moves (e.g., in response to driving the rod 338). For example, the spring 336 may retain the rocker shaft 333 at a lengthened position (e.g., such that the first effective length L1, defined by the distance between the first fastener 345a and the second fastener 345b, does not change), as shown in FIG. 3B, and thus maintains the rocker arm 335 at a resting position (e.g., wherein the first resolver angle $\theta_R$, is about 0 degrees (as measured by the rocker resolver 339)). The increase in the portion of the rod 338 optionally causes the second effective length L2 to increase. As described above, the second effective length may be defined between the third fastener 347a and the fourth fastener 347b. As the second effective length L2 increases, the yoke coupling 340 may pivot (e.g., pitch rotational motion in a clockwise direction) about the fourth fastener 347b. The rotation of the yoke coupling 340 optionally causes the first coupling 329 coupled to the yoke coupling 329 to rotate (e.g., pitch rotational motion in a clockwise direction) in accordance with the rotation of the yoke coupling 340. The rotation of the first coupling 329 may then cause the upper four-bar link 325 coupled to the first coupling 329 to be raised with respect to the surface on which the rover is placed, which subsequently causes the lower four-bar link 327 to be raised (e.g., and to pivot (e.g., pitch rotational motion in a clockwise direction) about the second coupling 330) and thus causes the chassis of the rover to be lowered with respect to the surface on which the rover is placed.

For example, from FIG. 5B to FIG. 5C, in response to the increase in the distance between the linear actuator 537 and the yoke coupling 540, the upper four-bar link 525 and the lower four-bar link 527 are each changed from having a first orientation (e.g., tilted downward) with respect to the reference to having a second orientation (e.g., being substantially level) with respect to the reference (e.g., the surface on which the rover is placed or a point or plane on/along the bottom surface of the chassis 503). Additionally, for example, as discussed previously with reference to FIG. 3C, the second resolver angle, OH, measured using the link resolver 341 optionally also changes. For example, before the chassis 503 begins lowering toward the top surface of the modular payload 552, the second resolver angle may be a first angle (e.g., 0 degrees) with respect to the surface on which the rover 502 is placed. As the upper four-bar link 325 is changed from having the first orientation to having the second orientation, the first coupling 329 changes from having the first orientation to the second orientation. The change in orientation of the first coupling 329 causes the second resolver angle to change from being the first angle to being a second angle (e.g., 10, 15, 20, 30, 40, 50, 60, etc. degrees) with respect to the surface on which the rover 502 is placed. The changes in orientation of each of the upper four-bar links 525 and the lower four-bar links 527 with respect to the reference cause the chassis 503 of the rover 502 to lower with respect to the reference. From FIG. 5C to FIG. 5D, as the effective length of the pin 538 continues to increase, the respective orientations of the upper four-bar link 525 and the lower four-bar link 527 (e.g., and thus the respective angle of the second resolver angle, OH, of the first coupling 329) of each of the control legs continue to change in accordance with the increase of the effective length, which causes the chassis 503 of the rover 502 to continue to be lowered, as shown.

Figure 5E:
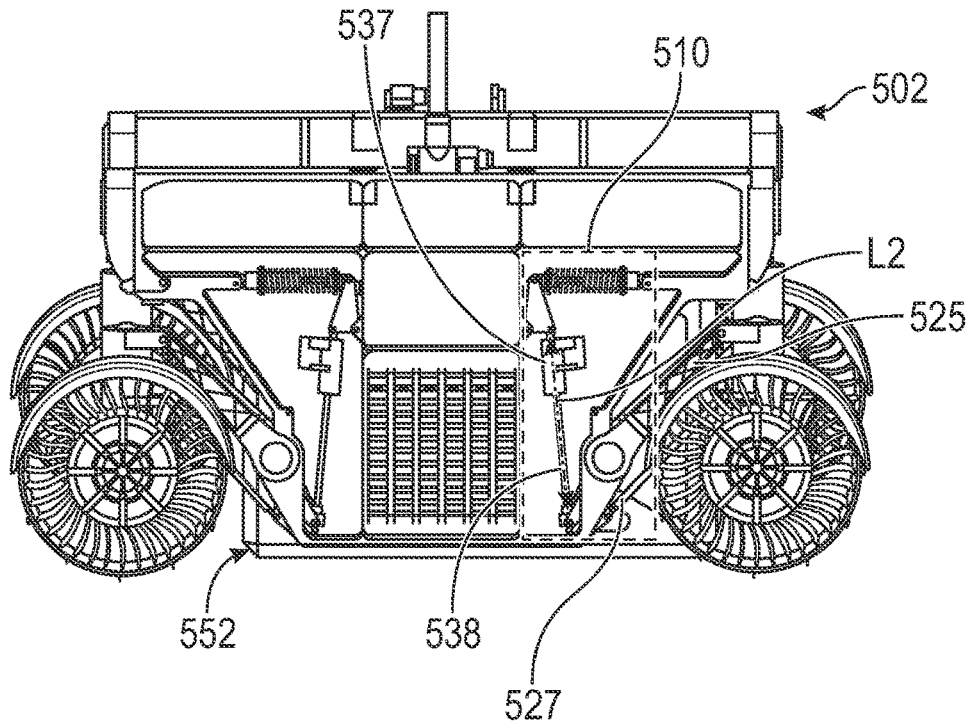

As shown in FIG. 5E, the effective length of the pin 538 of each control leg may be increased until the (e.g., bottom surface of the medial member of the) chassis 503 of the rover 502 is lowered close enough to the top surface of the modular payload 552 to retrieve the modular payload 552. For example, as discussed previously with reference to FIG. 3C, the rover ECU may be configured to compute a respective angle of the yoke coupling 540 and the upper four-bar link 525 with respect to the reference using the link angular encoder (e.g., link resolver 341). In some embodiments, when the computed respective angle corresponds a relative threshold angle (e.g., relative to the size of the modular payload, where the threshold angle is 30 degrees, 35 degrees, 45 degrees, 50 degrees, 60 degrees, 65 degrees, 70 degrees, etc.) with respect to the reference, the rover ECU may cease operating the linear actuator 537, such that the effective length of the pin 538 no longer increases and respective orientations of the upper four-bar link 525 and the lower four-bar link 527 of each control leg no longer change. For example, different sized modular payloads will have associated angles at which the rover 502 may stop lowering to retrieve the modular payloads. A taller modular payload (e.g., a payload having a greater height dimension than that shown in FIGS. 5A-5H) may require the rover 502 to stop lowering at a first relative threshold angle that is smaller than a second relative threshold angle that may be required for retrieving a shorter modular payload (e.g., a payload having a smaller height dimension than that shown in FIGS. 5A-5H).

Figure 5F:
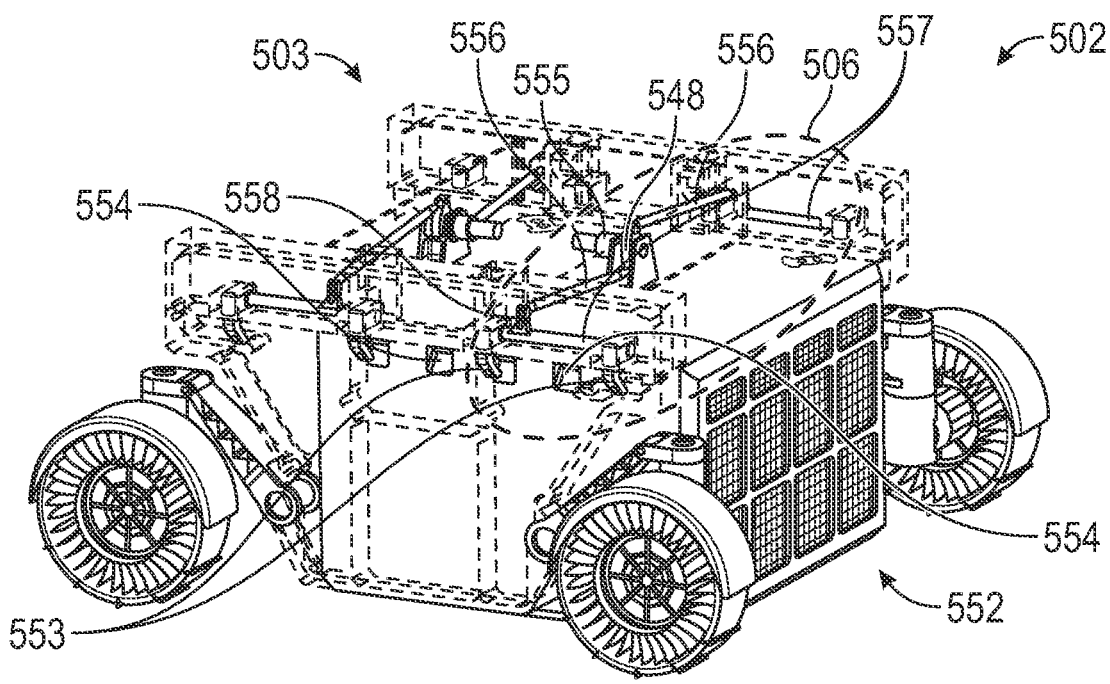
Figure 5G:
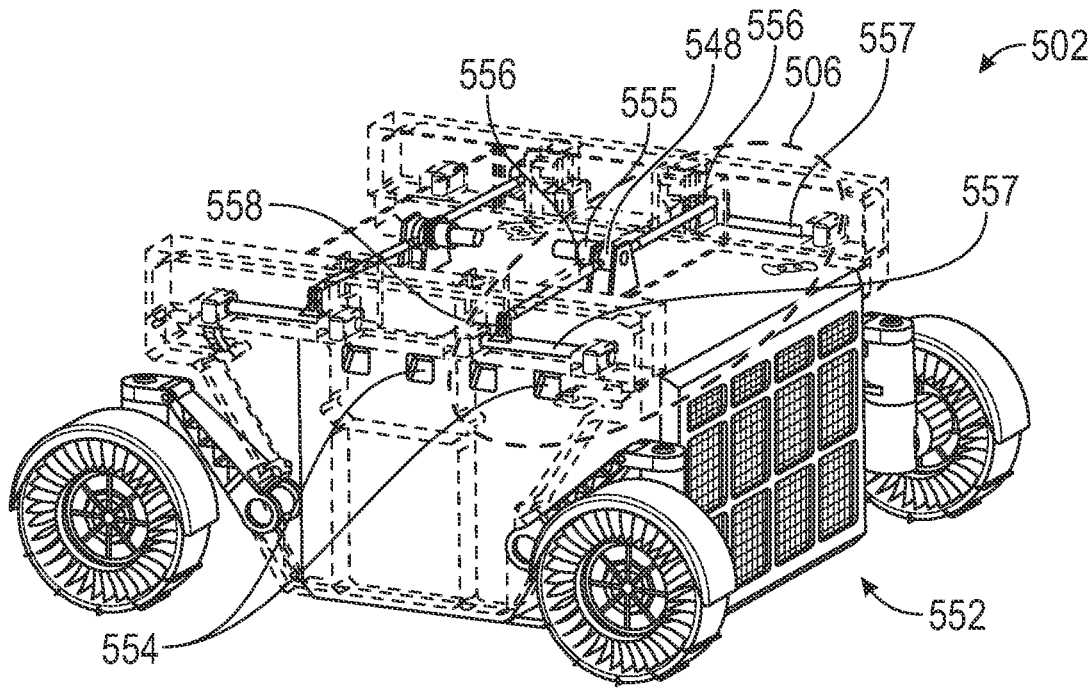
Figure 5H:
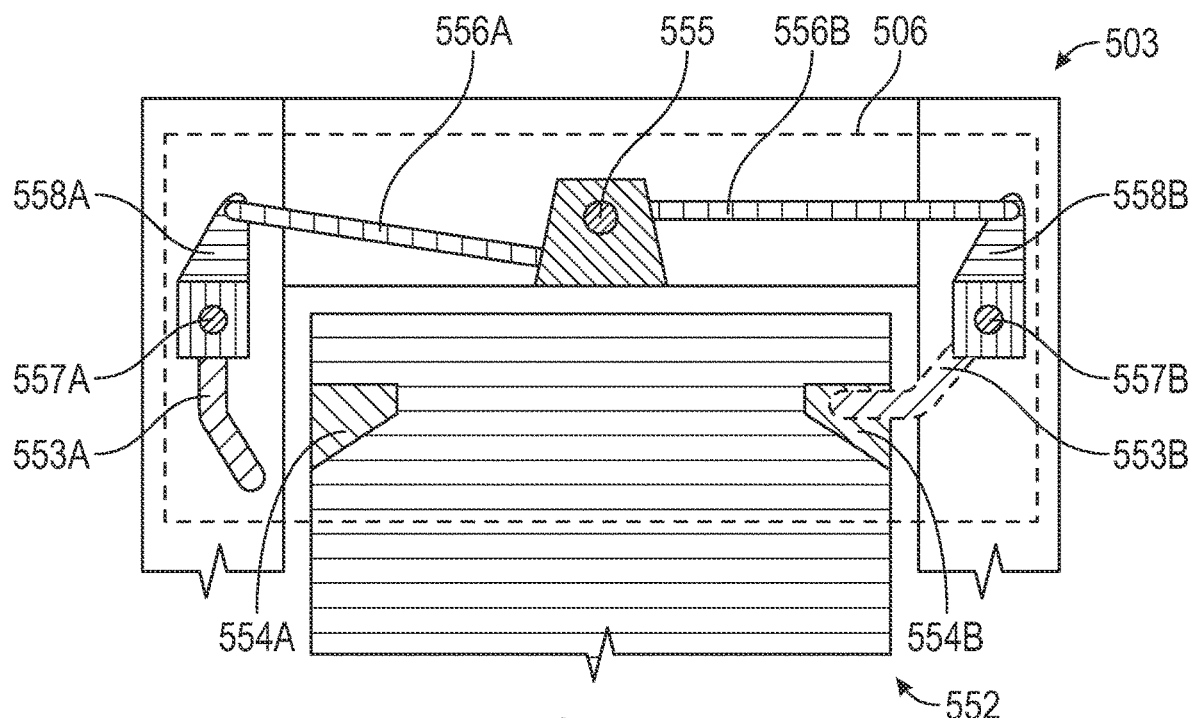

In some embodiments, when the chassis 503 of the rover 502 has been lowered with respect to the reference to a respective elevation above the top surface of the modular payload 552 (e.g., abutting the top surface of the modular payload 552 or within 2 cm, 5 cm, 7 cm, 10 cm, 15 cm, etc. above the top surface of the modular payload 552) to at least partially surround the modular payload 552 such that the plurality of conic protrusions 585 of the rover 502 in FIG. 5A have entered the plurality of conic recessions (not shown) of the modular payload 552, the rover ECU may initiate one or more latching operations for retrieval of the modular payload 552. FIGS. 5F-5H illustrate an example of the rover latch system 506 and methods thereof. In some embodiments, the rover latch system 506 optionally corresponds to the latch system 206 shown in FIG. 2B.

As shown in FIG. 5F, the rover latch system 506 may be disposed within the chassis 503, as similarly described previously with reference to FIG. 2B. In some embodiments, the rover latch system 506 may be disposed within respective halves of the rover chassis 503 (e.g., a front half and a rear half), as shown in FIG. 5F. In some embodiments, the rover latch system 506 (e.g., for a respective half of the rover chassis 503) may comprise a plurality of hooks/appendages 553. In some embodiments, the plurality of hooks 553 may be housed within cavities of respective sides of the chassis 503 (e.g., within the first side 205 and the second side 209 in FIGS. 2A-2B) and may be configured to protrude outwardly from within the respective sides of the chassis 503 to engage with the plurality of latch receptacles 554 of the modular payload 552. In some embodiments, the plurality of hooks 553 may be configured to accommodate various possible shapes or arrangements that the plurality of latch receptacles may be provided in. The rover 502 may thus be configured to retrieve any payload comprising a plurality of latch receptacles so long as the payload fits within the interior 511 of the rover chassis 503. In some embodiments, the plurality of hooks/latches 553 may be coupled to a plurality of shafts 557 disposed in the upper portions of the sides of the chassis 503 (e.g., within the upper compartment 221A in FIG. 2B). In FIG. 5F, the latch system 506 for the front half of the chassis 503 may comprise two shafts 557 each coupled to two hooks 553. In some embodiments, the plurality of shafts 557 may be coupled to a corresponding plurality of connecting devices (e.g., cables, pins, wires, etc.) 556 disposed within the medial member of the chassis 503 (e.g., within the medial member 207 in FIG. 2B). As shown, each shaft 557 may be coupled to a corresponding connecting device 556 within the chassis 503. In some embodiments, each shaft 557 of the plurality of shafts may be coupled at a first end of the shaft to a given connecting device 556 via connection element 558 that extends radially from the first end of the shaft 557. In some embodiments, the connection element 558 may be configured to cause a rotation (e.g., roll rotational motion) of the shaft 557 coupled to the connection element 558.

In some embodiments, the latch system 506 optionally comprises one or more motors 555 coupled to the plurality of connecting devices 556. In some embodiments, each connecting device 556 of the plurality of connecting devices may be coupled to a respective motor 555 via a rotary element 548. In some embodiments, the rotary element 548 may be configured to be rotated (e.g., roll rotational motion) by the respective motor 555 to cause a translation of the plurality of connecting devices 556 coupled to the rotary element 548.

In some embodiments, the one or more motors 555 of the latch system 506 may be configured to selectively drive the protrusion of the plurality of hooks 553 to engage with the plurality of latch receptacles 554 of the modular payload 552. For example, as shown in FIG. 5F, the plurality of connecting devices 556 coupled to the motor 555 may be arranged in a first respective orientation, which optionally causes the plurality of hooks 553 to be positioned within the chassis 503. The motor 555 may be operated (e.g., by the rover ECU) to change the orientation of the plurality of connecting devices 556, which optionally causes the plurality of hooks 553 to protrude radially from within the chassis 503.

As shown in FIG. 5G, the motor 555 may be operated to cause the plurality of hooks to engage with the corresponding plurality of latch receptacles 554 of the modular payload 552. In some embodiments, the motor 555 (e.g., which may be a rotary motor) may change the orientation of the plurality of connecting devices 556 (e.g., by translating the plurality of connecting devices 556 in a respective direction (e.g., outward)). For example, from FIG. 5F to FIG. 5G, the motor 555 may be operated to cause the rotary element 548 to rotate (e.g., roll rotational motion about an axis perpendicular to the motor 555) to produce a translation in the orientation of the plurality of connecting devices 556 (e.g., with respect to the reference (e.g., the surface on which the rover is placed, or the top surface of the modular payload 552)) from the first orientation to a second orientation (e.g., a parallel orientation with respect to the reference). In response to the change in orientation of the plurality of connecting devices 556, the plurality of shafts 557 may rotate in a respective direction (e.g., counterclockwise rotation of the front-right shaft 557) to cause the plurality of hooks to protrude radially toward and engage with the plurality of latch receptacles 554. For example, the translation of the plurality of connecting devices 556 may cause the connection element 558 coupled to a second end of each connecting device 556 to rotate (e.g., roll rotational motion in a respective direction away from the motor 555). The rotational motion of the connection element 558 may produce a corresponding rotation (e.g., roll rotational motion in the respective direction) of the shaft 557 coupled to the connection element (e.g., at the first end of the shaft 557). The shaft 557 may be coupled within the chassis of the rover to enable the shaft 557 to rotate around an axis extending through a middle of and along a length of the shaft 557 in response to the change in the pivot angle between the radially extended connection element 558 and the connecting device 556 coupled to the connection element 558. The hooks 553 fixedly coupled to opposite ends of the shaft 557 may then radially protrude (e.g., in accordance with the roll rotational motion of the shaft 557) to engage with the corresponding latch receptacles 554 of the modular payload 552.

For example, in the sectional view of FIG. 5H, a first connecting device 556a coupled to the motor 555 may be in the first orientation, such that a first hook 553a is positioned within (e.g., a cavity of) the chassis 503 (e.g., disengaged from a first latch receptacle 554a). When the motor 555 is operated to initiate latching with the modular payload 552 (e.g., causes a rotation of the rotary element 548 discussed above), the plurality of connecting devices may be changed from the first orientation to the second orientation, as shown by a second connecting device 556b. In the second orientation, the second connecting device 556b optionally causes a rotation of the connection element 558b coupled to the second connecting device 556b (e.g., in a direction away from the motor 555). The rotation of the connection element 558b may cause a rotation (e.g., roll rotational motion in the direction away from the motor 555) of a respective shaft 557b, which causes a second hook 553b to protrude outwardly from the chassis 503 and engage with the corresponding latch receptacle 554b of the modular payload 552. In some embodiments, a first portion of the second hook 553b remains within the cavity of the chassis 503 and a second portion of the second hook 553b protrudes from the cavity of the chassis 503 when the motor 555 is operated.

It should be understood that, in some embodiments, the first connecting device 556a and the second connecting device 556b will change orientation together, because the first connecting device 556a and the second connecting device 556b are both coupled to the same rotating element driven by the motor 555. FIG. 5H illustrates the two states of the first connecting device 556a and the second connecting device 556b independently for ease of description and comparison.

Thus, as outlined above, the rover 502 may be autonomously operated to locate, approach, and retrieve a modular payload for subsequent transportation and/or deposition of the modular payload at a respective location on the lunar surface. As discussed above, the retrieval of the modular payload according to the above example processes provides for an input-free, effective, and long-lasting mobility platform which may greatly reduce time and resources spent manually loading, transporting, and unloading payloads. Further, as an advantage, efforts and resources may be focused and allocated toward more significant and/or specialized lunar mission objectives in which human input may be required, such as exploration, testing, construction and the like.

In some embodiments, following the retrieval of the modular payload 552, the rover ECU may initiate processes for transporting and/or depositing the modular payload 552. For example, the linear actuator 537 may be operated to decrease the effective length of the pin 538, which may change respective orientations of the upper four-bar link 525 and the lower four-bar link 527 of each control leg to gradually raise the chassis 503 of the rover 502 and the modular payload 552 attached to the chassis 503 with respect to the surface. Referring back to FIGS. 3A-3C, the linear actuator 337 may be operated to cause a rotation (e.g., yaw rotational motion in a second respective direction (e.g., pitch rotational motion in a clockwise direction)) of the rod 338 coupled between the first portion of the linear actuator 337 and the second portion of the linear actuator. As the rod 338 is rotated, for example, the portion of the rod 338 that is between the yoke coupling 340 and the linear actuator 337 may decrease in length. As mentioned above, the spring 336 of the rocker shaft 333 optionally has a respective spring rate, which may enable the rocker arm 335 to resist moving (e.g., resist pitch rotational motion about the third fastener 347a) as the linear actuator 337 moves (e.g., in response to driving the rod 338). For example, the spring 336 may retain the rocker shaft 333 at a lengthened position (e.g., such that the first effective length L1, defined by the distance between the first fastener 345a and the second fastener 345b, does not change), as shown in FIG. 3B, and thus maintains the rocker arm 335 at a resting position (e.g., wherein the first resolver angle $\theta_R$, is about 0 degrees (as measured by the rocker resolver 339)). The decrease in the portion of the rod 338 optionally causes the second effective length L2 to decrease. As described above, the second effective length may be defined between the third fastener 347a and the fourth fastener 347b. As the second effective length L2 decreases, the yoke coupling 340 may pivot (e.g., rotational motion in a counterclockwise direction) about the fourth fastener 347b. The rotation of the yoke coupling 340 optionally causes the first coupling 329 coupled to the yoke coupling 329 to rotate (e.g., rotational motion in a counterclockwise direction) in accordance with the rotation of the yoke coupling 340. The rotation of the first coupling 329 may then cause the upper four-bar link 325 coupled to the first coupling 329 to be lowered with respect to the surface on which the rover is placed, which subsequently causes the lower four-bar link 327 to be lowered (e.g., and to pivot (e.g., rotational motion in a counterclockwise direction) about the second coupling 330) and thus causes the chassis of the rover to be raised with respect to the surface on which the rover is placed.

In some embodiments, the plurality of propulsion components 515 of the rover 502 may be driven (e.g., by a corresponding motor assembly) to transport the rover 502 and the modular payload 552 to a respective location on the surface while the chassis 503 is in the raised position (e.g., the position of chassis 503 in FIG. 5A). At the respective location, the chassis 503 of the rover 502 may again be lowered with respect to the lunar surface (e.g., according to the example processes described above), and the motor 555 may be actuated to cause the plurality of hooks to disengage from the plurality of latch receptacles 554 of the modular payload 552, thereby depositing the modular payload at the respective location. The rover 502 may then proceed to retrieving a second modular payload or performing another action as instructed by the rover ECU (e.g., returning to a lunar outpost or lander).

Figure 6A:
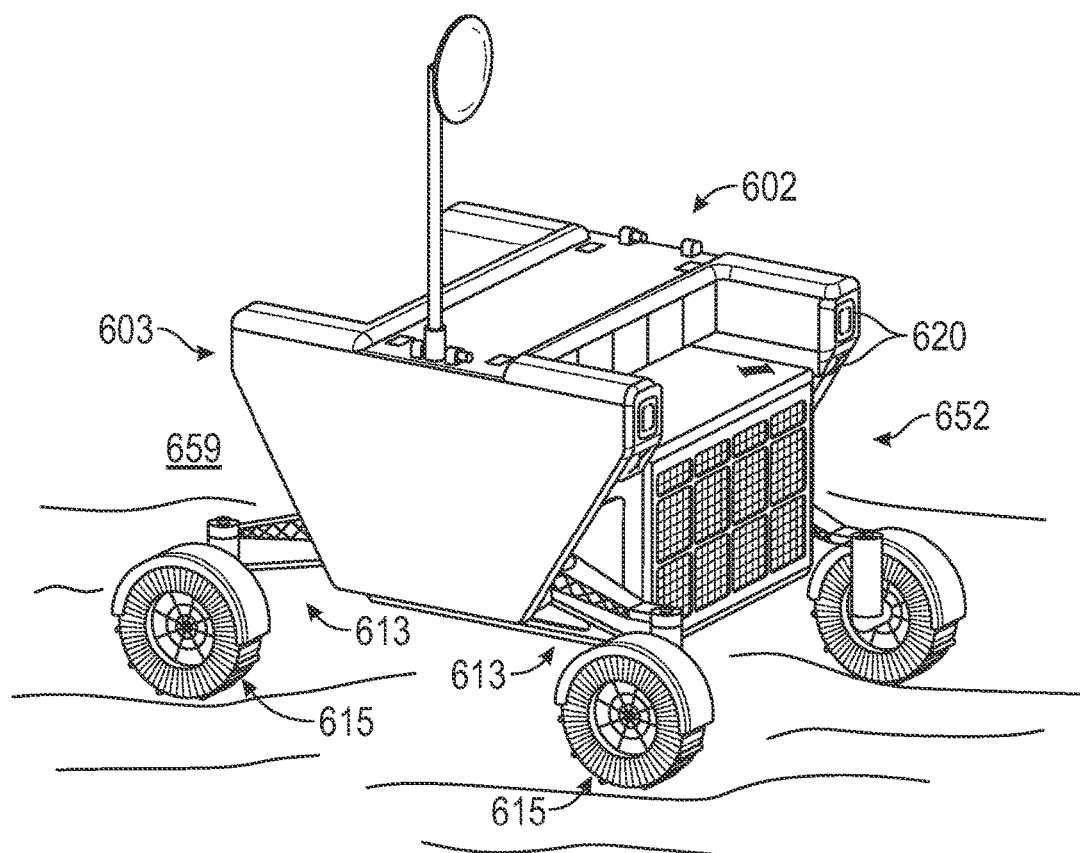
FIGS. 6A-6B illustrate an example of adaptive suspension of a rover during transport of a modular payload according to some embodiments of the disclosure.
Figure 6B:
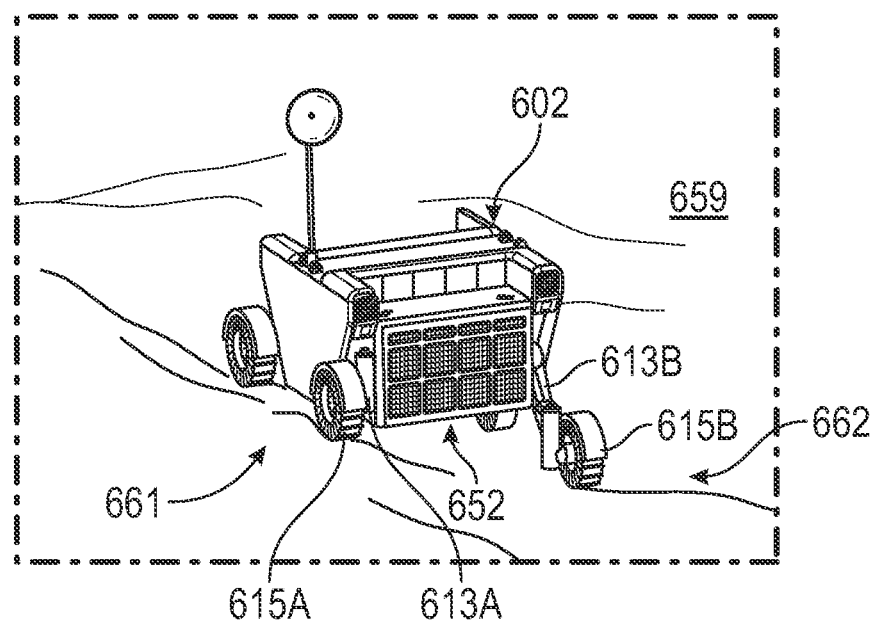

FIGS. 6A-6B illustrate an example of the adaptive suspension of a rover 602 during autonomous transport of a modular payload 652 according to some embodiments of the disclosure. In some embodiments, the rover 602 optionally corresponds to rovers 502 and/or 202 shown in FIGS. 5A-5H and/or FIGS. 2A-2B, respectively. As described above, the rover 602 may autonomously transport the modular payload 652 after retrieval of the modular payload 652 from a respective location on the lunar surface. As mentioned above with reference to FIGS. 5A-5H, the modular payload 652 may be located at a respective location that is (substantially) flat. As discussed below, during the autonomous transportation of the modular payload 652, the rover 602 may encounter one or more occurrences of unevenness on the lunar surface. In some embodiments, the suspension system of the rover 602 may be configured to adapt to such occurrences of unevenness during transport, such that the chassis 603 and thus the modular payload 652 may remain substantially level with respect to the lunar surface.

As shown in FIG. 6A, the rover 602 may be transporting the modular payload 652 over the lunar surface 659. For example, in FIG. 6A, the plurality of propulsion components 615 are each being driven by a corresponding motor assembly (e.g., motor assembly 322 in FIG. 3A) to drive the rover 602 across the lunar surface 659. As shown in FIG. 6A, the plurality of control legs 613 may be positioned in an upright position (e.g., as shown similarly in FIGS. 5A-5B) to maintain a ground clearance for a bottom surface of the modular payload 652 during transportation. As mentioned above, the lunar surface may include unevenness (e.g., obstacles or hindrances to travel, such as rocks, dips, craters, etc.). For extreme instances of unevenness, such as deep craters, the rover ECU may be configured to detect a respective crater using the one or more sensors 620, and operate the plurality of propulsion components 615 to steer the rover 602 away from the respective crater and avoid potential damage to the rover 602 and/or the modular payload 652 and its contents.

In some instances, the rover 602 may be unable to avoid unevenness in the lunar surface 659. For example, the lunar surface 659 contains vast stretches of unevenness and the only path to a respective destination may be through the portions of unevenness. In such instances, the rover may be configured to autonomously adapt to the unevenness in the lunar surface 659 and maintain a ground clearance between the bottom surface of the modular payload 652 and the lunar surface 659 to prevent and/or significantly reduce potential collisions between the modular payload 652 and the lunar surface 659.

As shown in FIG. 6B, in some instances, the lunar surface 659 may include unevenness, such as bumps 661 and/or dips 662. In some embodiments, the rover suspension system may be controllable to operate according to a selected mode. In some embodiments, the rover suspension system may be controllable to operate according to a passive suspension mode or one or more active suspension modes.

For example, referring back to FIGS. 3B-3C, in the passive suspension mode, the rover ECU forgoes operation of the components of the suspension system 310. In some embodiments, while the rover 602 transports the respective payload 652 and while employing passive suspension, the rocker shaft 333 and spring 336 may dampen shocks to a given control leg 313 that may be induced by contacts between a given propulsion component and a bump or dip in the lunar terrain 659. For example, as described previously with respect to FIG. 3B, the spring 336 may have a rate/constant that enables the spring 336 to resist and deflect shocks to the given control leg 313. When a given propulsion component contacts unevenness in the terrain 659, such as a bump 661 or a dip 662, a shock may be absorbed by the given propulsion component in response to contacting the bump 661 or the dip 662. The shock may propagate (e.g., via a vibration of the propulsion component) through the control leg (e.g., through the upper four-bar link 325 and/or the lower four-bar link 327), and transfer to the components of the suspension system 310. For example, referring back to FIGS. 3A-3C, when the propulsion component 315 contacts the bump 661, the shock pulse(s) may travel from the upper four-bar link 325 and/or the lower four-bar link 327 through the first coupling 329 coupled to the upper four-bar link 325 and yoke coupling 340 coupled to the first coupling 329. In response to the shock pulse(s) traveling through the yoke coupling 340, the yoke coupling 340 may produce a downward pull (e.g., with respect to the surface 659) of the second end of the linear actuator 337 and the rod 338 coupled to the second end of the linear actuator 337 (e.g., via the fourth fastener 347b). The downward pull of the rod 338 may produce a downward pull of the first end of the linear actuator 337 coupled to the second portion of the rocker arm 335 (e.g., via the third fastener 347a). In response to the downward pull of the first end of the linear actuator 337 coupled to the second portion of the rocker arm 335, the rocker arm 335 may swivel in an upward direction (e.g., pitch rotational motion in a clockwise direction) about the third fastener 347a, which may produce a stretching of the rocker shaft 333 coupled to the first portion of the rocker arm 335 (e.g., stretching between the first fastener 345a and the second fastener 345b fixed to the respective portion of the chassis). The stretching of the rocker shaft 333 coupled between the first portion of the rocker arm 335 and the respective portion of the chassis may be resisted by a corresponding stretching of the spring 336 of the rocker shaft 333.

Additionally or alternatively, when the propulsion component 315 contacts the dip 662, the shock pulse(s) may travel from the upper four-bar link 325 and/or the lower four-bar link 327 through the first coupling 329 coupled to the upper four-bar link 325 and yoke coupling 340 coupled to the first coupling 329. In response to the shock pulse(s) traveling through the yoke coupling 340, the yoke coupling 340 may produce an upward push (e.g., with respect to the surface 659) of the second end of the linear actuator 337 and the rod 338 coupled to the second end of the linear actuator 337 (e.g., via the fourth fastener 347b). The upward push of the rod 338 may produce an upward push of the first end of the linear actuator 337 coupled to the second portion of the rocker arm 335 (e.g., via the third fastener 347a). In response to the upward push of the first end of the linear actuator 337 coupled to the second portion of the rocker arm 335, the rocker arm 335 may swivel in a downward direction (e.g., pitch rotational motion in a counterclockwise direction) about the third fastener 347a, which may produce a compression of the rocker shaft 333 coupled to the first portion of the rocker arm 335 (e.g., compression between the first fastener 345a and the second fastener 345b fixed to the respective portion of the chassis). The compression of the rocker shaft 333 coupled between the first portion of the rocker arm 335 and the respective portion of the chassis may be resisted by a corresponding compression of the spring 336 of the rocker shaft 333. Thus, the shock absorbed by the propulsion component 315 may be deflected (e.g., for smaller magnitudes of shock), or absorbed and dissipated (e.g., for greater magnitudes of shock) by the spring 336 of the rocker shaft 333 (e.g., via a stretching and/or compression of the spring 336). However, depending on the given propulsion component that contacts the bump or dip, the shocks may be deflected unevenly throughout the rover chassis 603.

Accordingly, the rover suspension system may be controllable to operate according to the one or more active suspension modes to enable a more even deflection of shock throughout the rover chassis 603, and/or to enable maintaining the chassis 603 at a level orientation (e.g., with respect to the lunar surface 659). In some embodiments, in the one or more active suspension modes, the rover ECU selectively operates one or more of the components of the suspension system 310. In some embodiments, while the rover 602 transports the respective payload 652 and while employing active suspension, the linear actuator 337 may be selectively operated to adjust a relative orientation of a given control leg 313 with respect to the lunar surface 659 when a propulsion component 315 coupled to the given control leg 313 contacts or is about to contact (e.g., 1 s, 2 s, 5 s, 10 s, 15 s, etc. before contacting) a bump or dip in the lunar surface 659. For example, as described previously with reference to FIG. 3C, the first coupling 329 may include a link resolver 341 configured to measure an angle of rotation (e.g., the second resolver angle, θH) of the first coupling 329 (and thus the upper four-bar link 325 coupled to the first coupling 329) with respect to the lunar surface 659. When a given propulsion component contacts unevenness in the lunar terrain 659, such as bump 661 or dip 662, the angle of rotation measured by the link resolver 341 may change as a result of a change in orientation of the control leg coupled to the given propulsion component. For example, in response to a given propulsion component contacting a dip 662 in the lunar surface 659, an elevation of the control leg coupled to the given propulsion component may decrease with respect to the lunar surface 659 (e.g., due to the lower elevation of the dip 662). In some embodiments, in response to a given propulsion component contacting the dip 662 in the lunar surface 659, a distance between the control leg (e.g., and the given propulsion component coupled to the control leg) and the chassis 603 may increase. In response to a given propulsion component contacting a bump 661 in the lunar surface 659, an elevation of the control leg coupled to the given propulsion component may increase with respect to the lunar surface 659 (e.g., due to the higher elevation of the bump 661). In some embodiments, in response to a given propulsion component contacting the bump 661 in the lunar surface 659, the distance between the control leg (e.g., and the given propulsion component coupled to the control leg) and the chassis 603 may decrease.

In some embodiments, in response to detecting a change in the angle of rotation measured by the link resolver 341, the ECU rover may selectively operate the linear actuator 337 of the given control leg to adjust an orientation of the control leg to the higher elevation of the bump 661 or the lower elevation of the dip 662. For example, as shown in FIG. 6B, the propulsion component 615a contacts the bump 661, which, as described above, causes the control leg 613a coupled to the propulsion component 615a to increase in elevation with respect to the lunar surface 659. In response to the increase in elevation of the control leg 613a (e.g., as detected by the link resolver of the suspension system of the control leg 613a), the rover ECU may operate the linear actuator of the suspension system of the control leg 613a to lower the elevation of the control leg 613a with respect to the surface. As discussed previously with respect to FIGS. 5A-5H, the linear actuator may be operated to increase the effective length of the linear actuator (e.g., L2) to change the orientation of the control leg 613a and raise the control leg 613a with respect to the surface 659, as shown. Additionally, in FIG. 6B, concurrently, the propulsion component 615b contacts the dip 662, which, as described above, causes the control leg 613b coupled to the propulsion component 615b to decrease in elevation with respect to the surface 659. In response to the decrease in elevation of the control leg 613b (e.g., as detected by the link resolver of the suspension system of the control leg 613b), the rover ECU may operate the linear actuator of the suspension system of the control leg 613b to lower the elevation of the control leg 613b with respect to the surface. As discussed previously with reference to FIGS. 5A-5H, the linear actuator may be operated to decrease the effective length of the linear actuator (e.g., L2) to change the orientation of the control leg 613b and lower the control leg 613b with respect to the surface 659, as shown.

Thus, as shown in FIG. 6B, the respective linear actuators of the control leg 613a and the control leg 613b may be selectively operated to autonomously adapt the orientations (e.g., elevations) of the control legs 613a and 613b to unevenness in the terrain. In this way, the chassis 603 of the rover 602 may remain (substantially (e.g., within 2, 5, 10, 15, 20, 25, or 30 degrees of being)) level (e.g., about 0 degrees as measured along a surface (e.g., the top surface) of the medial member of the rover chassis 603 (e.g., corresponding to medial member 207 in FIGS. 2A-2B)) with respect to a reference (e.g., the surface 659, or gravity) and maintain a ground clearance between the bottom surface of the modular payload 652 and the unevenness in the surface (e.g., the bumps 661 and dips 662) to prevent and/or diminish impacts between the modular payload 652 and the surface 659. Thus, one advantage of the passive and active suspension modes of the rover suspension system during a transportation of a respective modular payload is that the respective modular payload, including the contents of the respective modular payload, may be safeguarded from damage during transport.

In some embodiments, the rover suspension system may be configurable to automatically switch between operating according to the passive and the active suspension modes. For example, the one or more processors of the rover 602 may cause the suspension system to switch between the modes in response to detecting a trigger. In some embodiments, the trigger may be a load-based trigger. For example, during transportation of the modular payload 652 described above, the ECU of the rover 602 may actively monitor the force of gravity under each propulsion component 615 (e.g., using one or more angular encoders of the suspension systems of the control legs 613. If a respective propulsion component (e.g., 615a) bears a force (e.g., weight) that exceeds a force threshold (e.g., 45, 50, 60, 70, 90, 100, 125, 150, etc. kg), the ECU of the rover 602 can cause the suspension systems of the control legs 613 to operate according to the active suspensions mode, such that the rover 602 raises the respective propulsion component (e.g., 615a) and cause shift a portion of the weight of the modular payload 652 to the other propulsion components. Similarly, in some embodiments, the trigger may be an orientation-based trigger. For example, if the chassis orientation exceeds desired orientation thresholds (e.g., exceeds a roll threshold (e.g., 5, 10, 15, 20, 25, 30, or 45 degrees) when transporting the modular payload 652 cross-slope, as determined with respect to gravity (e.g., by an inertial measurement sensor)), the ECU of the rover can cause the suspension systems of the control legs 613 to operate according to the active suspension mode, such that the uphill propulsion components (e.g., 615a) are raised from the surface 659 and the downhill propulsion components (e.g., 615b) are lowered toward the surface 659. Thus, in some embodiments, the ECU of the rover 602 may be configured to monitor the chassis orientation and propulsion component load distribution when determining whether to operate the suspension systems of the control legs of the rover 602 according to the passive or active suspension modes, such that the chassis 603 of the rover 602 may be maintained at or near a level orientation with respect to gravity and/or the weight borne by the propulsion components 615 are maintained at or near a relatively even distribution (e.g., within 0.5, 1, 2, 4, 5, 8, or 10 kg of each other).

Rover Functional Modules and Associated Processes

Attention is now directed towards examples of functional modules that are configured to interface with a rover. When interfaced with the rover, the functional modules may communicate with the rover ECU to perform one or more actions associated with the functional modules, as described below.

FIGS. 7A-7E illustrate examples of functional modules 764-766 configured to interface with a rover 702 according to some embodiments of the disclosure. In some embodiments, the rover 702 optionally corresponds to rover 602, 502, and/or 202 shown in FIGS. 6A-6B, FIGS. 5A-5H, and/or FIGS. 2A-2B, respectively. As described herein, the rover may be configured to retrieve, transport, and/or deposit payloads on a surface (e.g., a lunar surface). In some embodiments, the rover may be configurable to perform one or more additional actions and/or functions by interfacing the rover with a respective functional module, as described below.

Figure 7A:
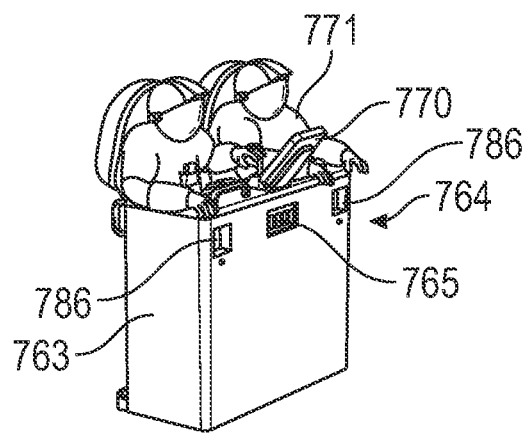
FIGS. 7A-7E illustrate examples of functional modules configured to interface with a rover according to some embodiments of the disclosure.
Figure 7B:
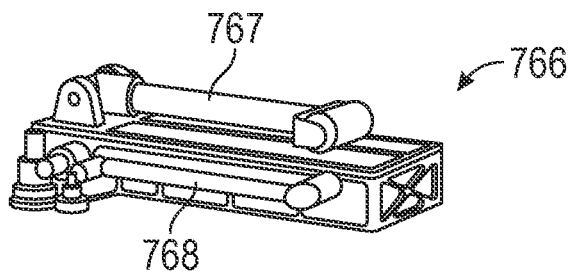

FIGS. 7A-7B illustrate examples of a vehicle functional module 764 and a surface science functional module 766, respectively. As shown in FIG. 7A, in some embodiments, the vehicle functional module 764 may comprise a crew stand 763 and an interface structure, including one or more interface receptacles (e.g., pins) 765 and one or more guides 786. In some embodiments, the one or more interface receptacles 765 and/or the one or more guides 786 may be configured to physically and communicatively link the vehicle functional module 764 (and its components) to the rover (and its components). While shown along a front portion of the vehicle functional module 764, the one or more interface receptacles 765 and/or the one or more guides 786 may be alternatively or additionally provided along one or more side portions of the vehicle functional module 764, or bottom portions of the vehicle functional module 764. In some embodiments, the crew stand 763 may support one or more users (e.g., astronauts) 771. As shown in FIG. 7A, the vehicle functional module 764 may include a control panel 770 disposed on the crew stand 763. In some embodiments, the control panel 770 may be operable by the one or more users 771 to manually control one or more functions of the rover, as discussed in more detail below.

As shown in FIG. 7B, in some embodiments, the surface science functional module 766 may comprise a remote science mast 767 and a robotic arm 768. In FIG. 7B, the remote science mast 767 and the robotic arm 768 are shown in a collapsed state. In some embodiments, once the surface science functional module 766 is interfaced with the rover, the remote science mast 767 and/or the robotic arm 768 may be deployed for use. In some embodiments, the surface science functional module 766 may include an interface structure (not shown) configured to physically and communicatively link the surface science module 766 (and its components) to the rover (and its components). For example, the interface structure (not shown) may be similar to the interface structure (e.g., interface receptacle 765 and/or guides 786) of the vehicle functional module 764 shown in FIG. 7A.

Figure 7C:
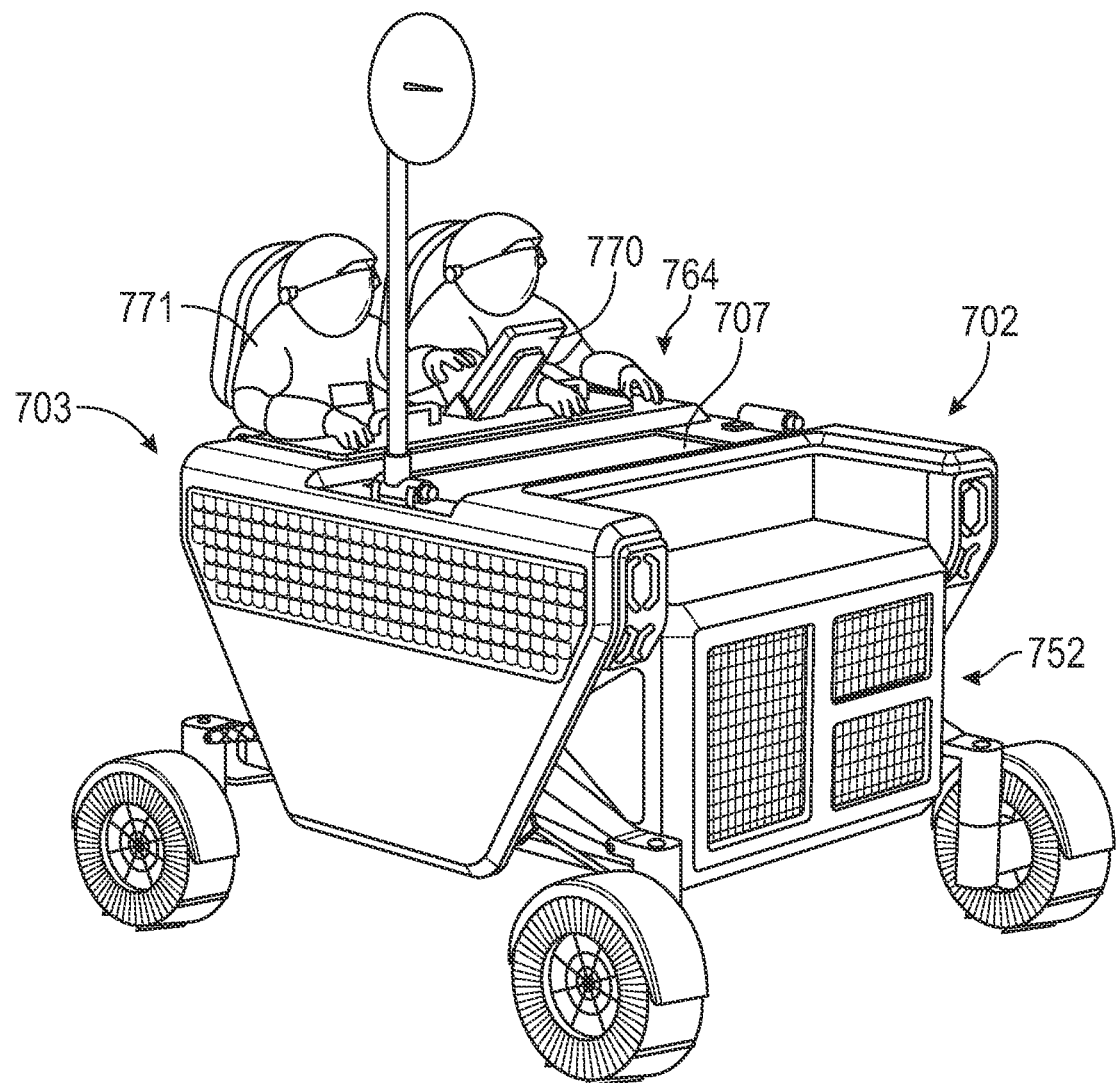
Figure 7D:
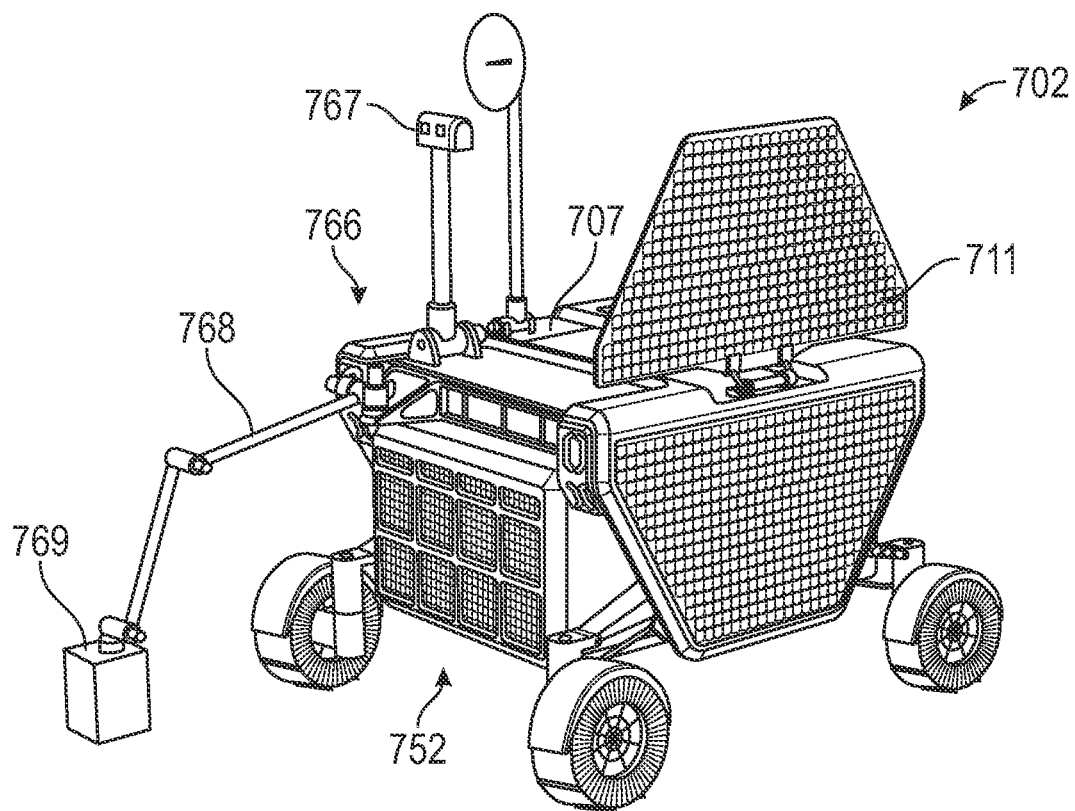

FIGS. 7C-7D illustrate examples of the vehicle functional module 764 and the surface science functional module 766, respectively, interfaced with the rover 702. As shown in FIG. 7C, in some embodiments, the vehicle functional module 764 may be interfaced with the rover 702 to configure the rover 702 as a rover vehicle. For example, with the vehicle functional module 764 linked to the medial member 707 of the chassis 703 of the rover 702, the rover 702 is configured to be manually driven as a rover vehicle by the one or more users 771. The one or more users 771 may use the control panel 770 to drive (e.g., accelerate, steer, brake, etc.) the rover 702 on the planetary surface. For example, the control panel 770 may be electrically coupled to the rover ECU (e.g., corresponding to ECU 104 in FIGS. 1A-1B), allowing the systems of the rover (e.g., motor assembly, suspension system, latching system, etc.) to be operated according to instructions received from the control panel 770 (e.g., according to user input received at the control panel 770). As shown in FIG. 7C, the rover 702 may transport a modular payload 752 (e.g., carrying crew tools, instruments, scientific samples, etc.) as the rover 702 is manually driven by the one or more users 771. In some embodiments, the plurality of latches/hooks of the latching system of the rover 702 (e.g., corresponding to the plurality of latches/hooks 553 in FIGS. 5F-5H) and/or the plurality of latch receptacles of the modular payload 752 (e.g., corresponding to the plurality of latch receptacles 554 in FIGS. 5F-5H) may be disposed in the rover 702 and the modular payload 752, respectively, in such a way so as to provide sufficient clearance for the chassis 703 to retrieve the modular payload 752. In some embodiments, when the vehicle functional module 764 is attached to the rover chassis 703, the modular payload 752 may be retrieved (e.g., via the rover latching system) alternatively so as to accommodate the vehicle functional module 764. For example, the modular payload 752 may be positioned below and retrieved toward a front end of the rover 702 when the functional module 764 is attached to the rover chassis 703, and the modular payload 752 may be positioned below and retrieved more toward a center of the rover 702 when the functional module 764 is not interfaced with the rover chassis 703.

It should be understood that the rover 702, while configured to function as a rover vehicle, may be configured to perform any of the operations described with reference to FIGS. 5A-6B, such as, for example, payload retrieval, adaptive suspension, etc. For example, the chassis 703 of the rover 702 may be lowered with respect to the reference to allow for ease of user ingress and egress on the crew stand 763. A second crew stand 763 may be interfaced to the front of the rover 702 (e.g., in place of the modular payload 752) to enable additional users (e.g., crew members) to ride on the rover 702.

As shown in FIG. 7D, in some embodiments, the surface science functional module 766 may be interfaced with the rover 702 to configure the rover 702 as a science mobility system. In some embodiments, the surface science functional module 766 may be interfaced with the medial member 707 of the rover chassis. For example, with the surface science functional module 766 linked to the medial member 707 of the chassis of the rover 702, the rover 702 is configured to (e.g., autonomously or via external control) perform scientific mission objectives. As shown, the remote science mast 767, the robotic arm 768 and the solar panel array 711 may be deployed for use in conducting surface science data collection, such as collecting soil/dust samples (e.g., stored within compartment 769), collecting rocks, performing surface scans, and the like. For example, the remote science mast 767 and the robotic arm 768 may be electrically coupled to the rover ECU (e.g., corresponding to ECU 104 in FIGS. 1A-1B), allowing the systems of the rover (e.g., motor assembly, suspension system, latching system, etc.) to be operated with the remote science mast 767 and the robotic arm 768. As shown in FIG. 7D, the rover 702 may transport a modular payload 752 as the rover 702 conducts surface science data collection (e.g., for storing the collected samples). In some embodiments, the surface science functional module 766 may not extend below (e.g., vertically) the bottom surface of the medial member 707 (e.g., to prevent the surface science functional module 766 and its components from interfering with payload retrieval while the surface science functional module 766 is interfaced with the rover chassis).

Figure 7E:
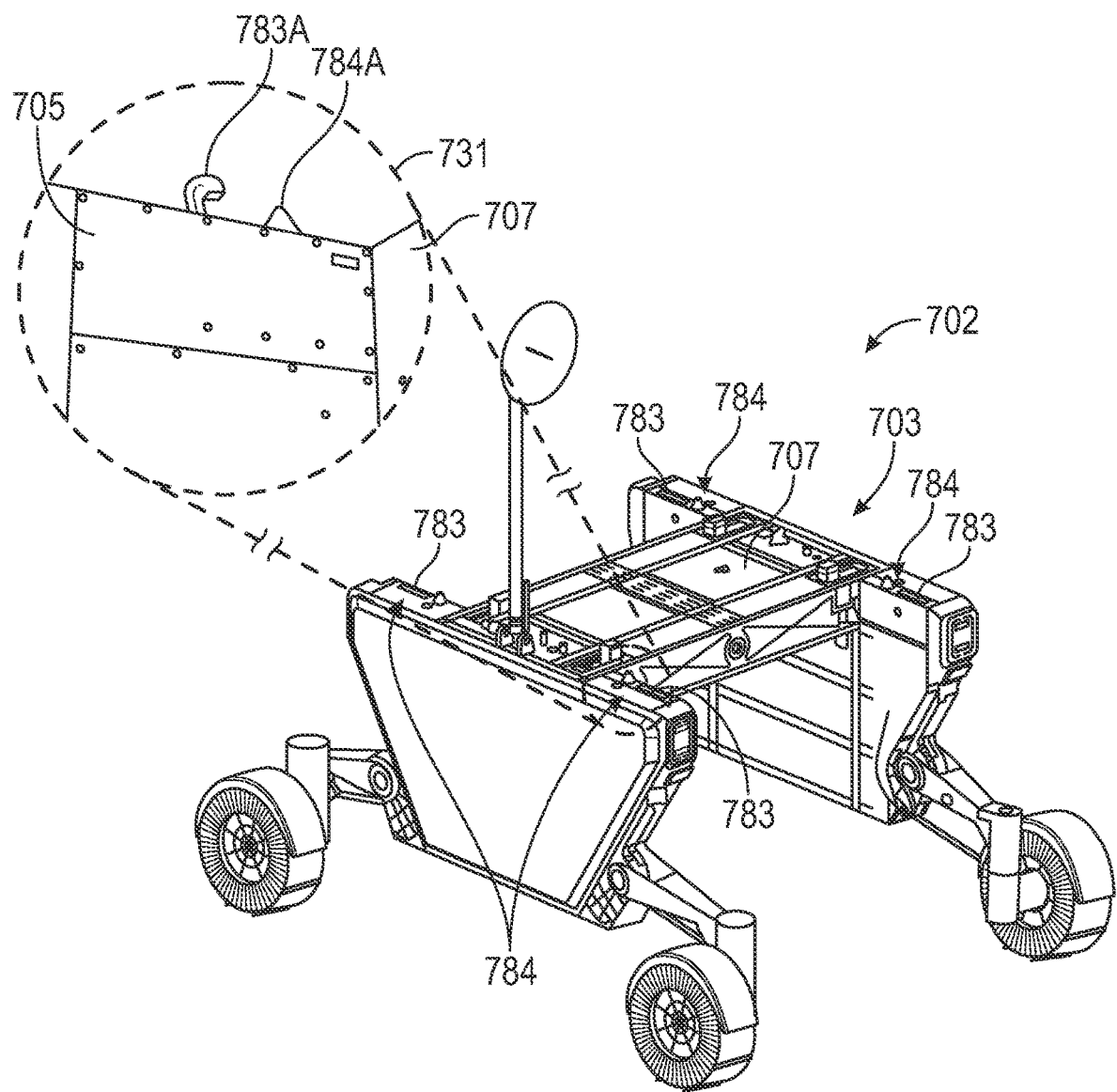

FIG. 7E illustrates an example top-deck interface structure of the rover 702 for interfacing a functional module to the chassis 703 of the rover 702. As described above, functional modules may be physically and communicatively linked to the chassis 703 to allow the functional modules to communicate with the rover ECU to perform one or more actions associated with the functional modules. For example, a respective functional module (e.g., the vehicle functional module 764 and/or the surface science functional module 766) may be linked to the rover ECU via the medial member 707. In some embodiments, the respective functional module may additionally or alternatively be linked to the rover ECU via a top-deck interface structure, as described below.

As shown in FIG. 7E, the top-deck interface structure may comprise a conical latch 784 and a top hook 783 disposed on a top surface of the chassis 703. For example, the conical latch 784 and the top hook 783 may be disposed at or near an edge of a flank of the chassis 703. As shown in the detailed view 731 (e.g., a planar view of an interior portion of the first side 705 of the rover chassis 703), the first side 705 of the chassis 703 may include a first conical latch 784a and a first top hook 783a disposed on the top surface of the first side 705. In some embodiments, the first top hook 783a may be configured to selectively protrude upward from the top surface of the first side 705. In some embodiments, the respective functional module (e.g., such as the vehicle functional module 764 or the surface science functional module 766) may be placed atop two or more of the conical latches 784 and the top hooks 783 at either end of the chassis 703 to link the respective functional module to the rover ECU, rather than interfaced directly to the medial member 707 as shown in FIGS. 7C-7D. For example, the respective functional module may comprise one or more corresponding conical recesses (e.g., similar or corresponding to the guides 786 in FIG. 7A) and hook receptacles (e.g., similar or corresponding to the receptacles/pins 765 in FIG. 7A) configured to receive/interface with the conical latches 784 and the top hooks 783, respectively. For example, the one or more corresponding conical recesses and hook receptacles may be provided in a bottom/interior portion of the respective functional module that rests atop the edges of the flanks of the chassis 703. In some embodiments, the top hooks 783 may be controllable by the rover ECU to protrude upward to engage with the hook receptacles of the respective functional module when the respective functional module is placed atop the conical latches 784, such that the respective functional module is secured to the chassis 703.

In some examples, with the respective functional module secured to the chassis 703 (e.g., as similarly shown in FIGS. 7C-7D), the chassis 703 may support a weight of the respective functional module. For example, referring to FIG. 7C, when the vehicle functional module 764 is attached to a rear end of the rover 702, the top portions of the chassis 703 at the rear end of the rover 702 optionally exert an upward force on the bottom portion of the vehicle functional module 764, thereby supporting the weight of the vehicle functional module 764 while the vehicle functional module 764 is attached to the rover 702 and/or while the rover 702 is in motion (e.g., or performing some other action). Similarly, with reference to FIG. 7D, when the surface science functional module 766 is attached to a front end of the rover 702, the top portions of the chassis 703 at the front end of the rover 702 optionally exert an upward force on the bottom portion of the surface science functional module 766, thereby supporting the weight of the surface science module 766 while the surface science functional module 766 is attached to the rover 702 and/or while the rover 702 is in motion (e.g., or performing some other action).

It should be understood that, although not explicitly described herein, the rover 702 may be configured to perform various autonomous and manual operations as the rover 702 functions as a rover vehicle and/or as a science mobility system. Additionally or alternatively, additional types of functional modules may be interfaced with the rover 702 to adapt the operations of the systems of the rover 702 to perform one or more specific actions. For example, a drilling functional module may be interfaced with the rover 702 to perform drilling actions on the planetary surface, or a crew rescue functional module may be interfaced with the rover 702 (e.g., containing a stretcher/gurney) for transporting an injured person, and the like.

Multi-Rover Retrieval, Transportation, and/or Deposition of Large Payloads

Attention is now directed towards example coordinated operations of a plurality of rovers in retrieving a respective payload for the subsequent transportation and/or deposition of the respective payload. The respective payload may be located at a respective location on a planetary surface (e.g., the surface of a moon) which, for ease of illustration and explanation, is an even (e.g., substantially flat) location on the planetary surface. The respective payload may be a large payload (e.g., a payload having a size exceeding the retrieval and transportation capabilities of a single rover). As described below, a system including a plurality of rovers may be provided for performing joint actions involving large payloads, where the various operations of each individual rover of the system may be (e.g., at least substantially and/or autonomously) controlled by the rover ECU.

Figure 8A:
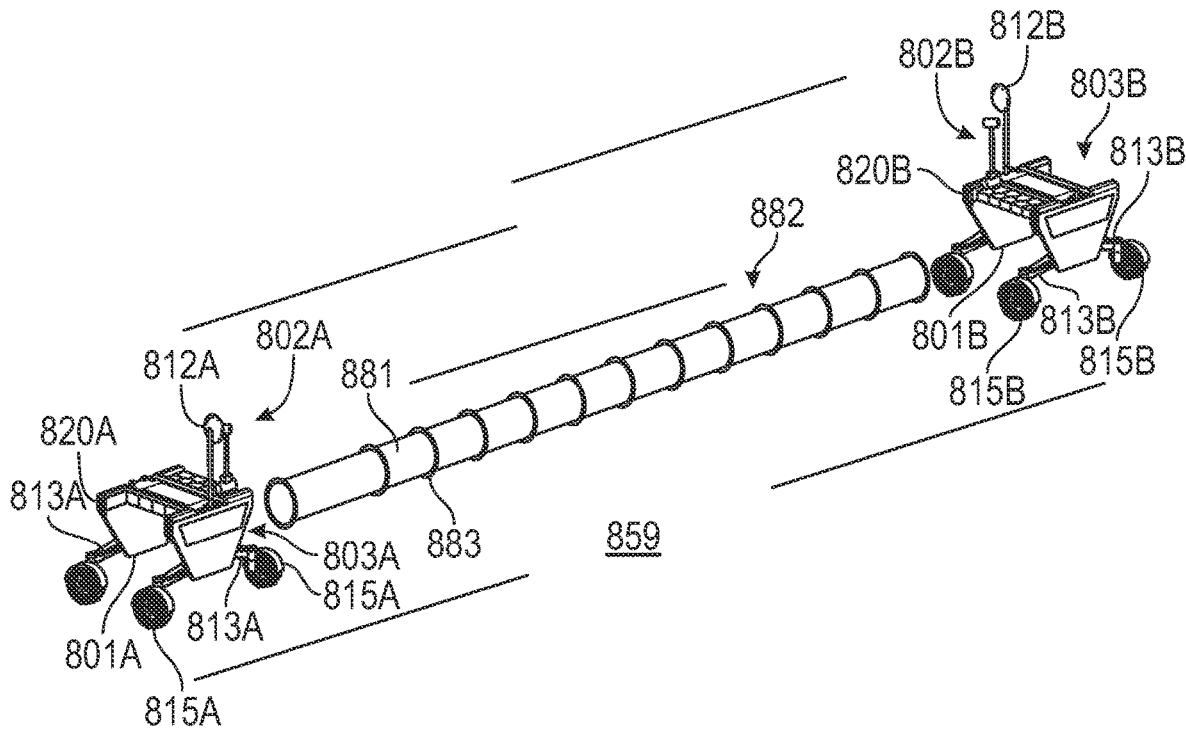
FIGS. 8A-8D illustrate an example retrieval and transportation of a large payload using a multi-rover system according to some embodiments of the disclosure.

FIGS. 8A-8D illustrate an example retrieval and transportation of a large payload 882 using a multi-rover system according to some embodiments of the disclosure. In some embodiments, the multi-rover system optionally corresponds to system 150 shown previously in FIG. 1B. As shown in FIG. 8A, the multi-rover system may include a first rover 802a and a second rover 802b. In some embodiments, the first rover 802a and the second rover 802b optionally each correspond to the rover 202/502/602 shown previously in FIGS. 2A-2B, 5A-5H, and 6A-6B, respectively. As discussed previously with reference to FIG. 1B, the respective ECUs of the first rover 802a and the second rover 802b may be configured to communicate via their respective communications units (e.g., communication units 116a and 116b). For example, as discussed below, the ECU of the first rover 802a may be configured to communicate with the ECU of the second rover 802b via a communications link between their respective communications units to perform joint actions involving the large payload 882.

As shown in FIG. 8A, the large payload 882 may have a size (e.g., a height, width, and/or length) that may exceed the retrieval and/or transportation capabilities of a single rover. In some embodiments, a respective payload may additionally or alternatively have an orientation, a shape, and/or a vulnerability (e.g., a sensitivity or fragility) that may exceed the retrieval and/or transportation capabilities of a single rover. Accordingly, a plurality of rovers may be provided for performing coordinated retrieval, transportation, and/or deposition of the respective payload. As shown in FIG. 8A, for example, the large payload 882 may be a large pipe having a smooth and cylindrical surface 881 and a plurality of circular projections 883 disposed along the surface 881.

In some embodiments, the first rover 802a and the second rover 802b may, via their respective one or more sensors 820a and 820b, respectively, detect and identify a location of the payload 882 on the surface on which the rovers are operating. As shown in FIG. 8A, after identifying the location of the payload 882, the first rover 802a and the second rover 802b may be operated (e.g., via their respective rover ECUs) to (e.g., autonomously and concurrently) approach the payload 882. For example, the respective rover ECUs may concurrently drive a first plurality of propulsion components 815a (e.g., using the motor assembly (e.g., corresponding to motor assembly 322 in FIG. 3A) associated with each propulsion component) of the first rover and a second plurality of propulsion components 815b (e.g., using the motor assembly (e.g., corresponding to motor assembly 322 in FIG. 3A) associated with each propulsion component) of the second rover to drive the first rover 802a and the second rover 802b toward the payload 882. In some embodiments, the first rover 802a optionally communicates with the second rover 802b using their respective antennas 812a and 812b (e.g., in communication with their respective communications units).

In some embodiments, as the first rover 802a and the second rover 802b are driven toward the payload 882, the respective rover ECUs may utilize data (e.g., image data) captured via the respective one or more sensors 820a and 820b to position the respective interiors of each chassis above and/or around respective portions of the payload 882. For example, first captured data may be utilized by the ECU of the first rover 802a to position the interior 801a of the chassis 803a of the first rover 802a above and/or around a first portion of the payload 882 (e.g., a first end of the payload 882), and second captured data may be utilized by the ECU of the second rover 802b to position the interior 801b of the chassis 803b of the second rover 802b above and/or around a second portion of the payload 882 (e.g., a second end of the payload 882). Particularly, as discussed below, the first rover 802a and the second rover 802b may concurrently position themselves above the first portion of the payload 882 and the second portion of the payload 882, respectively, to retrieve the payload 882.

In some embodiments, when the first rover 802a and the second rover 802b are each positioned above the payload 882, the first plurality of propulsion components 815a of the first rover 802a and the second plurality of propulsion components 815b of the second rover 802b optionally cease to be driven, such that the first rover 802a and the second rover 802b remain stationary above the payload 882. In some embodiments, the first rover 802a and the second rover 802b may cease driving forward when the first rover 802a and the second rover 802b detect that respective portions (e.g., a threshold amount of a top surface of each of the first end and the second end of the payload 882, respectively) of the payload 882 are positioned below the first rover 802a and the second rover 802b. In some embodiments, the first rover 802a and the second rover 802b each comprises a suspension system (e.g., corresponding to suspension system 310 in FIGS. 3A-3B) disposed within their respective chassis 803a and 803b. In some embodiments, the suspension system of the first rover 802a and the suspension system of the second rover 802b each comprises the same or similar components and/or characteristics as the rover suspension system 310 described previously with reference to FIGS. 3A-3C. As discussed above with reference to FIGS. 3A-3C, the suspension system of the first rover 802a may form a part of each control leg 813a of the first rover 802a and the suspension system of the second rover 802b may form a part of each control leg 813b of the second rover 802b. In some embodiments, when the first rover 802a is positioned above a first portion of the payload 882 and the second rover 802b is positioned above a second portion of the payload 882, the suspension system of each control leg 813a of the first rover 802a and the suspension system of each control leg 813b of the second rover 802b may be selectively operated (e.g., by their respective ECUs) to initiate the process of retrieving the payload 882. Particularly, the suspension system of the first rover 802a and the suspension system of the second rover 802b may be operated (e.g., according to the methods described previously with reference to FIGS. 5B-5E) to selectively lower the chassis 803a of the first rover 802a and the chassis 803b of the second rover 802b with respect to a reference (e.g., the surface 859 on which the first rover 802a and the second rover 802b are placed, or a point or plane on/along a bottom surface of the chassis 803a and 803b of the first rover 802a and the second rover 802b, respectively) and toward the top surface 881 of the payload 882, as discussed below.

In some embodiments, the first rover 802a may communicate with the second rover 802b via their respective antennas 812a and 812b to initiate coordinated retrieval of the payload 882. As similarly described with reference to FIGS. 5A-5H, the chassis 803a of the first rover 802a and the chassis 803b of the second rover 802b are selectively lowered with respect to the reference (e.g., the surface 859 on which the first rover 802a and the second rover 802b are placed) and thus oriented closer toward the top surface of the first portion (e.g., the first end) and the second portion (e.g., the second end) of the payload 882, respectively. The lowering of the chassis 803a of the first rover and the lowering of the chassis 803b of the second rover 802b may occur concurrently (e.g., initiated at substantially the same instance in time as coordinated by the ECU of the first rover 802a and the ECU of the second rover 802b). For example, after the ECU of the second rover 802b has determined that the chassis 803b of the second rover 802b is positioned above the second portion of the payload 882, the ECU of the second rover 802b may send one or more signals to the ECU of the first rover 802a conveying that the second rover 802b is positioned above the second portion of the payload 882. Once the ECU of the first rover has determined that the chassis 803a of the first rover 802a is positioned above the first portion of the payload 882, and after receiving the one or more signals from the ECU of the second rover 802b, the ECU of the first rover 802a may communicate one or more commands to the ECU of the second rover 802b (e.g., via their respective communications antennas 812a and 812b) to trigger the ECU of the second rover 802b to initiate lowering of the chassis 803b of the second rover 802b when the ECU of the first rover 802a concurrently initiates lowering of the chassis 803a of the first rover 802a. As described in detail with respect to FIGS. 5B-5E, respective orientations of the first plurality of control legs 813a of the first rover 802a and respective orientations of the second plurality of control legs 813b of the second rover 802b may be changed (e.g., in response to operation of their respective suspension systems) to cause the chassis 803a of the first rover 802a and the chassis 803b of the second rover 802b to be selectively lowered toward the top surface of the first portion of the payload 882 and the second portion of the payload 882, respectively.

In some embodiments, the suspension system of the first rover 802a and the suspension system of the second rover 802b may be operated (e.g., by their respective rover ECUs) to lower the chassis 803a of the first rover 802a and the chassis 803*b* of the second rover 802*b* until the (e.g., bottom surface of the medial member of the) chassis 803*a* of the first rover 802*a* and the chassis 803*b* of the second rover 802*b* are lowered close enough to the top surface of the first portion and of the second portion of the payload 882 to retrieve the payload 882. For example, the ECU of the first rover 802*a* and the ECU of the second rover 802*b* may each be configured to determine a respective angle of a portion of each chassis 803*a* and 803*b*, respectively, with respect to the reference (e.g., the surface 859, or the top surface of the payload 882). In some embodiments, the respective angle of the portion of each chassis 803*a* and 803*b* optionally corresponds to a distance between (e.g., a bottom surface of the medial member of) each chassis 803*a* and 803*b* and the top surface of the first portion of the payload 882 and the second portion of the payload 882. In some embodiments, when the computed respective angle corresponds to a relative threshold angle (e.g., relative to the size of the payload, where the threshold angle is 30 degrees, 35 degrees, 45 degrees, 50 degrees, 60 degrees, 65 degrees, 70 degrees, etc.) with respect to the reference (e.g., the surface 859, or the top surface 881 of the payload 882), the ECU of the first rover 802*a* and the ECU of the second rover 802*b* may operate the suspension system of the first rover 802*a* and the suspension system of the second rover 802*b* to cease lowering the chassis 803*a* of the first rover 802*b* and the chassis 803*b* of the second rover 802*b*, respectively.

Figure 8B:
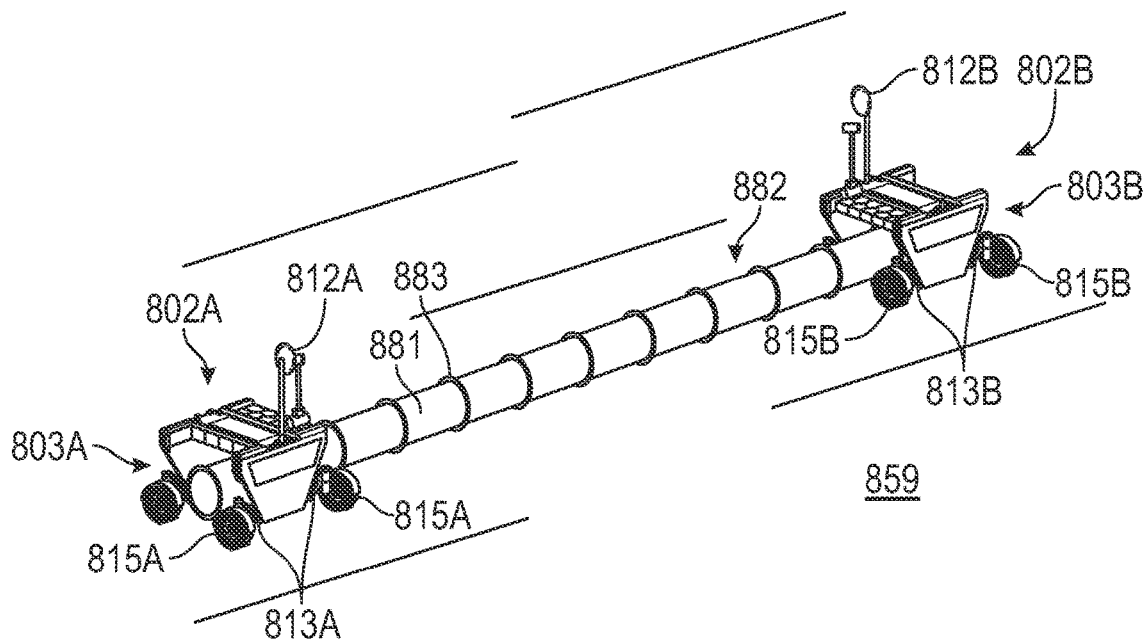

In some embodiments, different sized payloads (or portions of the payloads) will have different associated angles at which the first rover 802*a* and/or the second rover 802*b* may stop lowering to retrieve the payloads. For example, a taller payload (e.g., a payload having a greater height dimension than that shown in FIGS. 8A-5D, or a payload having taller portions with which each rover may interlock) may require the first rover 802*a* and/or the second rover 802*b* to stop lowering at a first relative threshold angle that is smaller than a second relative threshold angle that may be required for retrieving a shorter modular payload (e.g., a payload having a smaller height dimension than that shown in FIGS. 8A-5D, or a payload having shorter portions at which each rover may interlock with). In some such embodiments, the first rover 802*a* may communicate with the second rover 802*b* (e.g., via their respective antennas 812*a* and 812*b* associated with their respective communications unit) to determine an instance in time at which each rover has lowered their respective chassis 803*a*/803*b* to meet the relative threshold angle with respect to a respective portion of the payload 882 that is beneath the interior portion of the chassis 803*a*/803*b*. For example, as shown in FIG. 8B, the first rover 802*a* may be lowered a first amount according to the above methods to position the chassis 803*a* to meet the relative threshold angle with respect to the top surface of the first portion (e.g., the first end) of the payload 882 and the second rover 802*b* may be lowered a second amount according to the above methods to position the chassis 803*b* to meet the relative threshold angle with respect to the top surface of the second portion (e.g., the second end) of the payload 882. In some embodiments (e.g., in which the payload 882 has a consistent height/diameter throughout a body of the payload 882 and/or the surface 859 on which the payload 882 is placed is flat/even), the first rover 802*a* may be lowered the same amount as the second rover 802*b* is lowered. In some embodiments (e.g., in which the first end/portion of the payload 882 has a height/diameter that is different from that of the second end/portion of the payload 882 and/or the surface 859 on which the payload 882 is placed is uneven), the first rover 802*a* may be lowered a different amount than an amount that the second rover 802*b* is lowered.

In some embodiments, when the chassis 803*a* of the first rover 802*a* and the chassis 803*b* of the second rover 802*b* have been lowered with respect to the reference (e.g., the surface 859 or the top surface of the first portion and of the second portion of the payload 882) to a respective elevation above the top surface 881 of the payload 882 (e.g., abutting the top surface of the payload 882 or within 2 cm, 5 cm, 7 cm, 10 cm, 15 cm, etc. above the top surface of the payload 882) to at least partially surround the first portion and the second portion of the payload 882, as shown in FIG. 8B, the ECU of the first rover 802*a* may communicate with the ECU of the second rover 802*b* (e.g., via antennas 812*a* and 812*b*) to initiate one or more latching operations for retrieval of the payload 882. In some embodiments, once the ECU of the second rover 802*b* has determined that the chassis 803*b* of the second rover 802*b* has been lowered to at least partially surround the second portion of the payload 882, the ECU of the second rover 802*b* may send one or more signals to the ECU of the first rover 802*a* to convey that the chassis 803*b* of the second rover 802*b* is at the respective elevation above the top surface 881 of the second portion of the payload 882. Once the ECU of the first rover 802*a* has determined that the chassis 803*a* of the first rover 802*a* has been lowered to at least partially surround the first portion of the payload 882, and after receiving the one or more signals from the ECU of the second rover 802*b*, the ECU of the first rover 802*a* may communicate one or more commands to the ECU of the second rover 802*b* (e.g., via their respective communications antennas 812*a* and 812*b*) to trigger the ECU of the second rover 802*b* to initiate attaching of the chassis 803*b* of the second rover 802*b* to the second portion of the payload 882 when the ECU of the first rover 802*a* concurrently initiates attaching of the chassis 803*a* of the first rover 802*a* to the first portion of the payload 882. As described above with reference to FIGS. 5F-5H, the first rover 802*a* and the second rover 802*b* may each comprise a latch system configured to latch with a respective portion of the payload 882. In some embodiments, the rover latch system optionally corresponds to the latch system 206/506 shown in FIGS. 2B and 5F-5H, respectively.

As described previously with respect to FIG. 5F, the latch system (e.g., latch system 506) of the first rover 802*a* and the latch system of the second rover 802*b* may each be disposed within the chassis 803*a* of the first rover 802*a* and the chassis 803*b* of the second rover 802*b*, respectively. In some embodiments, the rover latch system of the first rover 802*a* and the rover latch system of the second rover 802*b* each comprise the same or similar components and/or characteristics as the rover latch system 506 described previously with reference to FIGS. 5F-5H. For example, the latch system of each of the first rover 802*a* and the second rover 802*b* may comprise a plurality of hooks/appendages (e.g., 553) that may be configured to protrude outwardly from within interior sides of the chassis 803*a*/803*b* to engage with and/or grip a respective portion of payload 882. In some embodiments, the plurality of hooks of each latch system may be configured to accommodate various possible shapes, surface textures, and/or surfaces of the payload 882. For example, the plurality of hooks of each latch system may comprise or be coated/lined with a friction material (e.g., a rubber-like material) to enable the plurality of hooks to grip the respective portion of the payload (e.g., such as surface 881), and/or the plurality of hooks may be provided with a shape (e.g., an L-shape) and/or a length that enables the plurality of hooks to engage with a bottom portion/surface of the respective portion of the payload. The first rover 802a and the second rover 802b may thus be configured to together retrieve any payload so long as the payload fits within the interior of each of their respective rover chassis 803a/803b. As described above with reference to FIG. 5F, the plurality of hooks of each latch system may be controllable via one or more motors (e.g., 555) that cause the plurality of hooks of each latch system to protrude from the interior portions of the chassis 803a of the first rover 802a and the chassis 803b of the second rover 802b (e.g., according to the methods described previously in FIGS. 5F-5H).

In some embodiments, the one or more motors of the latch system of the first rover 802a and of the second rover 802b may each be controllable to selectively cause the plurality of hooks to engage with the first portion (e.g., the first end) and the second portion (e.g., the second end) of the payload 882, respectively. For example, in FIG. 8B, the ECU of the first rover 802a may cause the plurality of hooks of the latch system of the first rover 802a to engage with and/or grip the first end of the payload 882. Concurrently, the ECU of the second rover 802a may cause the plurality of hooks of the latch system of the second rover 802b to engage with and/or grip the second end of the payload 882. For example, as mentioned above with respect to FIG. 8A, the payload 882 may comprise the surface 881 and the circular projections 883. As shown in FIG. 8B, the circular protrusions 883 may create a spacing between the surface 881 and the surface 859 on which the payload 882 is placed. The plurality of hooks of the latch system of each of the first rover 802a and the second rover 802b may thus grip a bottom portion of the surface 881 that is between a bottom portion of the circular protrusions 883 and the surface 859. The plurality of hooks of the latch system of the first rover 802a and the plurality of hooks of the latch system of the second rover 802b may thus securely retrieve the first portion and the second portion of the payload 882, respectively.

Thus, as outlined above, the system comprising the first rover 802a and the second rover 802b may be autonomously operated to locate, approach, and retrieve a large payload for subsequent transportation and/or deposition of the large payload at a respective location on the surface 859 (e.g., the lunar surface). As discussed above, the retrieval of the large payload according to the above example processes provides for an input-free, effective, and long-lasting mobility platform which may greatly reduce time and resources spent manually loading, transporting, and unloading large payloads. Further, as an advantage, efforts and resources may be focused and allocated toward more significant and/or specialized lunar mission objectives in which human input may be required, such as exploration, testing, construction and the like.

In some embodiments, following the retrieval of the payload 882, the ECU of the first rover 802a may communicate with the ECU of the second rover 802b to initiate processes for transporting and/or depositing the payload 882. In some embodiments, once the ECU of the second rover 802b has determined that the plurality of latches of the second rover 802b have been caused to engage with the second portion (e.g., the second end) of the payload 882, the ECU of the second rover 802b may send one or more signals to the ECU of the first rover 802a to convey that the chassis 803b of the second rover 802b is attached to the section portion of the payload 882. Once the ECU of the first rover 802a has determined that the plurality of latches of the first rover 802a have been caused to engage with the first portion (e.g., the first end) of the payload 882, and after receiving the one or more signals from the ECU of the second rover 802b, the ECU of the first rover 802a may communicate one or more commands to the ECU of the second rover 802b (e.g., via their respective communications antennas 812a and 812b) to trigger the ECU of the second rover 802b to initiate raising of the chassis 803b of the second rover 802b when the ECU of the first rover 802a concurrently initiates raising of the chassis 803a of the first rover 802a. For example, the suspensions system of the first rover 802a and the suspension system of the second rover 802b may be concurrently operated to change respective orientations of the first plurality of control legs 813a of the first rover 802a and respective orientations of the second plurality of control legs 813b of the second rover 802b, respectively, to gradually raise the chassis 803a of the first rover 802a and the chassis 803b of the second chassis 803b in a coordinated manner. In some embodiments, the chassis 803a of the first rover 802a and the chassis 803b of the second rover 802b may be gradually raised at a same rate to maintain the payload 882 within a level (e.g., flat) orientation with respect to the surface 859 as the chassis 803a of the first rover 802a and the chassis 803b of the second rover 802b are raised. Raising the first portion of the payload 882 at a different rate from the second portion of the payload 882 could otherwise cause the first portion of the payload 882 and/or the second portion of the payload 882 to become unattached from the plurality of hooks of the chassis 803a of the first rover 802a and/or the plurality of hooks of the chassis 803b of the second rover 802b, respectively. The suspension system of the first rover 802a and the suspension system of the second rover 802b may each be operated to raise their respective chassis 803a/803b and the payload 882 attached thereto according to any of the methods described previously with respect to FIGS. 5A-5H. The chassis 803a of the first rover 802a and the chassis 803b of the second rover 802b may be raised to an upright position to maintain a ground clearance for a bottom surface of the payload 882 during transportation.

In some embodiments, as mentioned above, the first end/portion of the payload 882 may have a height/diameter that is different from that of the second end/portion of the payload 882. Additionally or alternatively, in some embodiment, the surface 859 on which the payload 882 is placed may be uneven (e.g., may contain bumps and/or dips), which may cause the first portion and/or the second portion of the payload 882 to be oriented on the surface 859 at different heights. In some such embodiments, the first rover 802a may be raised a different amount than an amount that the second rover 802b is raised. For example, in an instance in which the first portion of the payload 882 has a diameter that is greater than that of the second portion of the payload 882, the ECU of the first rover 802a may cause the chassis 803a of the first rover 802a to be raised a first amount, and the ECU of the second rover 802b may cause the chassis 803b of the second rover 802b to be raised a second amount, greater than the first amount. As another example, in an instance in which the second portion of the payload 882 is placed on an elevated surface of the surface 859 (e.g., such as a bump in the surface 859), such that the second portion of the payload 882 is at a height that is greater than that of the first portion of the payload 882, the ECU of the first rover 802a may cause the chassis 803a of the first rover 802a to be raised a first amount, and the ECU of the second rover 802b may cause the chassis 803b of the second rover 802b to be raised a second amount, less than the first amount. Additionally, in some embodiments, the chassis 803a of the first rover 802a may be raised at a different rate than the chassis 803b of the second rover 802b to account for differences in payload height and/or orientation.

Figure 8C:
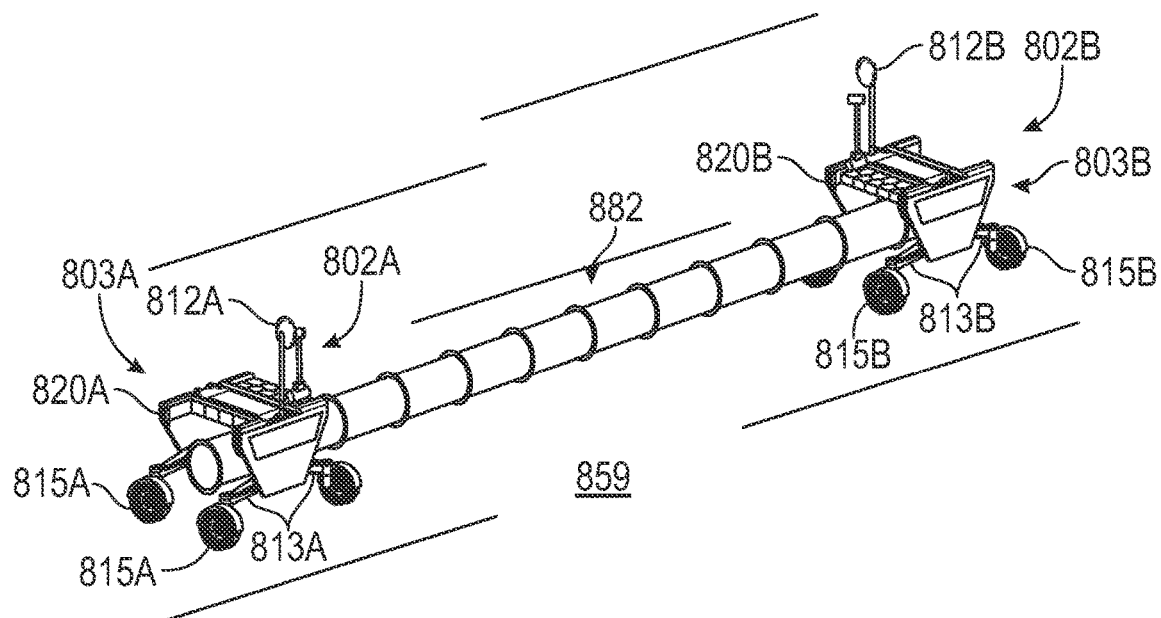

In some embodiments, once the chassis 803a of the first rover 802a and the chassis 803b of the second rover 802b are in the raised position, as shown in FIG. 8C, motor assembly of the first rover 802a and the motor assembly of the second rover 802b may be operated by their respective rover ECUs to drive the plurality of propulsion components 815a of the first rover 802a and the plurality of propulsion components 815b of the second rover 802b. For example, the first rover 802a may communicate with the second rover 802b (e.g., via their respective antennas 812a and 812b) to initiate transportation of the payload 882 to a respective location on the surface 859. In some embodiments, the motor assembly of the first rover 802a (e.g., particularly, the steering actuator coupled to each propulsion component) may be operated to cause the propulsion components 815a of the first rover 802a to face (e.g., to be steered in) a respective direction corresponding to the respective location. Similarly, the motor assembly of the second rover 802b (e.g., particularly, the steering actuator coupled to each propulsion component) may be operated to cause the propulsion components 815b of the second rover 802b to face (e.g., to be steered in) the respective direction corresponding to the respective location. In some embodiments, the motor assembly of the first rover 802a (e.g., particularly, the wheel actuator coupled to each propulsion component) may be operated to cause the propulsion components 815a of the first rover 802a to be driven (e.g., to rotate) in the respective direction toward the respective location. Concurrently, the motor assembly of the second rover 802b (e.g., particularly, the wheel actuator coupled to each propulsion component) may be operated to cause the propulsion components 815b of the second rover 802b to be driven (e.g., to rotate) in the respective direction toward the respective location.

In some embodiments, the propulsion components 815a of the first rover 802a and the propulsion components 815b of the second rover 802b may each be driven (e.g., by their respective motor assemblies) at a same speed (e.g., 1 m/s, 2 m/s, 2.5 m/s, 3.5 m/s, 5 m/s, 8 m/s, 10 m/s, etc.) and/or at zero (e.g., or constant) acceleration to smoothly and securely transport the payload 882 to the respective location. For example, as the first rover 802a travels at a respective speed, the first portion (e.g., the first end) of the payload 882 attached to the chassis 803a of the first rover 802a may also travel (e.g., be transported by the first rover 802a) toward the respective location at the respective speed. Likewise, as the second rover 802b travels at the respective speed, the second portion (e.g., the second end) of the payload 882 attached to the chassis 803b of the second rover 802b may also travel (e.g., be transported by the second rover 802b) toward the respective location at the respective speed. The payload 882 may thus be transported to the respective location at the respective speed as determined by the relative speeds of motion of the first portion and the second portion of the payload 882, which may also allow the payload 882 to remain within one or more orientations (e.g., remain substantially level) with respect to the surface 859 during transport. The ECU of the first rover 802a may remain in constant communication with the ECU of the second rover 802b to maintain the speeds of the first rover 802a and the second rover 802b at the respective speed, and thus to prevent the first portion of the payload 882 and/or the second portion of the payload 882 from becoming unattached from the chassis 803a of the first rover 802a and/or the chassis 803b of the second rover 802b.

In some embodiments, the first rover 802a and the second rover 802b may be configured to adjust their relative orientations with respect to the other, to change a spatial orientation of the payload 882 during the coordinated transportation of the payload 882. For example, the first rover 802a and the second rover 802b may be reoriented with respect to the other to transport the payload 882 in a horizontal orientation (e.g., rather than a vertical orientation, as shown in FIG. 8C), such that an axis that extends through the payload 882 is substantially perpendicular to an axis parallel to the direction of travel of the first rover 802a and the second rover 802b. The ECU of the first rover may operate the motor assembly coupled to each of the propulsion components 815a of the first rover 802a to cause the first rover 802a to travel at a reduced speed (e.g., and/or to come to a stop). The ECU of the second rover 802b may operate the motor assembly coupled to each of the propulsion components 815b to steer each of the propulsion components 815b and/or to cause the second rover 802b to travel at an increased speed (e.g., faster than a speed of the first rover 802a). As an illustrative example, from a top view (e.g., of that shown in FIG. 8C), the payload 882 may be rotated in a clockwise direction if the propulsion components 815b are steered toward the left as the second rover 802b travels in the respective direction, or the payload 882 may be rotated in a counter clockwise direction if the propulsion components 815b are steered toward the right as the second rover 802b travels in the respective direction. The ECU of the second rover 802b may then communicate with the ECU of the first rover 802a to trigger the ECU of the first rover 802a to operate the propulsion components 815a of the first rover 802a to jointly transport the payload 882 in a horizontal orientation.

As discussed below, during the coordinated transportation of the payload 882, the first rover 802a and/or the second rover 802b may encounter one or more occurrences of unevenness on the surface 859. In some embodiments, the suspension system of the first rover 802a and/or the suspension system of the second rover 802b may be configured to adapt to such occurrences of unevenness during transport, such that the chassis 803a of the first rover 802a and the chassis 803b of the second rover and/or the payload 882 may remain substantially level with respect to the (e.g., lunar) surface 859.

Figure 8D:
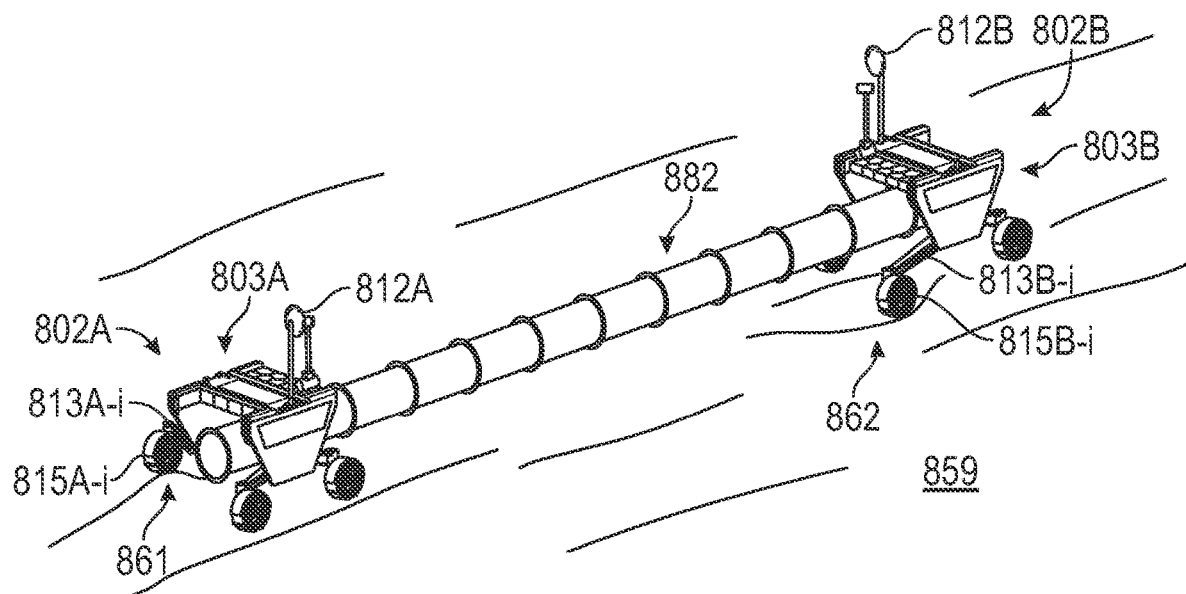

As shown in FIG. 8D, the first rover 802a and the second rover 802b may be transporting the payload 882 over the surface 859 toward the respective location. As mentioned above, the surface may include unevenness (e.g., obstacles or hindrances to travel, such as rocks, dips, craters, etc.). For extreme instances of unevenness, such as deep craters, the ECU of the first rover 802a and the ECU of the second rover 802b may be configured to detect a respective crater using their respective one or more sensors 820a and 820b. In such instances, the ECU of the first rover 802a may communicate with the ECU of the second rover 802b to initiate coordinated operation of the plurality of propulsion components 815a of the first rover 802a and the plurality of propulsion components 815b of the second rover 802b to steer the first rover 802a and/or the second rover 802b away from the respective crater and avoid potential damage to the first rover 802a and/or the second rover 802b and/or the payload 882.

In some instances, the first rover 802a and/or the second rover 802b may be unable to avoid unevenness in the surface 859. For example, the surface 859 contains vast stretches of unevenness and the only path to the respective destination may be through the portions of unevenness. In such instances, the first rover 802a and/or the second rover 802b may be configured to autonomously adapt to the unevenness in the surface 859 and maintain a ground clearance (e.g., and/or an orientation of the payload 882 within a range of orientations (e.g., substantially level with respect to the surface 859) between the bottom surface of the payload 882 and the surface 859 to prevent and/or significantly reduce potential collisions between the payload 882 and portions of the (e.g., lunar) surface 859, as discussed below.

As shown in FIG. 8D, in some instances, the surface 859 may include unevenness, such as bumps 861 and/or dips 862. In some embodiments, the rover suspension system of the first rover 802a and/or the rover suspension system of the second rover 802b may be controllable to operate according to a selected mode. As described previously with respect to FIGS. 6A-6B, in some embodiments, the suspension system of the first rover 802a and/or the suspension system of the second rover 802b may each be controllable to operate according to a passive suspension mode or one or more active suspension modes.

For example, as similarly described with respect to FIGS. 6A-6B, in the passive suspension mode, the ECU of the first rover 802a and/or the ECU of the second rover 802b forgo operation of the components of the suspension system of the first rover 802a and/or of the second rover 802b (e.g., corresponding to suspension system 310 in FIGS. 3A-3C). In some embodiments, while the first rover 802a and the second rover 802b transport the payload 882 and while employing passive suspension, components of the suspension system of each of the first rover 802a and the second rover 802b may dampen shocks to a given control leg 813a/813b that may be induced by contacts between a given propulsion component 815a/815b and a bump 861 or dip 862 in the terrain 689. In some such embodiments, the shock absorbed by a given propulsion component 815a/815b may be deflected (e.g., for smaller magnitudes of shock), or absorbed and dissipated (e.g., for greater magnitudes of shock) by the components (e.g., the spring 336 of the rocker shaft 333 in FIGS. 3A-3C) of the suspension system, as described in detail previously when referring to FIGS. 6A-6B. However, depending on the given propulsion component 815a/815b that contacts the bump or dip, the shocks may be deflected unevenly throughout the chassis 803a/803b.

Accordingly, the suspension system of the first rover 802a and/or the suspension system of the second rover 802b may each be controllable to operate according to the one or more active suspension modes to enable a more even deflection of shock throughout the rover chassis 803a/803b, and/or to enable maintaining the chassis 803a/803b at a level orientation (e.g., with respect to the surface 859). As described previously with reference to FIGS. 6A-6B, in some embodiments, in the one or more active suspension modes, the ECU of the first rover 802a and/or the ECU of the second rover 802b selectively operates one or more of the components of the suspension system of the first rover 802a and/or of the second rover 802b (e.g., corresponding to suspension system 310 in FIGS. 3A-3B). In some embodiments, while the first rover 802a and the second rover 802b transport the payload 882 and while employing active suspension, components of the suspension system of the first rover 802a and/or components of the suspension system of the second rover 802b may be selectively operated to adjust a relative orientation of a given control leg 813a/813b with respect to the surface 859 when a propulsion component 815a/815b coupled to the given control leg 813a/813b contacts or is about to contact (e.g., 1 s, 2 s, 5 s, 10 s, 15 s, etc. before contacting) a bump or dip in the surface 859.

For example, as described previously with respect to FIG. 6B, when a given propulsion component contacts unevenness in the terrain 859, such as bump 861 or dip 862, an elevation and/or orientation of the control leg 813a/813b coupled to the given propulsion component 815a/815b may change. For example, in response to a given propulsion component 815a/815b contacting a dip 862 in the surface 859, an elevation of the control leg 813a/813b coupled to the given propulsion component 815a/815b may decrease with respect to the surface 859 (e.g., due to the lower elevation of the dip 862). In some embodiments, in response to a given propulsion component contacting the dip 862 in the surface 859, a distance between the control leg 813a/813b (e.g., and the given propulsion component coupled to the control leg) and the chassis 803a/803b may increase. In response to a given propulsion component 815a/815b contacting a bump 861 in the surface 859, an elevation of the control leg 813a/813b coupled to the given propulsion component may increase with respect to the surface 859 (e.g., due to the higher elevation of the bump 861). In some embodiments, in response to a given propulsion component 815a/815b contacting the bump 861 in the surface 859, the distance between the control leg 813a/813b (e.g., and the given propulsion component coupled to the control leg) and the chassis 803a/803b may decrease.

In some embodiments, in response to detecting a change in the orientation of a given control leg 813a/813b, the ECU of the rover 802a/802b may selectively operate the suspension system of the given control leg to adjust an orientation of the control leg 813a/813b to the higher elevation of the bump 861 or the lower elevation of the dip 862. For example, as shown in FIG. 8D, the propulsion component 815a-i contacts the bump 861, which, as described above, causes the control leg 813a-i coupled to the propulsion component 815a-i to increase in elevation with respect to the surface 859. In response to the increase in elevation of the control leg 813a-i, the ECU of the first rover 802a may operate the suspension system of the control leg 813a-i to lower the elevation of the control leg 813a-i with respect to the surface 859. The suspension system may be operated according to any of the exemplary processes described previously with respect to FIGS. 6A-6B to change the orientation of the control leg 813a-i and raise the control leg 813a-i with respect to the surface 859, as shown in FIG. 8D. Additionally, in FIG. 8D, concurrently, the propulsion component 815b-i contacts the dip 862, which, as described above, causes the control leg 813b-i coupled to the propulsion component 815b-i to decrease in elevation with respect to the surface 859. In response to the decrease in elevation of the control leg 813b-i, the ECU of the second rover 802b may operate the suspension system of the control leg 813b-i to lower the elevation of the control leg 813b-i with respect to the surface 859. The suspension system may be operated according to any of the exemplary processes described previously with respect to FIGS. 6A-6B to change the orientation of the control leg 813b-i and lower the control leg 813b-i with respect to the surface 859, as shown.

In some embodiments, as the ECU of the first rover 802a and the ECU of the second rover 802b of the second rover 802b selectively operate the suspension system of the control leg 815a-i and the suspension system of the control leg 813b-i to adjust an orientation of each of the control leg 813a-i and the control leg 813b-i to maintain the chassis 803a of the first rover 802a and the chassis 803b of the second rover 802*b* each within an orientation that is (e.g., substantially) level with respect to the ground, the ECU of the first rover 802*a* may (e.g., continuously) communicate with the ECU of the second rover 802*b* to selectively change the speed at which the first rover 802*a* and the second rover 802*b* are traveling. For example, while the first rover 802*a* and the second rover 802*b* individually adjust orientations of their respective control legs (e.g., 813*a-i* and 813*b-i*), the speeds at which the first rover 802*a* and the second rover 802*b* may change to better enable the first rover 802*a* and/or the second rover 802*b* to adjust chassis orientation with respect to the surface 859, while also maintaining the payload 882 within an orientation that is substantially level with respect to the surface 859. For example, the ECU of the first rover 802*a* may selectively reduce the speed (e.g., by 0.5 m/s, 1 m/s, 1.5 m/s, 2 m/s, 3 m/s, etc.) at which the first rover 802*a* is traveling (e.g., via the motor assembly coupled to each of the propulsion components 815*a*) to allow the control leg 813*a-i* to adjust its orientation as the propulsion component 815*a-i* contacts the bump 861. The ECU of the first rover 802*a* may concurrently communicate with the ECU of the second rover 802*b* to cause the ECU of the second rover 802*b* to selectively reduce the speed at which the second rover 802*b* is traveling (e.g., by a same amount that the speed of the first rover 802*a* is reduced (e.g., by 0.5 m/s, 1 m/s, 1.5 m/s, 2 m/s, 3 m/s, etc.)). Additionally or alternatively, in some embodiments, the ECU of the second rover 802*b* may communicate with the ECU of the first rover 802*a* to cause the ECU of the first rover 802*a* to selectively reduce the speed at which the first rover 802*a* is traveling (e.g., by a same amount that the speed of the second rover is reduced). The coordinated reduction in traveling speed when at least one of the first rover 802*a* and the second rover 802*b* comes into contact with unevenness in the terrain 859 may thus prevent or significantly reduce the likelihood of the first portion and/or the second portion of the payload 882 becoming unattached from the chassis 803*a* of the first rover 802*a* and/or the chassis 803*b* of the second rover 802*b*.

Thus, as shown in FIG. 8D, the respective suspension systems of the control leg 813*a-i* and the control leg 813*b-i* may be selectively operated to autonomously adapt the orientations (e.g., elevations) of the control legs 813*a-i* and 813*b-i* to unevenness in the terrain. In this way, the chassis 803*a* of the first rover 802*a* and the chassis 803*b* of the second rover 802*b* may remain (substantially (e.g., within 2, 5, 10, 15, 20, 25, or 30 degrees of being)) level (e.g., about 0 degrees as measured along a surface (e.g., the top surface) of the medial member of each rover chassis 803*a*/803*b* (e.g., corresponding to medial member 207 in FIGS. 2A-2B)) with respect to a reference (e.g., the surface 859, or gravity) and maintain a ground clearance (e.g., and/or an orientation of the payload 882 within a range of orientations (e.g., substantially level with respect to the surface 859) between the bottom surface of the payload 882 and the unevenness in the surface (e.g., the bumps 861 and dips 862) to prevent and/or diminish impacts between the payload 882 and the surface 859. Thus, one advantage of the passive and active suspension modes of the rover suspension system during a transportation of a large payload is that the large payload may be safeguarded from damage during transport.

In some embodiments, once the first rover 802*a* and the second rover 802*b* arrive at the respective destination, the ECU of the first rover 802*a* may communicate with the ECU of the second rover 802*b* to concurrently lower the chassis 803*a* of the first rover 802*a* and the chassis 803*b* of the second rover 802*b* with respect to the surface 859 (e.g., according to the example processes described with reference to FIGS. 5A-5H). In some embodiments, once the ECU of the second rover 802*b* has determined that the chassis 803*b* of the second rover 802*b* has been lowered with respect to the surface 859, such that a bottom surface of the second portion of the payload 882 is in contact with the surface 859, the ECU of the second rover 802*b* may send one or more signals to the ECU of the first rover 802*a* to convey that the second portion of the payload 882 is in contact with the surface 859. Once the ECU of the first rover 802*a* has determined that the chassis 803*a* of the first rover 802*a* has been lowered with respect to the surface 859, such that a bottom surface of the first portion of the payload 882 is in contact with the surface 859, and after receiving the one or more signals from the ECU of the second rover 802*b*, the ECU of the first rover 802*a* may communicate one or more commands to the ECU of the second rover 802*b* (e.g., via their respective communications antennas 812*a* and 812*b*) to trigger the ECU of the second rover 802*b* to initiate release of the second portion of the payload 882 when the ECU of the first rover 802*a* concurrently initiates release of the first portion of the payload 882. In some embodiments, the latch assembly of the first rover 802*a* and the latch assembly of the second rover 802*b* may be concurrently operated (e.g., by their respective rover ECUs) to cause the plurality of hooks of the chassis 803*a* of the first rover 802*a* to disengage from the first portion (e.g., the first end) of the payload 882 and the plurality of hooks of the chassis 803*b* of the second rover 802*b* to disengage from the second portion (e.g., the second end) of the payload 882, thereby depositing the payload 882 at the respective location. The system comprising the first rover 802*a* and the second rover 802*b* may then be utilized to retrieve a second payload or perform another action as instructed by their respective rover ECUs (e.g., returning to a lunar outpost or lander).

Figure 9:
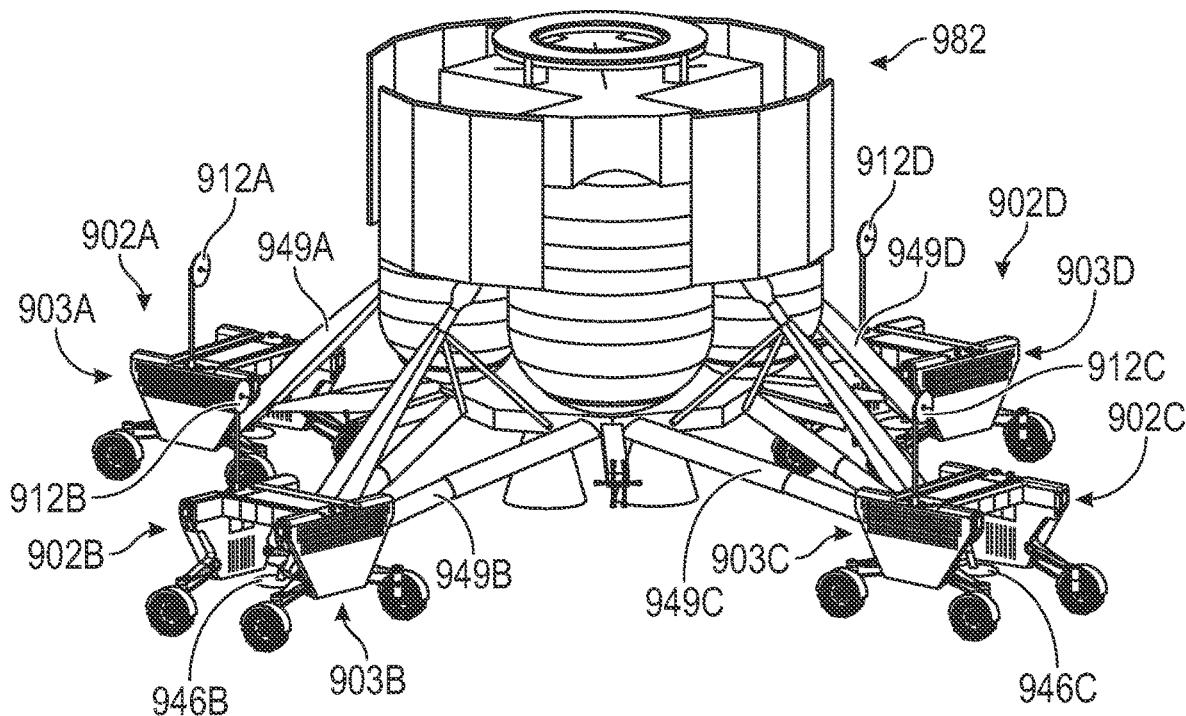
FIG. 9 illustrates another example retrieval of a large payload using a multi-rover system according to some embodiments of the disclosure.

FIG. 9 illustrates another example retrieval of a large payload 982 using a multi-rover system according to some embodiments of the disclosure. In some embodiments, the multi-rover system optionally corresponds to system 150 shown previously in FIG. 1B. In some instances, the payload 982 may be too large (e.g., in size and/or shape) and/or too heavy for one or even two rovers (e.g., first rover 802*a* and second rover 802*b* in FIGS. 8A-8D) to successfully retrieve, transport and/or deposit the payload 982. As shown in FIG. 9, for example, the payload 982 may be a planetary lander (e.g., a lunar lander). Accordingly, the multi-rover system may be provided with a suitable plurality of rovers for the secure and efficient retrieval, transportation and/or deposition of the large payload 982.

As shown in FIG. 9, the multi-rover system may include a first rover 902*a*, a second rover 902*b*, a third rover 902*c* and a fourth rover 902*d*. In some embodiments, the first rover 902*a*, the second rover 902*b*, the third rover 902*c* and the fourth rover 902*d* optionally each correspond to the rover 202/502/602 shown previously in FIGS. 2A-2B, 5A-5H, and 6A-6B, respectively. As discussed previously with reference to FIG. 1B, the respective ECUs of the first rover 902*a*, the second rover 902*b*, the third rover 902*c*, and the fourth rover 902*d* may be configured to communicate via their respective communications units. For example, as discussed below, the ECU of the first rover 902*a*, the ECU of the second rover 902*b*, the ECU of the third rover 902*c*, and the ECU of the fourth rover 902*d* may be configured to communicate with via a communications link connecting their respective communications units to perform joint actions involving the large payload 982.

As shown in FIG. 9, the planetary lander 982 may comprise a plurality of legs including a first leg 949*a*, a second leg 949b, a third leg 949c and a fourth leg 949d. The plurality of legs 949a-949d may be coupled to a plurality of pads in contact with the surface (e.g., the lunar surface) on which the payload 982 is placed. For example, as shown in FIG. 9, the second leg 949b of the planetary lander 982 may be coupled to a pad 946b and the third leg 949c of the planetary lander 982 may be coupled to a pad 946c. As described below, the multi-rover system may be utilized to retrieve, transport and/or deposit the planetary lander 982 by configuring the plurality of rovers 902a-902d to attach to the plurality of legs 949a-949d as effective anchor points.

As discussed above with reference to FIGS. 8A-8D, in some embodiments, the plurality of rovers 902a-902d may be configured to locate the planetary lander 982. For example, each rover of the plurality of rovers 902a-902d may utilize their respective sensors (e.g., the one or more sensors 820a-820b shown in FIGS. 8A-8D) to identify the payload 982. Particularly, in some embodiments, each rover of the plurality of rovers 902a-902d may be configured to identify a respective portion of the payload 982 to which the rover will attach. For example, the first rover 902a may identify the first leg 949a as a target for attachment, the second rover 902b may identify the second leg 949b as a target for attachment, the third rover 902c may identify the third leg 949c as a target for attachment, and the fourth rover 902d may identify the fourth leg 949d as a target for attachment. The respective ECUs of the plurality of rovers 902a-902d may communicate (e.g., via their respective antennas 912a-912d) to coordinate movement of the plurality of rovers 902a-902d toward the targeted plurality of legs 949a-949d of the planetary lander 982. As discussed herein with respect to FIGS. 8A-8D, each ECU of a given rover of the plurality of rovers 902a-902d may operate the plurality of propulsion components (e.g., propulsion components 815a/815b) of the given rover (e.g., via a motor assembly associated with each propulsion component) to cause the given rover to move toward a respective leg of the planetary lander 982. In some embodiments, the plurality of rovers 902a-902d may concurrently approach the targeted plurality of legs 949a-949d of the planetary lander 982 to initiate retrieval of the planetary lander 982.

In some embodiments, as discussed above, the plurality of rovers 902a-902d may be positioned above the plurality of pads (e.g., 946b, 946c) of the planetary lander 982, such that the chassis of each rover at least partially surrounds a portion of a corresponding leg of the planetary lander 982. As an illustrative example, the second rover 902b may be driven toward the second leg 949b of the planetary lander 982 until the chassis 903b (e.g., the medial member of the chassis) of the second rover 902b is positioned above the pad 946b, such that the interior portions of the chassis 903b of the second rover 902b at least partially surround the second leg 949b of the planetary lander 982. Each rover of the plurality of rovers 902a-902b may be positioned with respect to the planetary lander 982 in this way, as shown in FIG. 9.

In some embodiments, as discussed above, when each rover of the plurality of rovers 902a-902d is positioned above a corresponding leg of the plurality of legs 949a-949b of the planetary lander 982, the respective ECUs of the plurality of rovers 902a-902d may communicate to initiate coordinated retrieval of the planetary lander 982. For example, the respective ECUs of the plurality of rovers 902a-902d may communicate to latch with the plurality of legs 949a-949d of the planetary lander 982. As an illustrative example, the ECU of the first rover 902a may selectively control the plurality of control legs (e.g., control legs 813a/813b in FIGS. 8A-8D) to cause the chassis 903a of the first rover 902a to be lowered (e.g., via a suspension system of each control leg) with respect to the surface on which the planetary lander 982 is placed. Each rover of the plurality of rovers 902a-902d may be lowered in this way to lower the chassis of each rover with respect to the surface on which the planetary lander 982 is placed to position the chassis of each rover to surround a portion of each leg of the planetary lander 982.

As described above with reference to FIGS. 8A-8D, in some embodiments, when the chassis of each rover of the plurality of rovers 902a-902d are lowered such that the chassis of each rover is within a threshold distance (e.g., abutting a top surface of the leg of the planetary lander 982 or within 2 cm, 5 cm, 7 cm, 10 cm, 15 cm, etc. above the top surface of the leg) of a corresponding leg of the planetary lander 982, the respective ECUs of the plurality of rovers 902a-902d may communicate to initiate coordinated latching with respective portions of the planetary lander 982. In some embodiments, the ECU of each rover of the plurality of rovers 902a-902d may operate a latch system (e.g., corresponding to latch system 506 in FIGS. 5F-5H) of each rover to cause the chassis of each rover to become attached to a portion of a leg of the planetary lander that is below the chassis. For example, a plurality of hooks of the latch system of each rover may be operated by each rover ECU to protrude from the interior portions of the chassis of each rover to engage with and/or grip a portion of the leg of the planetary lander that is below the chassis. As described above with reference to FIGS. 8A-8D, the plurality of hooks may be configured (e.g., in shape and/or by coating/lining) to grip a portion of each leg of the planetary lander 982. Thus, the planetary lander 982 may be configured to be transported via the coordinated transportation of the plurality of legs 949a-949d attached to the plurality of rovers 902a-902d.

In some embodiments, as described previously herein, following the retrieval of the payload 982, the respective ECUs of the plurality of rovers 902a-902d may initiate coordinated processes for transporting and/or depositing the payload 982. For example, the ECU of each rover may operate the control legs of each rover (e.g., via the suspension system of each control leg) to change respective orientations of each control leg of each of the plurality of rovers 902a-902d to gradually and concurrently raise the respective chassis 903a-903d of the plurality of rovers 902a-902d and the plurality of legs 949a-949d attached to the respective chassis 903a-903d, and to thus raise the planetary lander 982 with respect to the surface on which the planetary lander 982 is placed.

In some embodiments, the respective ECUs of the plurality of rovers 902a-902b may communicate to coordinate operation of the plurality of propulsion components (e.g., 815a/815b in FIGS. 8A-8D) of each of the plurality of rovers 902a-902d (e.g., by driving a corresponding motor assembly coupled to each propulsion component) to concurrently cause a movement (e.g., at a same speed (e.g., 1 m/s, 2 m/s, 2.5 m/s, 3.5 m/s, 5 m/s, 8 m/s, 10 m/s, etc.)) of each rover of the plurality of rovers 902a-902d and the payload 882 to a respective location on the surface while the chassis 903a-903d of the plurality of rovers 902a-902d are each in the raised position, as shown in FIG. 9. In some embodiments, as described above with reference to FIGS. 8A-8D, the respective ECUs of the plurality of rovers 902a-902b may communicate to selectively adapt the plurality of rovers 902a-902d to unevenness in the surface during transport of the planetary lander 982. For example, each rover of the plurality of rovers 902a-902d may be operable to adjust an orientation of one or more of its control legs (e.g., control legs 813a-i/813b-i in FIG. 8D) to adapt to bumps (e.g., 861) and/or dips (e.g., 862) in the surface to maintain the plurality of legs 949a-949d of the planetary lander 982 within an orientation that is substantially (e.g., within 2, 5, 10, 15, 20, 25, or 30 degrees of being) level with respect to the surface, thus preventing and/or significantly reducing potential damage to the planetary lander 982. At the respective location, for example, the chassis 903a-903d of the plurality of rovers 902a-902d may again be concurrently lowered with respect to the lunar surface (e.g., according to the example processes described above), and the latch system of each of the plurality of rovers 902a-9902b may be actuated to cause the plurality of hooks of the latch system to disengage from each leg of the plurality of legs 949a-949d of the planetary lander 982, thereby depositing the planetary lander at the respective destination.

Therefore, as outlined above with reference to FIG. 9, the multi-rover system (e.g., corresponding to system 150 in FIG. 1B) may be adapted to enable the retrieval, transportation and/or deposition of large payloads by providing an increased number of rovers configured to communicate to individually and jointly perform actions including the large payloads.

Contingency Operations and Associated Processes

Figure 10:
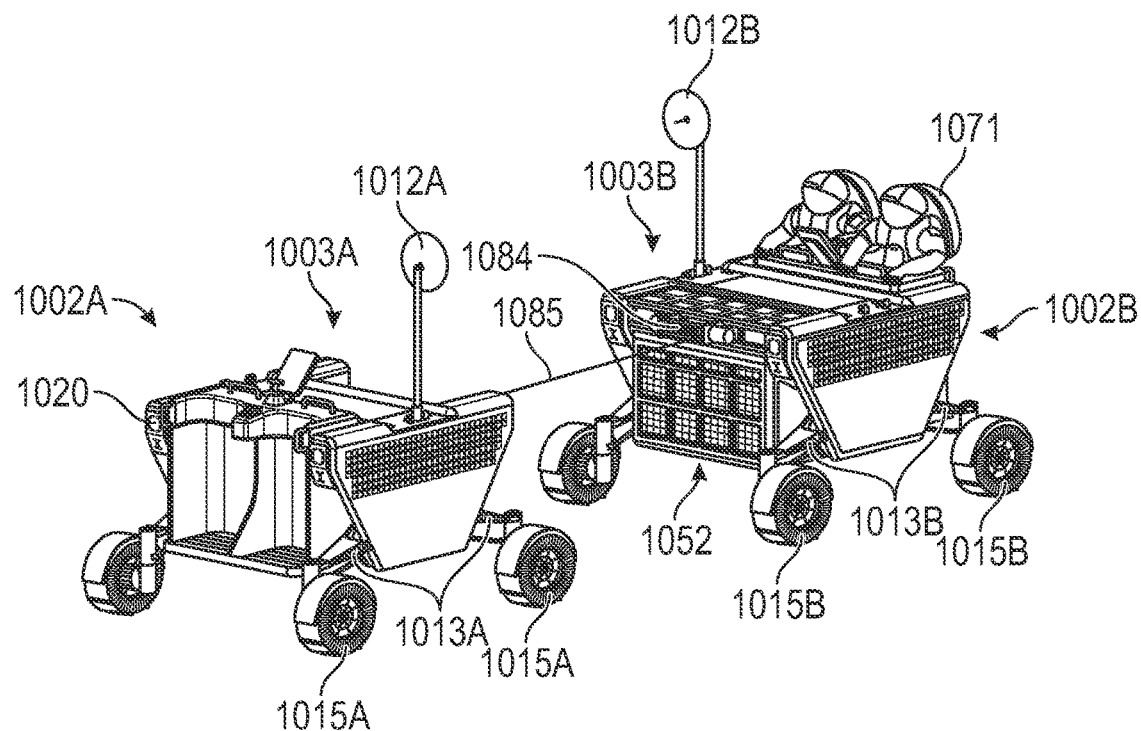
FIG. 10 illustrates an example contingency operation using a rover according to some embodiments of the disclosure.

FIG. 10 illustrates an example contingency operation using a rover according to some embodiments of the disclosure. In some embodiments, the rover described herein above may be configurable to perform contingency operations. In some instances, a respective rover may become immobile due to power outages or power failure (e.g., due to shortages in the rover battery supply or component (e.g., ECU) failure), rover/component damage (e.g., damage incurred by one or more propulsion components (e.g., corresponding to propulsion components 215 in FIGS. 2A-2B) of the respective rover, hardware malfunction (e.g., malfunction or misfire of the suspension system components (e.g., corresponding to suspension system 310 in FIGS. 3A-3C) or the motor assembly components (e.g., corresponding to motor assembly 322 in FIG. 3A)), and the like. As shown in FIG. 10, for example, the rover 1002b may be immobile. Accordingly, a second rover may be utilized to retrieve and transport (e.g., to tow) the immobile respective rover, as described below. In some embodiments, the second rover and the immobilized respective rover may form a multi-rover system during performance of the contingency operation.

As shown in FIG. 10, the multi-rover system may include a first rover 1002a and a second rover 1002b. In some embodiments, the multi-rover system optionally corresponds to system 150 shown previously in FIG. 1B. In some embodiments, the first rover 1002a may correspond to the rover 202/502/602 shown previously in FIGS. 2A-2B, 5A-5H, and 6A-6B, respectively, and the second rover 1002b may correspond to rover 702 shown in FIG. 7C. For example, the second rover 1002b may be configured as a rover vehicle operable by one or more users (e.g., astronauts) 1071. As mentioned above, the second rover 1002b may be immobilized. The first rover 1002a may be utilized to perform a contingency operation (e.g., search and rescue of the one or more users 1071) involving the second rover 1002b. As discussed previously with reference to FIG. 1B, the ECU of the first rover 1002a may be configured to communicate with the ECU of the second rover 1002b via their respective communications units (e.g., corresponding to communications units 116a and 116b in FIG. 1B). For example, as discussed below, the ECU of the first rover 1002a may be configured to communicate with the ECU of the second rover 1002b via a communications link connecting their respective communications units to conduct the retrieval and transportation of the immobilized second rover 1002b.

As an illustrative example, the second rover 1002b may be immobilized due to component failure of one or more of the propulsion components 1015b (e.g., due to hardware malfunction of the motor assembly associated with the one or more propulsion components 1015b) of the second rover 1002b. For example, the electrical capabilities of the ECU (e.g., the communications capabilities and control of the suspension systems of the control legs 1013b) of the second rover 1002b may be maintained. In some embodiments, the first rover 1002a may, via the one or more sensors 1020, detect and identify a location of the second rover 1002b. In some embodiments, the ECU of the first rover 1002a may operate the propulsion components 1015a (e.g., via a motor assembly associated with each propulsion component 1015a) to approach the second rover 1002b. In some embodiments, the first rover 1002b optionally communicates with the second rover 1002b using their respective antennas 1012a and 1012b (e.g., in communication with their respective communications units) to further enable the first rover 1002a to detect and identify the location of the second rover 1002b.

In some embodiments, as the first rover 1002a is driven toward the second rover 1002b, the ECU of the first rover may utilize data (e.g., image data) captured via the one or more sensors 1020 to position chassis 1003a of the first rover 1002a in front of the chassis 1003b of the second rover 1002b. In some embodiments, when the chassis 1003a of the first rover 1002a is positioned in front of the chassis 1003b of the second rover 1002b, the plurality of propulsion components 1015a of the first rover 1002a optionally cease to be driven, such that the first rover 1002a may remain stationary in front of the second rover 1002b. In some embodiments, the first rover 1002a may cease driving toward the second rover 1002b when the ECU of the first rover 1002a detects that a respective portion of the chassis 1003a (e.g., a center portion of the medial member of the chassis 1003a) of the first rover 1002a is within a threshold distance (e.g., 1 m, 2 m, 3 m, 4.5 m, 5 m, 5.5 m, 7 m, 10 m, etc.) of a respective portion of the chassis 1003b (e.g., a center portion of the medial member of the chassis 1003b) of the second rover 1002b.

In some embodiments, as shown in FIG. 10, the chassis 1003a of the first rover 1002a may be configured to be connected to the chassis 1003b of the second rover 1002b to transport the second rover 1002b and the one or more users 1071 to safety. For example, as shown, a connection interface may be attached to the chassis 1003b of the second rover 1002b. In some embodiments, the connection interface 1084 is attached to the chassis 1003b by the one or more users 1071. In some embodiments, the connection interface 1084 is already provided on the chassis 1003b of the second rover 1002b prior to the second rover 1002b being immobilized. In some embodiments, a line 1085 may be connected to the connection interface 1084 to connect the chassis 1003a of the first rover 1002a to the chassis 1003b of the second rover 1002b. For example, the line 1085 may include a cable/wire and a hooking element (e.g., a hook or clip) configured to securely connect to the connection interface 1084. In some embodiments, the line 1085 may be connected to the connection interface 1084 by the one or more users 1071.

In some embodiments, when the chassis 1003a of the first rover 1002a is connected to the chassis 1003b of the second rover 1002b (e.g., via line 1085), the first rover 1002a may be operated to transport (e.g., tow) the second rover 1002b and the one or more users 1071 to safety. For example, the ECU of the first rover 1002a may operate the plurality of propulsion components 1015a to cause a movement of the first rover 1002a and thus a movement of the second rover 1002b (e.g., via a pulling motion between the first rover 1002a and the second rover 1002b). In some embodiments, while the first rover 1002a transports the second rover 1002b, the ECU of the first rover 1002a may communicate with the ECU of the second rover 1002b (e.g., via their respective antennas 1012a and 1012b) to coordinate adaptive motion of the first rover 1002a. For example, the ECU of the first rover 1002a may detect, via the one or more sensors 1020, that unevenness (e.g., bumps or dips) in the surface is present and may steer the first rover 1002a to avoid and/or limit contact with the unevenness in the surface (e.g., according to the processes described above with reference to FIGS. 6A-6B). As another example, the ECU of the first rover 1002a may communicate with the ECU of the second rover 1002b to coordinate determination of a respective speed at which the first rover 1002a may pull the second rover 1002b. The respective speed, for example, may be determined based on a weight of the second rover 1002b, including the modular payload 1052 attached to the chassis 1003b of the second rover 1002b and the one or more users 1071 riding on the second rover 1002b. In some embodiments, the ECU of the second rover 1002b may communicate information including the weight determination (e.g., and/or other information) to the ECU of the first rover 1002a to coordinate the respective speed at which the first rover 1002a may pull the second rover 1002b. The respective speed determined based on such factors may allow the first rover 1002a to be driven (e.g., at 1 m/s, 2 m/s, 2.5 m/s, 3.5 m/s, 5 m/s, 8 m/s, 10 m/s, etc.) fast enough to pull and cause movement of the second rover 1002b, while maintaining separation between the first rover 1002a and the second rover 1002b (e.g., to prevent a collision between the first rover 1002a and the second rover 1002b) during transport. In some embodiments, the first rover 1002a may be configured to share and/or supply power with the second rover 1002b for use in powering the ECU of the second rover 1002b. For example, the first rover 1002a may supply power to the second rover 1002b via the line 1085 (e.g., which may include conductive material) or via a different means (e.g., a power cable connected between the power system of the first rover 1002a and the power system of the second rover 1002b (e.g., corresponding to power systems 108a and 108b in FIG. 1B)).

Thus, as discussed above, a rover (and/or additional rovers) may be configurable to perform contingency operations, such as the retrieval and transport of an immobilized rover. Additionally or alternatively, in some embodiments, the first rover 1002a may also be configured as a rover vehicle (e.g., corresponding to rover 702 in FIG. 7 and described above). In some such embodiments, the one or more users 1071 may operate the first rover 1002a (e.g., according to the processes described above with reference to FIG. 7C) to drive the first rover 1002a and transport the second rover 1002b connected to the first rover 1002a to safety.

It should be understood that additional contingency operations may be performed using the multi-rover system disclosed herein. For example, a plurality of rovers (e.g., two or more rovers) may be utilized to jointly tow a larger vehicle that is not another rover (e.g., such as a traditional lunar roving vehicle (LRV). As another example, a plurality of rovers (e.g., two or more rovers) may be utilized to concurrently and individually transport and deposit a corresponding plurality of modular payloads. Other examples involving coordinated motion and action of a plurality of rovers are possible.

Rover Operation of Diverse Payloads

Attention is now directed towards examples of operable payloads (e.g., functional modules) that are configured to interface with a chassis of a rover. When interfaced with the chassis of the rover, the rover ECU may selectively communicate with the functional modules to perform one or more actions involving the functional modules, as described below.

FIGS. 11A-11E illustrate examples of functional modules 1172a-1172e configured to interface with a rover 1102 according to some embodiments of the disclosure. In some embodiments, the rover 1102 optionally corresponds to rover 702, 602, 502, and/or 202 shown in FIGS. 7A-7E, FIGS. 6A-6B, FIGS. 5A-5H, and/or FIGS. 2A-2B, respectively. As described herein, the rover may be configured to retrieve, transport, and/or deposit payloads on a surface (e.g., a lunar surface). In some embodiments, the rover may be configurable to perform one or more additional actions and/or functions by interfacing the rover with a respective functional module, as described below.

Figure 11A:
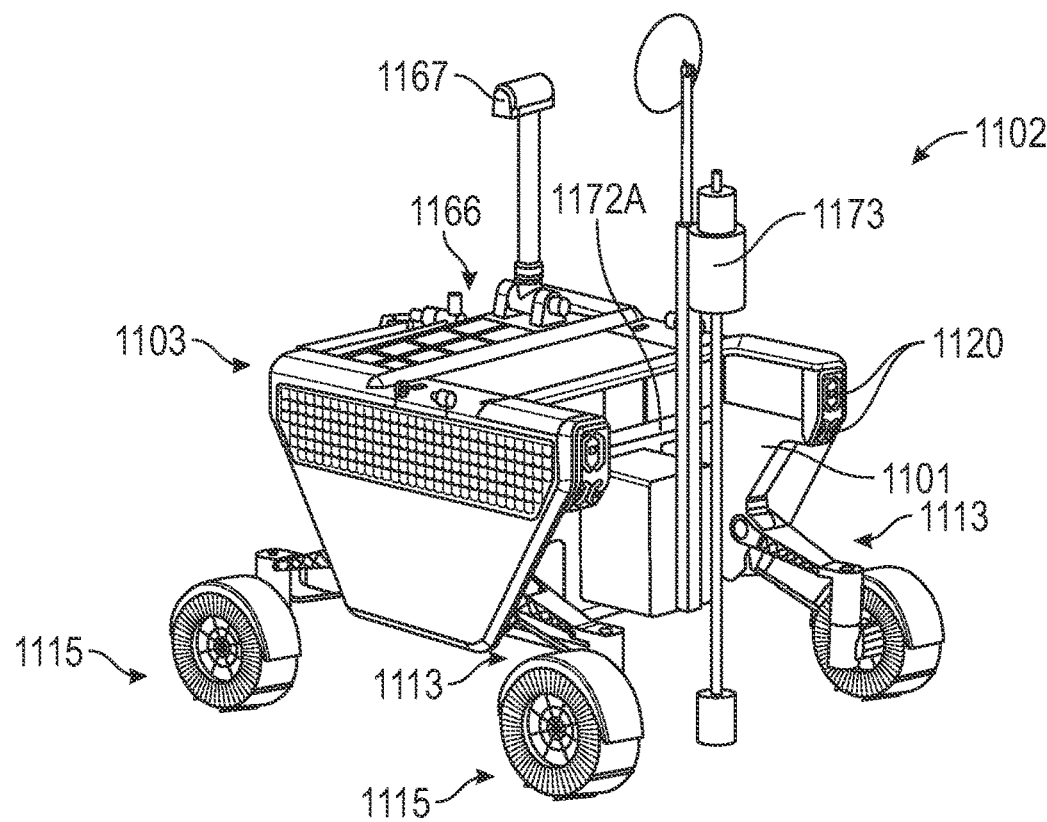
FIGS. 11A-11E illustrate examples of functional modules configured to interface with a rover according to some embodiments of the disclosure.
Figure 11B:
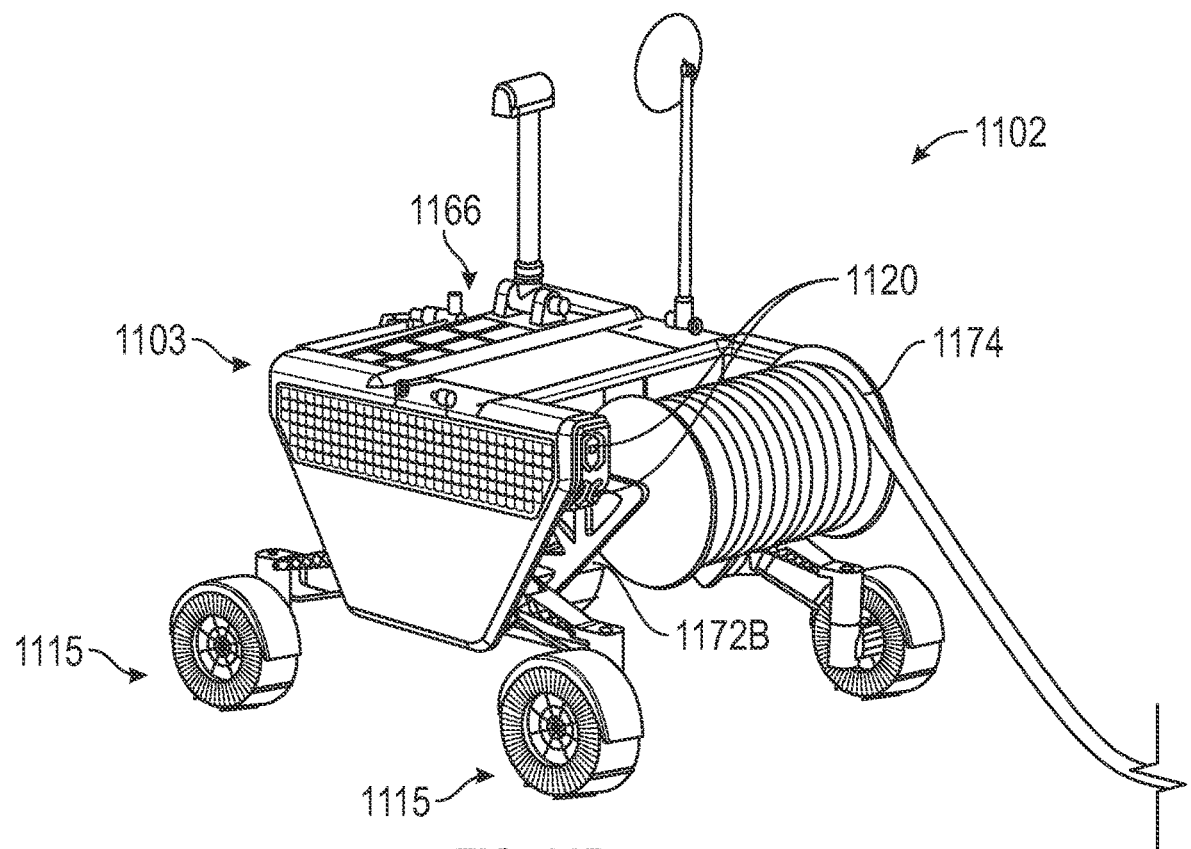
Figure 11C:
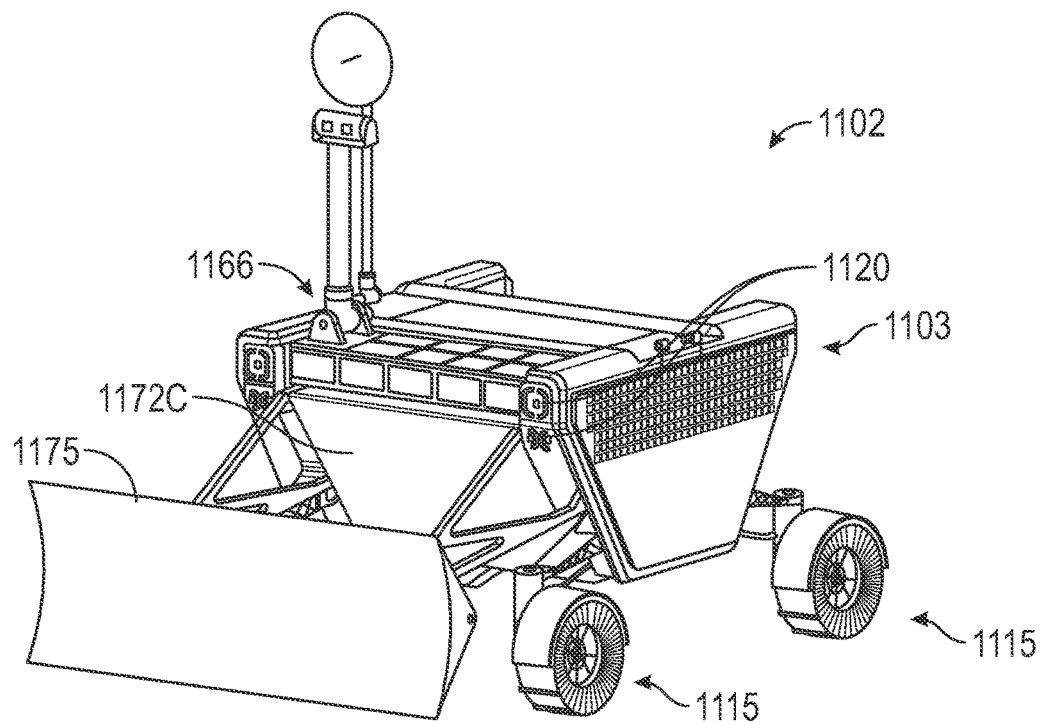
Figure 11D:
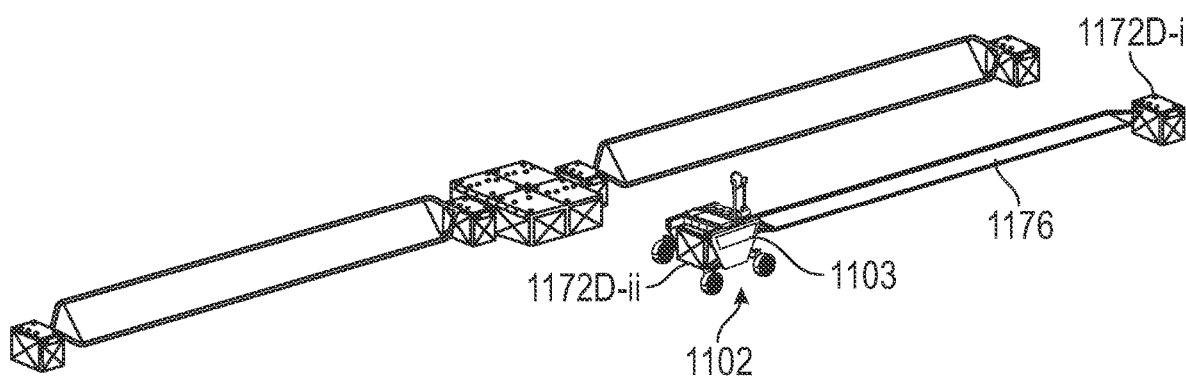
Figure 11E:
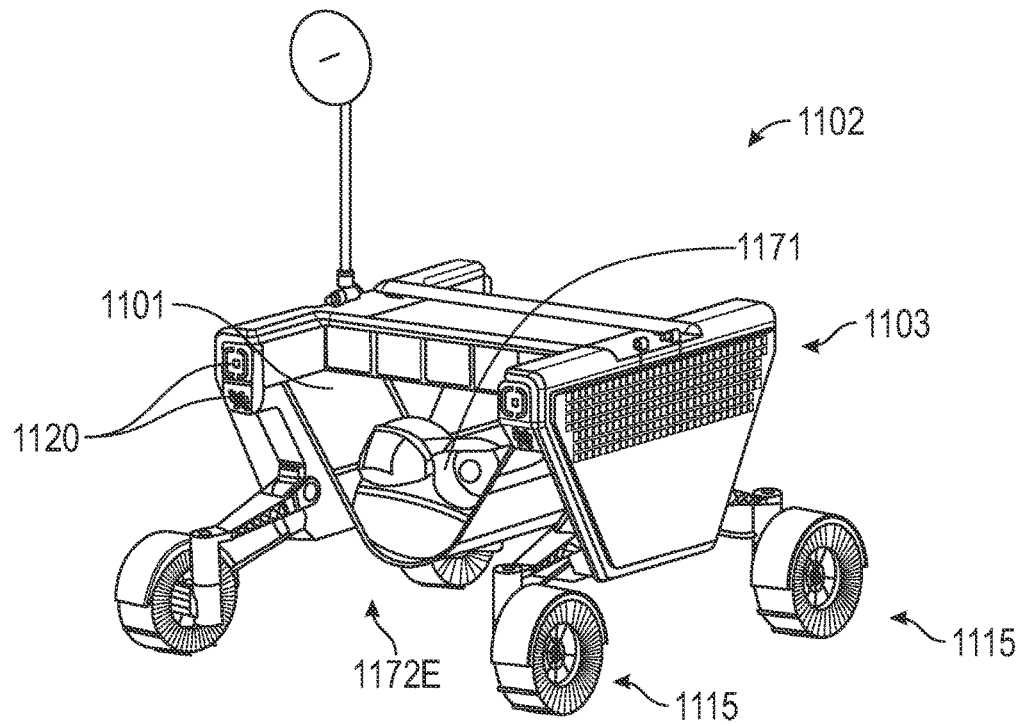

In some embodiments, the rover 1102 may be configured as a science mobility system, as described previously with reference to FIGS. 7A-7B. In some such embodiments, as shown in FIG. 11A, the surface science functional module 1166 may be interfaced with the medial member (e.g., medial member 707 in FIG. 7D) of the rover chassis 1103. As discussed above, the surface science functional module 1166 may include the remote mast 1167 (e.g., and a robotic arm (e.g., 768 in FIG. 7D)) for use in performing scientific mission objectives. In some embodiments, the surface science functional module may configure the rover to (e.g., autonomously or via external control) interface with and perform one or more respective actions involving a (e.g., second) respective functional module. It should be understood that, in some embodiments, the rover 1102 may be configured to perform the one or more respective actions involving the respective functional module without the surface science functional module 1166 attached to the medial member of the chassis 1103 (e.g., as shown in FIG. 11E).

In some embodiments, the chassis of the rover may be configured to physically and communicatively interface with the respective functional module for performing one or more drilling operations. For example, as shown in FIG. 11A, the rover 1102 may be interfaced with the respective functional module 1172a. In some embodiments, the respective functional module 1172a may include a drilling system including a drill 1173 configured to perform the one or more drilling operations. As shown in FIG. 11A, the respective functional module 1172a may be attached to the chassis 1103 of the rover 1102, such that the interior portions 1101 of the chassis 1103 at least partially surround the respective functional module 1172a. In some embodiments, the respective functional module 1172a may be configured to attach to the chassis 1103 of the rover 1102 via a plurality of attachment elements (not shown) disposed on one or more sides of the respective functional module 1172a. For example, the plurality of attachment elements may correspond to a plurality of latch receptacles. In some embodiments, the plurality of attachment elements may correspond to the plurality of latch receptacles of the modular payload described herein (e.g., the same sizes, placements, relative spatial arrangements, and/or orientations as latch receptacles 454 of the modular payloads 452a-452b in FIG. 4). Accordingly, the rover 1102 may be configured to retrieve the respective functional module 1172a according to any of the processes described previously with reference to FIGS. 5A-5H. For example, the chassis 1103 may attach to the plurality of attachment elements of the respective modular payload 1172a via the plurality of hooks of the latch system of the rover (e.g., plurality of hooks 553 of the latch system 506 in FIGS. 5F-5H). As described above with reference to FIGS. 5A-5H, the rover ECU (e.g., corresponding to ECU 104 in FIG. 1A) may utilize image data captured via the one or more sensors 1120 (e.g., corresponding to the one or more sensors 520 in FIGS. 5A-5E) to locate and position the chassis 1103 above the respective functional module 1172a.

In some embodiments, the ECU of the rover 1102 may be configured to communicate with the drilling system of the respective functional module 1172a to selectively operate the drill 1173. For example, when the respective functional module 1172a is attached to the chassis 1103 (e.g., via the latch system discussed above), the ECU of the rover 1102 may become communicatively (e.g., electrically) coupled to (e.g., a processor of) the drilling system of the respective functional module 1172a. For example, a top surface of the respective functional module 1172a may include conductive pads, traces, plugs, etc. configured to contact one or more conductive elements disposed on a bottom surface of the medial member (e.g., medial member 207 in FIGS. 2A-2B) of the chassis 1103 to form a communication link between the rover ECU and the drilling system. Additionally or alternatively, in some embodiments, the rover ECU may be configured to communicate wirelessly (e.g., via the communications unit 116 in FIG. 1A) with the drilling system of the rover 1102 to form the communication link between the rover ECU and the drilling system.

As mentioned above, when the respective functional module 1172a is attached to the chassis 1103 of the rover 1102, the ECU of the rover may cause the rover 1102 and/or the respective functional module 1172a to perform one or more drilling operations at a respective location on the (e.g., lunar) surface. For example, the one or more drilling operations may include drilling a hole into the surface on which the plurality of propulsion components 1115 of the rover 1102 are placed. When the ECU determines that the respective functional module 1172a is attached to the chassis 1103 of the rover 1102 (e.g., that the plurality of hooks have engaged with the plurality of attachment elements), the rover ECU may selectively operate the plurality of propulsion components 1115 (e.g., via the motor assembly (e.g., such as motor assembly 522 in FIG. 5A) coupled to each propulsion component) to cause a motion of each of the propulsion components 1115 and a movement of the rover 1102 and the respective functional module 1172a attached to the chassis 1103 of the rover 1102 in a respective direction toward the location at which the drilling will occur. When the rover 1102 reaches the respective location on the surface, the rover ECU may operate the plurality of propulsion components 1115 and/or the plurality of control legs 1113 of the rover 1102 to position the drill 1173 above a particular portion of the surface at the respective location into which the hole is to be drilled. For example, when the rover ECU operates the plurality of propulsion components 1115 and/or the plurality of control legs 1113 of the rover 1102, the rover ECU may utilize image data captured via the one or more sensors 1120 to locate and position the drill 1173 above the particular portion of the surface. When the ECU of the rover 1102 determines that the drill 1173 is positioned above the particular portion on the surface, the ECU may communicate with the drill system of the respective functional module 1172a to operate the drill 1173 and perform the drilling operation using the drill 1173.

In some embodiments, the chassis of the rover may be configured to physically and communicatively interface with the respective functional module for performing one or more cable/tubing deployment operations. For example, as shown in FIG. 11B, the rover 1102 may be interfaced with a second respective functional module 1172b. In some embodiments, the second respective functional module 1172b may include a deployment system including a roller 1174 having cable/tubing configured to perform the one or more cable/tubing deployment operations. As shown in FIG. 11B, the second respective functional module 1172b may be attached to the chassis 1103 of the rover 1102, such that the interior portions of the chassis 1103 at least partially surround the second respective functional module 1172b. As discussed above with reference to FIG. 11A, in some embodiments, the second respective functional module 1172b may be configured to attach to the chassis 1103 of the rover 1102 via a plurality of attachment elements (not shown). For example, the plurality of attachment elements may correspond to a plurality of latch receptacles. In some embodiments, the plurality of attachment elements may correspond to the plurality of latch receptacles of the modular payload described herein (e.g., the same sizes, placements, relative spatial arrangements, and/or orientations as latch receptacles 454 of the modular payloads 452a-452b in FIG. 4). Accordingly, the rover 1102 may be configured to retrieve the second respective functional module 1172b according to any of the processes described previously with reference to FIGS. 5A-5H.

In some embodiments, the ECU of the rover 1102 may be configured to communicate with the deployment system of the second respective functional module 1172b to selectively operate the roller 1174. For example, when the second respective functional module 1172b is attached to the chassis 1103 (e.g., via the latch system, as discussed above), the ECU of the rover 1102 may become communicatively (e.g., electrically) coupled to (e.g., a processor of) the deployment system of the second respective functional module 1172b. As discussed above with reference to FIG. 11A, a (e.g., wired or wireless) communication link may be established between the rover ECU and the deployment system of the second respective functional module 1172b.

As mentioned above, when the second respective functional module 1172b is attached to the chassis 1103 of the rover 1102, the ECU of the rover may cause the rover 1102 and/or the second respective functional module 1172b to perform one or more cable/tubing deployment operations over a respective region of the (e.g., lunar) surface. For example, the one or more cable/tubing deployment operations may include deploying the cable/tubing between a first respective location and a second respective location on the surface on which the plurality of propulsion components 1115 of the rover 1102 is placed. A first end of the cable/tubing may be fixed at the first respective location on the surface. In some embodiments, the second respective functional module 1172b may be retrieved at the first respective location on the surface. When the ECU determines that the second respective functional module 1172b is attached to the chassis 1103 of the rover 1102 (e.g., that the plurality of hooks have engaged with the plurality of attachment elements), the rover ECU may selectively operate the plurality of propulsion components 1115 to cause a motion of each of the propulsion components 1115 and a movement of the rover 1102 and the second respective functional module 1172b attached to the chassis 1103 of the rover 1102 in a respective direction toward the second respective location at which a second end of the cable/tubing will be deployed. As the rover 1102 travels toward the second respective location, the rover ECU may communicate with the deployment system of the second respective functional module 1172b to operate the roller 1174. For example, the roller 1174 may be motorized and may be operated to cause a (e.g., counter-clockwise) rotation of the roller 1174 to increase an amount of the cable/tubing that is placed onto the surface. Additionally or alternatively, in some embodiments, the roller 1174 may be unmotorized, and the roller 1174 may be caused to rotate as a distance between the rover 1102 and the first respective location increases (e.g., due to a pulling of the cable/tubing wrapped around the roller 1174).

When the rover 1102 reaches the second respective location on the surface (e.g., using image data captured via the one or more sensors 1120), the rover ECU may operate the plurality of propulsion components 1115 and/or the plurality of control legs 1113 of the rover 1102 to deposit the second respective functional module 1172b at the second respective location on the surface. For example, the rover ECU may cease driving the plurality of propulsion components 1115 and may change respective orientations of the plurality of control legs to cause the chassis 1103 to be lowered toward the surface to deposit the second respective functional module on the surface. The rover ECU may control the latch system of the rover 1102 to cause the plurality of hooks of the latch system to disengage from the plurality of attachment elements of the second respective functional module 1172b, and to deposit the second respective functional module 1172b, and thus the cable/tubing, at the second respective location on the surface.

In some embodiments, the chassis of the rover may be configured to physically and communicatively interface with the respective functional module for performing one or more surface excavation operations. For example, as shown in FIG. 11C, the rover 1102 may be interfaced with a third respective functional module 1172c. In some embodiments, the third respective functional module 1172c may include an excavation system including a blade 1175 configured to perform the one or more surface excavation operations. As shown in FIG. 11C, the third respective functional module 1172c may be attached to the chassis 1103 of the rover 1102, such that the interior portions of the chassis 1103 at least partially surround the third respective functional module 1172c. As discussed above with reference to FIG. 11A, in some embodiments, the third respective functional module 1172c may be configured to attach to the chassis 1103 of the rover 1102 via a plurality of attachment elements (not shown). For example, the plurality of attachment elements may correspond to a plurality of latch receptacles. In some embodiments, the plurality of attachment elements may correspond to the plurality of latch receptacles of the modular payload described herein (e.g., the same sizes, placements, relative spatial arrangements, and/or orientations as latch receptacles 454 of the modular payloads 452a-452b in FIG. 4). Accordingly, the rover 1102 may be configured to retrieve the third respective functional module 1172c according to any of the processes described previously with reference to FIGS. 5A-5H.

In some embodiments, the ECU of the rover 1102 may be configured to communicate with the excavation system of the third respective functional module 1172c to selectively operate the blade 1175. For example, when the third respective functional module 1172c is attached to the chassis 1103 (e.g., via the latch system, as discussed above), the ECU of the rover 1102 may become communicatively (e.g., electrically) coupled to (e.g., a processor of) the excavation system of the third respective functional module 1172c. As discussed above with reference to FIG. 11A, a (e.g., wired or wireless) communication link may be established between the rover ECU and the excavation system of the third respective functional module 1172c.

As mentioned above, when the third respective functional module 1172c is attached to the chassis 1103 of the rover 1102, the ECU of the rover may cause the rover 1102 and/or the third respective functional module 1172c to perform one or more surface excavation operations at a respective location on the (e.g., lunar) surface. For example, the one or more surface excavation operations may include site preparation (e.g., pushing and/or flattening soil, rocks, and other material) on the surface on which the plurality of propulsion components 1115 of the rover 1102 is placed. When the ECU determines that the third respective functional module 1172c is attached to the chassis 1103 of the rover 1102 (e.g., that the plurality of hooks have engaged with the plurality of attachment elements), the rover ECU may selectively operate the plurality of propulsion components 1115 to cause a motion of each of the propulsion components 1115 and a movement of the rover 1102 and the third respective functional module 1172c attached to the chassis 1103 of the rover 1102 in a respective direction toward the respective location at which the surface excavation will be performed.

When the rover 1102 reaches the respective location on the surface, the rover ECU may communicate with the excavation system of the third respective functional module 1172c to operate the blade 1175. For example, the excavation system may be operable to cause the blade 1175 to be selectively lowered toward the surface and/or to be tilted (e.g., angled upward or downward) with respect to the surface, such that the blade 1175 may engage with the surface. In some embodiments, the excavation system may be operable to cause the blade 1175 to be selectively raised away from the surface (e.g., for pushing and/or flattening tall and/or elevated objects (e.g., boulders, bumps, etc.). In some embodiments, the rover ECU may communicate with the suspension system (e.g., corresponding to suspension system 310 in FIGS. 3A-3C) of each of the plurality of control legs 1113 to cause the plurality of control legs 1113 to selectively change their respective orientations (e.g., with respect to the surface) to raise or lower the chassis 1103 of the rover 1102, and thus correspondingly raise or lower the blade 1175 of the third respective functional module 1172c. The rover ECU may operate the plurality of propulsion components 1115 to produce a forward motion of the rover 1102 and to cause the blade 1175 to push and/or flatten surface material at the respective location on the surface.

In some embodiments, the chassis of the rover may be configured to interface with one or more respective functional modules for performing one or more solar farm deployment operations. For example, as shown in FIG. 11D, the rover 1102 may be interfaced with one or more fourth respective functional modules 1172d. In some embodiments, the one or more fourth respective functional modules may include a first and a second power cell functional modules 1172*d-i*-1172*d-ii*. In some examples, the one or more fourth respective functional modules 1172*d* may include a charging system including a solar panel 1176 extending between the first power cell functional module 1172*d-i* and the second power cell functional module 1172*d-ii*. As shown in FIG. 11D, a respective functional module of the one or more fourth respective functional modules may be attached to the chassis 1103 of the rover 1102, such that the interior portions of the chassis 1103 at least partially surround the respective functional module of the one or more fourth respective functional modules. As discussed above with reference to FIG. 11A, in some embodiments, the one or more fourth respective functional modules may each be configured to attach to the chassis 1103 of the rover 1102 via a plurality of attachment elements (not shown). For example, the plurality of attachment elements may correspond to a plurality of latch receptacles. In some embodiments, the plurality of attachment elements may correspond to the plurality of latch receptacles of the modular payload described herein (e.g., the same sizes, placements, relative spatial arrangements, and/or orientations as latch receptacles 454 of the modular payloads 452*a*-452*b* in FIG. 4). Accordingly, the rover 1102 may be configured to individually retrieve each of the one or more fourth respective functional modules according to any of the processes described previously with reference to FIGS. 5A-5H.

As mentioned above, when the one or more fourth respective functional modules are individually attached to the chassis 1103 of the rover 1102, the ECU of the rover may operate the rover 1102 to perform one or more solar farm deployment operations over a respective region of the (e.g., lunar) surface. For example, the one or more solar farm deployment operations may include deploying the solar panel between a first respective location and a second respective location on the surface on which the plurality of propulsion components (e.g., 1115) of the rover 1102 is placed. The first power cell functional module 1172*d-i* may be positioned (e.g., already placed) at the first respective location on the surface. In some embodiments, the second power cell functional module 1172*d-ii* may be retrieved at or near the first respective location on the surface. When the ECU determines that the second power cell functional module 1172*d-ii* is attached to the chassis 1103 of the rover 1102 (e.g., that the plurality of hooks of the rover latch system have engaged with the plurality of attachment elements of the second power cell functional module 1172*d-ii*), the rover ECU may selectively operate the plurality of propulsion components (e.g., 1115) to cause a motion of each of the propulsion components and a movement of the rover 1102 and the second power cell functional module 1172*d-ii* attached to the chassis 1103 of the rover 1102 in a respective direction toward the second respective location at which the second power cell functional module 1172*d-ii* will be deposited. As shown in FIG. 11D, as the rover 1102 travels toward the second respective location, a length of the solar panel 1176 may increase (e.g., the solar panel 1176 may be extended) between the first power cell functional module 1172*d-i* and the second power cell functional module 1172*d-ii*. For example, the solar panel 1176 may be expandable (e.g., the solar panel 1176 comprises an adjustable surface)—the solar panel 1176 may initially be folded between the first power cell functional module 1172*d-i* and the second power cell functional module 1172*d-ii*—and movement of the rover optionally causes the solar panel 1176 to become expanded (e.g., unfolded and/or flattened due to a pulling of a second end of the solar panel 1176 attached to the second power cell functional module 1172*d-ii*).

When the rover 1102 reaches the second respective location on the surface, the rover ECU may operate the plurality of propulsion components (e.g., 1115) and/or the plurality of control legs (e.g., 1113) of the rover 1102 to deposit the second power cell functional module 1172*d-ii* at the second respective location on the surface. For example, the rover ECU may cease driving the plurality of propulsion components and may change respective orientations of the plurality of control legs to cause the chassis 1103 to be lowered toward the surface to deposit the second power cell functional module 1172*d-ii* on the surface. In some embodiments, the rover ECU may control the latch system of the rover 1102 to cause the plurality of hooks of the latch system to disengage from the plurality of attachment elements of the second power cell functional module 1172*d-ii*, and to deposit the second power cell functional module 1172*d-ii*, and thus the solar panel 1176, onto the (e.g., lunar) surface. As mentioned above, in some embodiments, the one or more fourth respective functional modules 1172*d* may include a charging system (e.g., electrically) coupled to the solar panel 1176. In some embodiments, the charging system may be or may include charging cells (e.g., battery cells) configured to store power collected via the solar panel 1176. The power stored in the charging cells of the first power cell functional module 1172*d-i* and the second power cell functional module 1172*d-ii* may then be used to power various systems on the (e.g., lunar) surface, such as electrical equipment, rovers, electrically motorized machinery, lunar outposts, and the like.

In some embodiments, the chassis of the rover may be configured to interface with a performance attachment for performing one or more search and rescue operations. For example, as shown in FIG. 11E, the rover 1102 may be interfaced with a performance attachment 1172*e*. In some embodiments, the performance attachment 1172*e* may include a transportation element (e.g., a gurney) on which an immobilized user may be securely placed. As shown in FIG. 11E, the performance attachment 1172*e* may be attached to the chassis 1103 of the rover 1102, such that the interior portions 1101 of the chassis 1103 at least partially surround the performance attachment 1172*e*. As shown in FIG. 11E, the performance attachment 1172*e* may be physically coupled (e.g., tied, fixed, snapped, etc.) to the interior portions of the chassis 1103. For example, the interior portions of the chassis 1103 may include fastening points at which the performance attachment 1172*e* may be coupled. Additionally or alternatively, in some embodiments, the performance attachment 1172*e* may be attached (e.g., coupled, tied, fixed, snapped, etc.) to the chassis 1103 via one or more of the plurality of hooks (e.g., corresponding to the plurality of hooks 553 in FIGS. 5F-5H) disposed within the sides of the chassis 1103.

As mentioned above, when the performance attachment 1172*e* is attached to the chassis 1103 of the rover 1102, the ECU of the rover may cause the rover 1102 to perform one or more search and rescue operations at a respective location on the (e.g., lunar) surface. For example, the one or more search and rescue operations may include locating an immobilized user (e.g., immobilized astronaut) at the respective location, and transporting the immobilized user to a safe location (e.g., for receiving care, treatment, etc.) on the surface on which the plurality of propulsion components 1115 of the rover 1102 is placed. When the ECU determines that the performance attachment 1172*e* is attached to the chassis 1103 of the rover 1102, the rover ECU may selectively operate the plurality of propulsion components 1115 to cause a motion of each of the propulsion components 1115 and a movement of the rover 1102 and the performance attachment 1172e attached to the chassis 1103 of the rover 1102 in a respective direction toward the respective location at which the immobilized user is located.

When the rover 1102 reaches the respective location on the surface (e.g., using image data captured via the one or more sensors (e.g., corresponding to the one or more sensors 1020 in FIG. 10) to locate the immobilized user 1171), the rover ECU may operate the plurality of propulsion components 1115 and/or the plurality of control legs 1113 to retrieve the immobilized user 1171. For example, the rover ECU may cease driving the plurality of propulsion components 1115 and may change respective orientations of the plurality of control legs to cause the chassis 1103 to be lowered toward the surface to place the performance attachment 1172e on the surface. The immobilized user 1171 may be placed onto the performance attachment 1172e (e.g., by one or more other users), and the chassis 1103 may be raised to an upright orientation, as shown in FIG. 11E. The rover ECU may then operate the plurality of propulsion components 1115 to produce a motion of the rover 1102 for transporting the immobilized user 1171 to the safe location.

Thus, as outlined above, a variety of diverse payloads (e.g., the functional modules and performance attachments) may be interfaced with the chassis 1103 of the rover 1102 to perform a variety of actions involving the diverse payloads. Thus, one advantage of the disclosed rover and associated processes is the provision for adaptive utility—namely, transporting modular payloads and operating diverse payloads while requiring little to no manual input from a user.

It should be understood that additional and/or alternative functional modules may be interfaced with the rover 1102 for performing one or more respective actions involving the functional modules. For example, the chassis 1103 of the rover 1102 may be interfaced with reactor functional modules for transporting and/or deploying kilo power reactors across the (e.g., lunar) surface. As another examples, the chassis 1103 of the rover 1102 may be interfaced with beacon functional modules for transporting and/or deploying navigation/landing beacons across the surface.

Universal Chassis Locking Interface and Associated Processes

Attention is now directed towards examples of a chassis locking interface that may be utilized to transport and/or deposit the rover. The chassis locking interface may correspond to a locking interface of a modular payload configured to be retrieved, transported, and/or deposited by the rover. When the modular payload is interfaced with the chassis of the rover, the chassis locking interface may enable the rover and the modular payload attached to the rover to be transported and/or deposited (e.g., together) by an external system, as described below.

Figure 12:
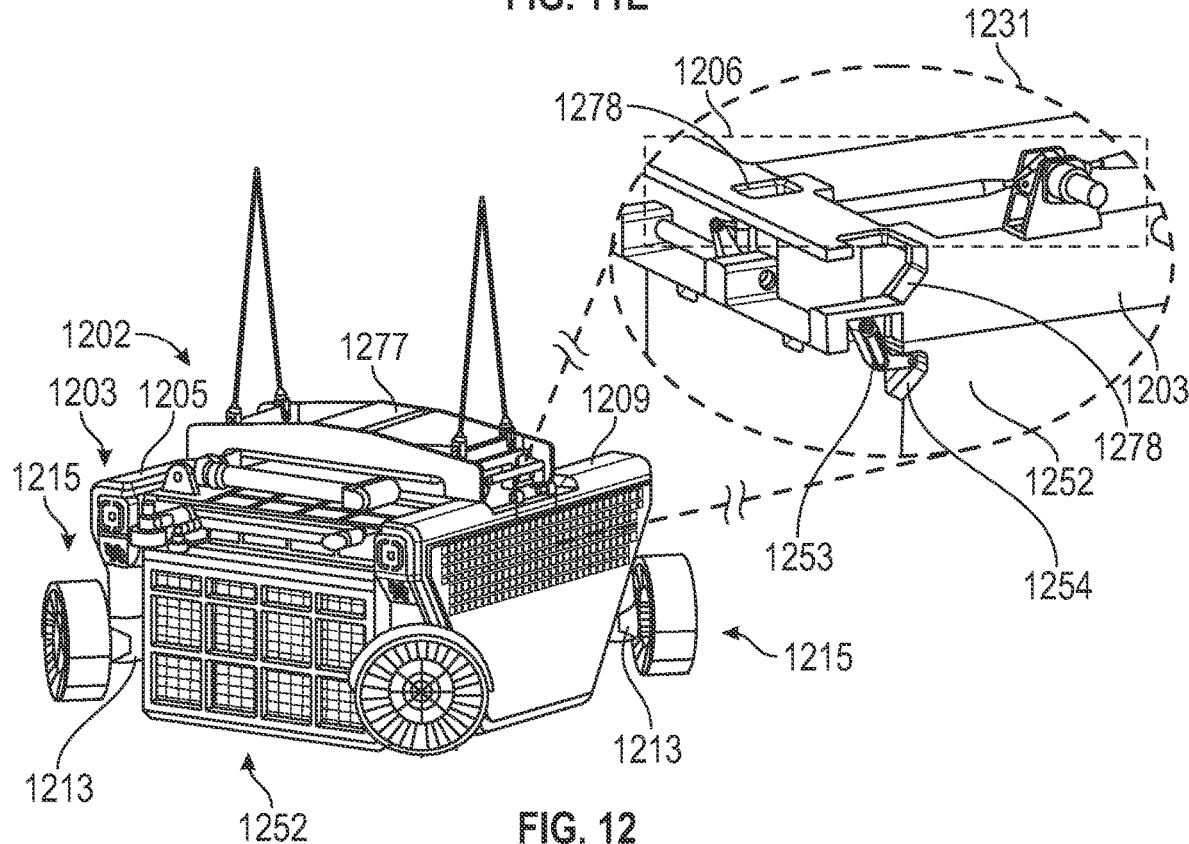
FIG. 12 illustrates an example of a chassis locking interface of a rover according to some embodiments of the disclosure.

FIG. 12 illustrates an example of a chassis locking interface of a rover 1202 according to some embodiments of the disclosure. In some embodiments, the rover 1202 optionally corresponds to rover 702, 602, 502, and/or 202 shown in FIGS. 7A-7E, FIGS. 6A-6B, FIGS. 5A-5H, and/or FIGS. 2A-2B, respectively. As discussed herein, the rover 1202 may be configured to retrieve, transport, and/or deposit a modular payload 1252. In some embodiments, the modular payload 1252 optionally corresponds to modular payload 452, 552, 652, and/or 752 shown in FIG. 4, FIGS. 5A-5G, FIGS. 6A-6B, and/or FIGS. 7C-7D. As discussed below, in some embodiments, the rover 1202 and the modular payload 1252 attached to the chassis 1203 of the rover 1202 may be configured to be transported and/or deposited via the chassis locking interface of the rover 1202. In some embodiments, the rover 1202 may be configured to be transported and/or deposited via the chassis locking interface of the rover 1202.

As shown in FIG. 12, the rover 1202 may be in a collapsed/lowered state, such that respective orientations of the plurality of control legs 1213 of the rover 1202 are elevated with respect to a reference (e.g., the surface on which the plurality of propulsion components 1215 is placed) and the chassis 1203 of the rover 1202 is in a lowered state with respect to a top surface of the modular payload 1252. For example, the plurality of control legs 1213 may be raised with respect to the surface below the rover 1202 according to any of the processes described previously with reference to FIGS. 5A-5E. As shown, in the collapsed state, the plurality of control legs 1213 of the rover 1202 may (e.g., at least partially) abut the first side 1205 and the second side 1209, such that the rover has a (e.g., substantially) cuboidal shape in the collapsed state. In some scenarios, such as during initial offloading from a carrier (e.g., a planetary (e.g., lunar) lander) onto the (e.g., lunar) surface, the rover may be arranged and/or positioned among cargo (e.g., a plurality of equipment, modular payloads, other rovers, and the like). As discussed in more detail below with reference to FIGS. 13A-13C, the cuboidal shape of the rover 1202 in the collapsed state enables the rover 1202 to be more efficiently and modularly loaded (e.g., stacked, stowed, etc.) on the carrier, which maximizes the number and/or size of cargo that may be stowed on the carrier.

In some embodiments, the rover 1202 may be configured to attach to a modular payload 1252 while the rover 1202 is in the collapsed state. As shown, the modular payload 1252 may be attached to the chassis 1203, such that interior portions of the chassis 1203 at least partially surround the modular payload 1252 and a bottom surface of the medial member (e.g., medial member 207 in FIGS. 2A-2B) of the chassis 1203 abuts (e.g., or is within a threshold distance (e.g., 0.5, 1, 1.5, 2, 3, 4, 5, etc. cm) from) the top surface of the modular payload 1252. As mentioned above, the plurality of control legs 1213 may be (e.g., fully) raised with respect to the surface beneath the rover 1202 when the rover 1202 is in the collapsed state. As shown, while the plurality of control legs 1213 are in the raised position, the chassis 1203 of the rover 1202 may still accommodate (e.g., be configured to attach to and/or be attached to) the modular payload 1252. For example, a sufficient clearance (e.g., spacing or gap) is provided between each of the plurality of control legs 1213 and a respective portion (e.g., a side) of the modular payload 1252. Accordingly, as discussed in more detail with reference to FIGS. 13A-13C, the rover 1202 and the modular payload 1252 attached to the chassis 1203 of the rover 1202 may be configured to be transported and/or deposited while the rover 1202 is in the collapsed state of FIG. 12.

As described herein, the modular payload 1252 may comprise a plurality of latch receptacles (e.g., corresponding to the plurality of latch receptacles 454 in FIG. 4) via which the rover 1202 may latch with the modular payload 1252. In some embodiments, the chassis 1203 of the rover 1202 may comprise a locking interface including a plurality of attachment elements. In some embodiments, the plurality of attachment elements is optionally a second plurality of latch receptacles, which may correspond to (e.g., have the same sizes, placements, shapes and/or relative spatial orientations as) the plurality of latch receptacles of the modular payload 1252. For example, as shown in the detailed view 1231 in FIG. 12, which depicts a cross-section of a central portion of the second side 1209 of the chassis 1203, the chassis 1203 of the rover 1202 may include the second plurality of latch receptacles 1278. In some embodiments, the second plurality of latch receptacles may be disposed (e.g., externally) on the first side 1205 (e.g. corresponding to the first side 205 in FIGS. 2A-2B) and (e.g., externally) on the second side 1209 (e.g., corresponding to the second side 209 in FIGS. 2A-2B) of the chassis 1203 of the rover 1202. As shown in FIG. 12, in some embodiments, the second plurality of latch receptacles 1278 may be disposed in an external upper portion (e.g., at least partially in/through a top surface) of the first side 1205 and an external upper portion of the second side 1209 of the chassis 1203. For example, as shown in the view 1231, the second plurality of latch receptacles 1278 may be disposed in the upper 2, 5, 10, 15, 17, 20, etc. percent of the first side 1205 and the second side 1209 of the chassis 1203. In some embodiments, the second plurality of latch receptacles 1278 may be positioned centrally in the upper portions of the first side 1205 and the second side 1209 of the chassis 1203. For example, as shown in FIG. 12, the second plurality of latch receptacles 1278 may include at least a first latch receptacle and a second latch receptacle on the second side 1209 of the chassis 1203. The first latch receptacle and the second latch receptacle may be disposed on the upper portion of the second side 1209 adjacent to the portion of the medial member (e.g., medial member 207) attached to the upper portion of the second side 1209 (e.g., above the components of the latch system 1206 configured to latch with the modular payload 1252). In some embodiments, a respective spatial arrangement of the second plurality of latch receptacles 1278 of the chassis may correspond to (e.g., may be the same as, or substantially the same as (e.g., within 1, 3, 5, 10, 20 or 50 percent of being the same size as)) a respective spatial arrangement of the plurality of latch receptacles 1254 of the modular payload 1252. As used herein, the term "spatial arrangement" refers to the particular location and/or orientation of respective components and the spacing between the respective components. For example, the first latch receptacle and the second latch receptacle of the second plurality of latch receptacles 1278 may be disposed at a respective distance from each other (e.g., 5 cm, 6 cm, 7 cm, 8.5 cm, 10 cm, 12 cm, 15 cm, etc.). In some embodiments, a first respective latch receptacle and a second respective latch receptacle of the plurality of latch receptacles 1254 of the modular payload 1252 may be disposed at the respective distance from each other.

Additionally or alternatively, in some embodiments, a respective spatial arrangement of the second plurality of latch receptacles 1278 may not correspond to a respective spatial arrangement of the plurality of latch receptacles 1254 of the modular payload 1252. For example, the first latch receptacle and the second latch receptacle of the second plurality of latch receptacles 1278 may be disposed at a first respective distance from each other (e.g., 5 cm, 6 cm, 7 cm, 8.5 cm, 10 cm, 12 cm, 15 cm, etc.). The first respective latch receptacle and the second respective latch receptacle of the plurality of latch receptacles of the modular payload 1252 may be disposed at a second respective distance, different from the first respective distance, from each other. In some embodiments, a first number of the second plurality of latch receptacles 1278 disposed on the upper portion of the first side 1205 of the chassis 1203 may share a respective spatial arrangement with a second number of the second plurality of latch receptacles 1278 disposed on the upper portion of the second side 1209 of the chassis 1203. For example, the second plurality of latch receptacles may further include a third latch receptacle and a fourth latch receptacle. In some embodiments, the first latch receptacle and the second latch receptacle may be disposed in the upper portion of the first side 1205 of the chassis 1203, and the third latch receptacle and the fourth latch receptacle of the second plurality of latch receptacles 1278 may be disposed in the upper portion of the second side 1209 of the chassis 1203. The first latch receptacle and the second latch receptacle may be disposed on the first side 1205 at a respective distance from each other. Likewise, the third latch receptacle and the fourth latch receptacle may be disposed on the second side 1209 of the chassis at the respective distance from each other. Thus, as an example, the second plurality of latch receptacles 1278 disposed on the first side 1205 and on the second side 1209 of the chassis 1203 may mirror each other.

Additionally, for example, the first latch receptacle and the third latch receptacle of the second plurality of latch receptacles 1278 may be disposed a respective distance apart from each other across the chassis (e.g., in a direction parallel to the medial member of the chassis) 1203 (e.g., a width of or less than the width of the interior portions (e.g., 201 in FIG. 2A) of the chassis 1203, such as 0.5 m, 0.75 m, 1 m, 1.5 m, 2 m, 3 m, 3.5 m, etc.). Likewise, the second latch receptacle and the fourth latch receptacle of the second plurality of latch receptacles 1278 may be disposed at the respective distance apart from each other across the chassis 1203. In some embodiments, a cross distance of the plurality of latch receptacles 1254 of the modular payload 1252 may share the spatial arrangement above. For example, the first respective latch receptacle and a third respective latch receptacle of the plurality of latch receptacles 1254 of the modular payload 1252 may be disposed the respective distance apart from each other across the modular payload 1252 (e.g., a width of or less than the width of the modular payload 1252, which may be the same as that of the interior portions of the chassis 1203). Likewise, the second respective latch receptacle and a fourth respective latch receptacle of the plurality of latch receptacles 1254 of the modular payload 1252 may be disposed the respective distance apart from each other across the modular payload 1252.

In some embodiments, a shape of each of the second plurality of latch receptacles 1278 of the chassis 1203 may correspond to (e.g., may be the same as, or substantially the same as (e.g., within 1, 3, 5, 10, 20 or 50 percent of being the same size as)) a shape of each of the plurality of latch receptacles 1254 of the modular payload 1252. For example, as shown in the detailed view 1231 in FIG. 12, a shape of the first respective latch receptacle of the plurality of latch receptacles 1254 of the modular payload 1252 may be the same as or substantially the same as a shape of the first latch receptacle of the second plurality of latch receptacles 1278 of the chassis 1203. Additionally or alternatively, in some embodiments, a size of each of the second plurality of latch receptacles 1278 of the chassis may correspond to (e.g., may be the same as, or substantially the same as (e.g., within 1, 3, 5, 10, 20 or 50 percent of being the same size as)) a size of each of the plurality of latch receptacles 1254 of the modular payload 1252. For example, as shown in FIG. 12, a depth, width, and/or height of the first respective latch receptacle of the plurality of latch receptacles 1254 of the modular payload 1252 may be the same as, substantially the same as, or similar to a depth, width, and/or height of the first latch receptacle of the second plurality of latch receptacles 1278 of the chassis 1203.

As mentioned above, the rover 1202 may be configured to be transported and/or deposited via the chassis locking interface (e.g., via the second plurality of latch receptacles 1278). As shown in FIG. 12, the rover 1202 may be configured to attach to a lifting block 1277 of an external system (e.g., a crane system) for lifting and/or transporting the rover 1202. For example, the lifting block 1277 may comprise a plurality of hooks/latches/appendages (not shown) configured to interlock with the second plurality of latch receptacles 1278 of the chassis 1203 and/or the plurality of latch receptacles 1254 of the modular payload 1252. In some embodiments, the lifting block 1277 may attach to the chassis 1203 of the rover 1202 to transport and/or deposit both the rover 1202 and the modular payload 1252. For example, as shown in FIG. 12, while the rover 1202 is in the collapsed state, the chassis 1203 of the rover 1202 may be attached to the modular payload 1252 via the latch system 1206 (e.g., via the engagement of the plurality of hooks 1253 with the plurality of latch receptacles 1254 of the modular payload 1252). In some embodiments, the latch system 1206 optionally corresponds to the latch system 506 shown in FIGS. 5F-5H. Additionally, in some embodiments, while the rover 1202 is in the collapsed state, the plurality of propulsion components 1215 may be raised to a sufficient elevation (e.g., with respect to the surface) such that the rover 1202 and the modular payload 1252 combination rests on the surface via a bottom surface of the modular payload 1252, rather than via the plurality of propulsion components 1215 (e.g., to avoid unintended and/or undesired rolling, spinning, or movement of the rover 1202 and/or the modular payload 1252 as the rover 1202 and modular payload 1252 combination rests on the surface). The latches of the lifting block 1277 may be attached to the chassis 1203 of the rover 1202 at the second plurality of latch receptacles 1254 to transport and/or deposit the rover 1202 and the modular payload 1252 attached to the rover 1202. Thus, the rover 1202 and the modular payload 1252 may effectively form a single payload transportable and/or deployable using a suitable lifting means (e.g., such as lifting block 1277). Thus, one advantage of configuring the rover with the chassis locking interface is the ease of integration of the rover into existing payload transportation and deposition systems already configured for transporting and/or depositing modular payloads having the locking interface.

Figure 13A:
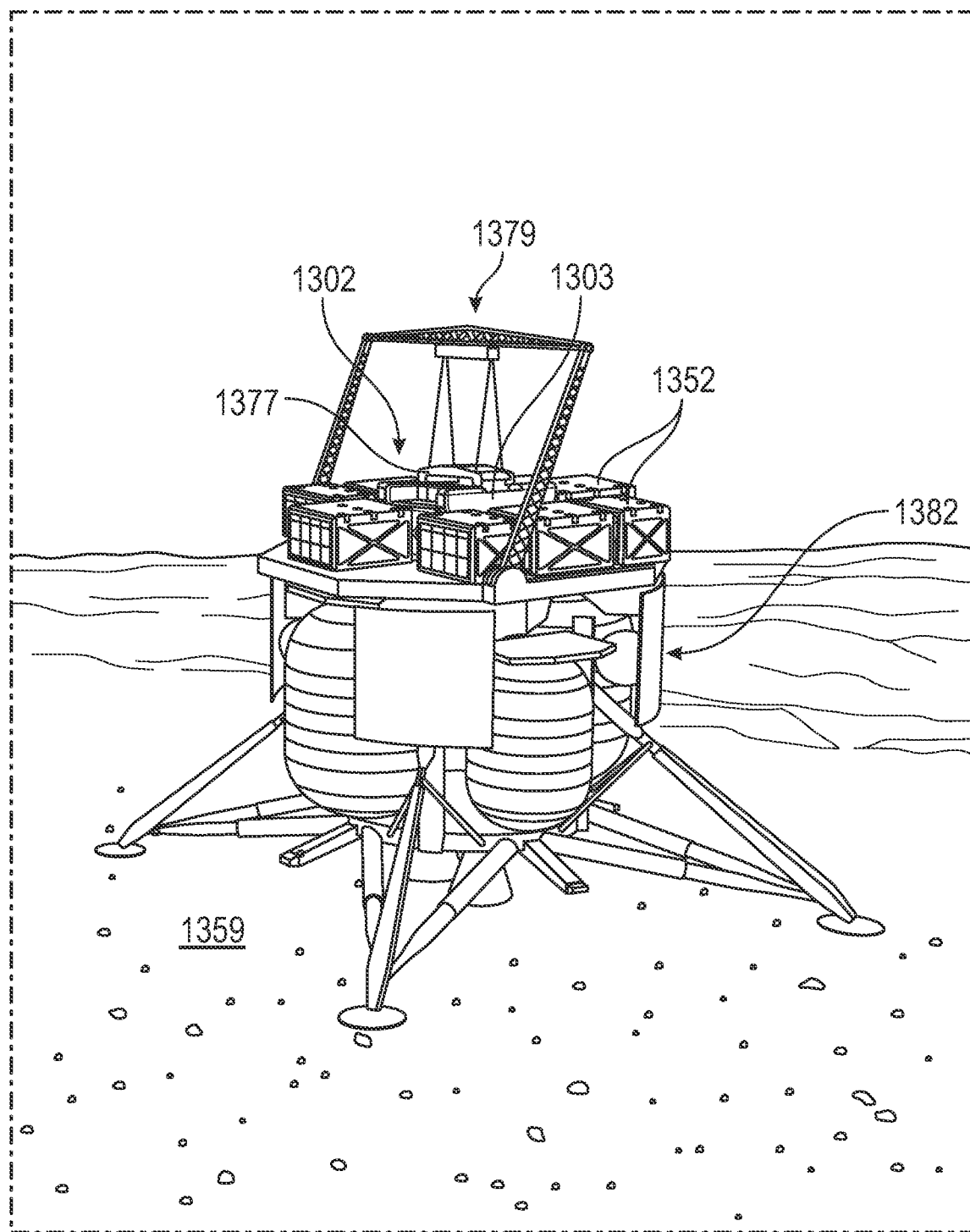
FIGS. 13A-13C illustrate an example of depositing a rover and a respective modular payload onto a surface using an external system according to some embodiments of the disclosure.
Figure 13B:
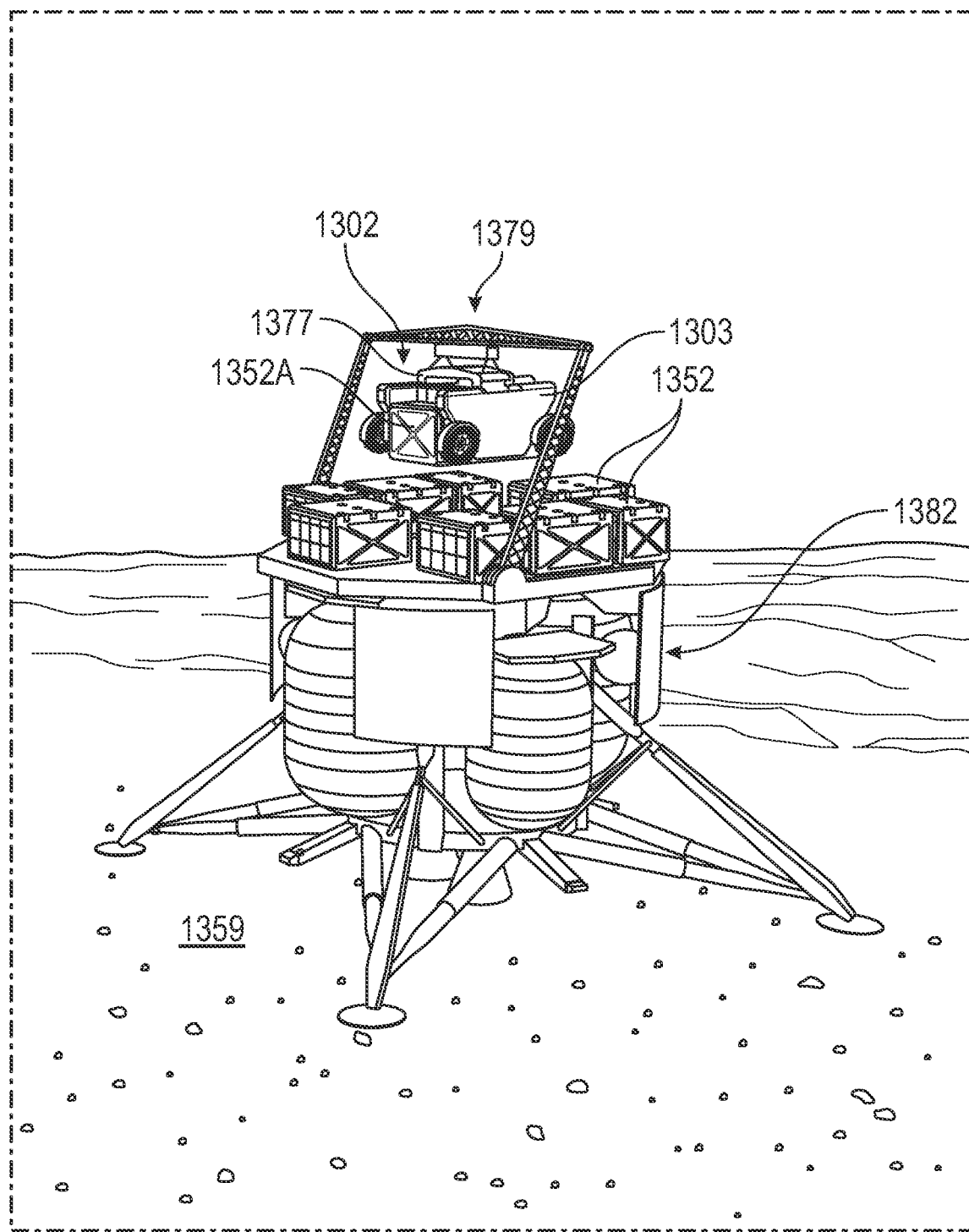
Figure 13C:
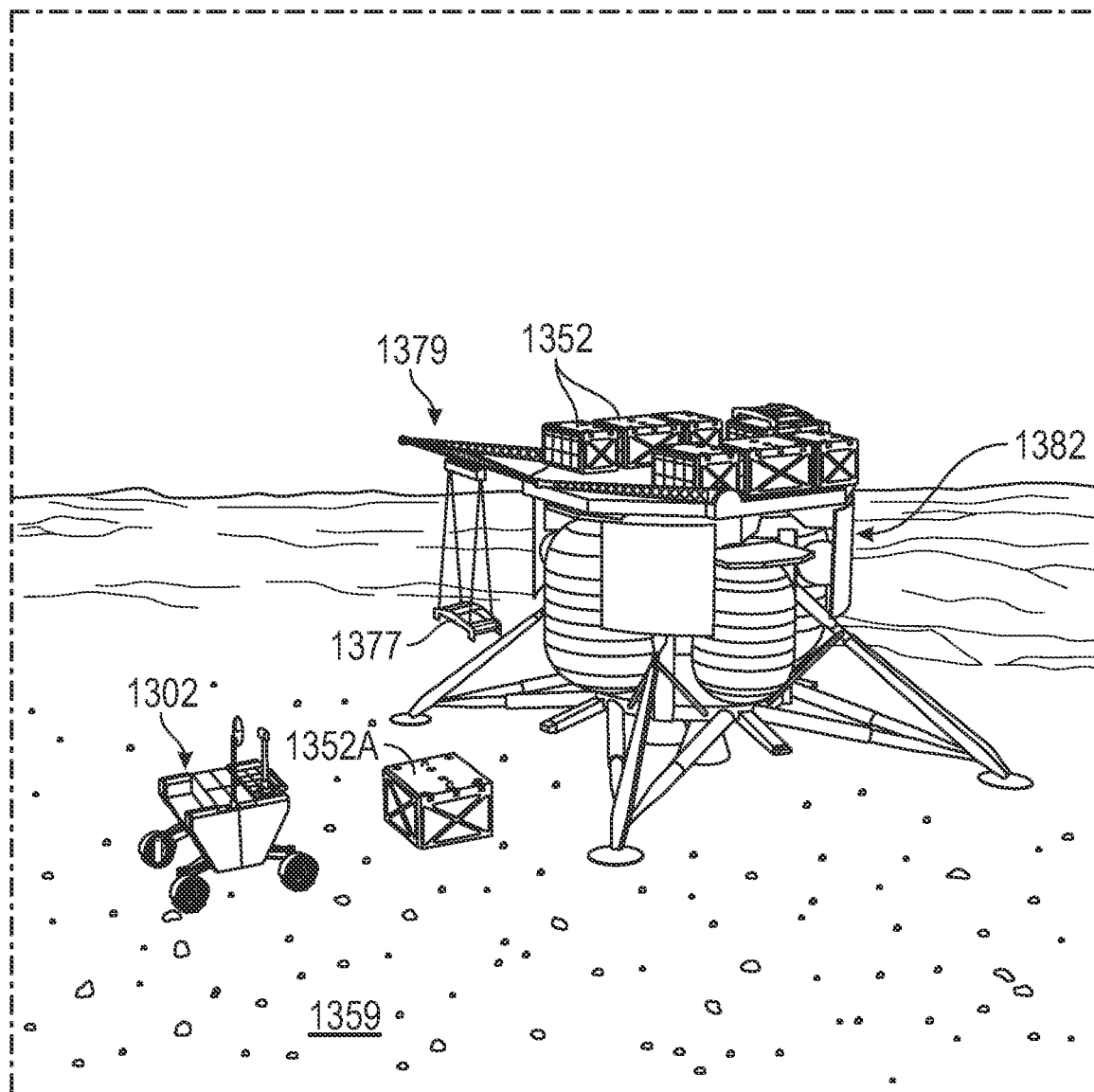

FIGS. 13A-13C illustrate an example of depositing a rover 1302 and a respective modular payload 1352a onto a surface 1359 using an external system 1379 according to some embodiments of the disclosure. In some embodiments, the rover 1302 optionally corresponds to rover 1202, 702, 602, 502, and/or 202 shown in FIG. 12, FIGS. 7A-7E, FIGS. 6A-6B, FIGS. 5A-5H, and/or FIGS. 2A-2B, respectively. In some embodiments, the modular payloads 1352 and 1352a optionally correspond to modular payload 1252, 552, and/or 452 shown in FIG. 12, FIGS. 5A-5H, and/or FIG. 4. As described above with reference to FIG. 12, the rover 1302 may be provided with a chassis locking interface including a plurality of attachment elements (e.g., the second plurality of latch receptacles 1254) configured to be attached to an external system for transporting and/or depositing the rover 1302. As discussed below, in some embodiments, the external system may belong to a carrier configured to deposit the rover 1302 and a plurality of modular payloads 1352 onto the surface 1359.

As an example, as shown in FIG. 13A, the external system may be a crane system 1379 that is attached to a planetary lander (e.g., lunar lander) 1382 on the (e.g., lunar) surface 1359. As shown, the crane system 1379 may include the lifting block 1377 (e.g., corresponding to lifting block 1277 in FIG. 12) configured to engage with the chassis 1303 of the rover 1302. As shown in FIG. 13A, the rover 1302 may be placed on a surface or within an area of the planetary lander 1382 among a plurality of modular payloads 1352. As discussed previously above with reference to FIG. 12, the rover 1302 may be situated on the surface of the planetary lander 1382 in the collapsed state, such that the rover 1302 has a substantially cuboidal shape, allowing the rover 1302 to be modularly loaded amongst the plurality of modular payloads 1352, as shown in FIG. 13A. In the example of FIGS. 13A-13C, the crane system 1379 of the planetary lander 1382 may be operated (e.g., autonomously, externally controlled, manually controlled, etc.) to lift the rover 1302 from amongst the modular payloads 1352 and deposit the rover 1302 onto the surface 1359.

As shown in FIG. 13A, the lifting block 1377 may be lowered (e.g., with respect to the surface 1359, or the top surface of the planetary lander on which the rover 1302 is placed) toward the top surface of the chassis 1303 of the rover 1302 and may attach to the chassis locking interface of the rover 1302. For example, the hooks/appendages of the lifting block 1377 may be engaged with the plurality of latch receptacles (e.g., 1278) of the chassis 1303 of the rover 1302. As shown in FIG. 13B, the lifting block 1377 may be raised (e.g., with respect to the surface 1359, or the top surface of the planetary lander on which the rover 1302 was placed) to lift the rover 1302 from amongst the plurality of modular payloads 1352. As shown, the rover 1302 may be raised/lifted with the lifting block 1377. For example, the lifting block 1377 may lift the rover 1302 with respect to the top surface of the planetary lander 1382 on which the rover 1302 was placed. The lifting block 1377 may then deposit the rover 1302 onto the surface 1359. As discussed above with reference to FIG. 12, in some embodiments, the rover 1302, while in the collapsed state, may be attached to a modular payload. As shown in FIG. 13B, the chassis 1303 of the rover 1302 may be attached to a respective modular payload 1352a. As such, when the lifting block 1377 lifts the rover 1302, the respective modular payload 1352a is also lifted with respect to the top surface of the planetary lander 1382 on which the respective modular payload 1352a was placed. Thus, the rover 1302 and the respective modular payload 1352a may be deposited on the surface 1359 via the lifting block 1377.

As shown in FIG. 13C, the lifting block 1377 may be lowered by the crane system 1379 toward the surface 1359 to deposit the rover 1302 and the modular payload 1352a onto the surface 1359. For example, the lifting block 1377 may be lowered toward the surface 1359 until a bottom surface of the respective modular payload 1352a contacts (e.g., or is lowered within a threshold distance (e.g., 0.5 cm, 1 cm, 1.5 cm, 2 cm, 2.5 cm, 3 cm, etc.) of) the surface 1359. In an instance in which the rover is not powered on (e.g., the rover is in an off state or in a low-power state and/or a sleep state), the power system (e.g., corresponding to power system 108 in FIG. 1A) may be operated (e.g., by the rover ECU and/or via external or manual control) to supply power to the various systems of the rover 1302. For example, the latch system (e.g., corresponding to latch system 506 in FIGS. 5F-5H) of the rover 1302 may be operated (e.g., by the rover ECU) to disengage from the respective modular payload 1352a, thus depositing the respective modular payload 1352a onto the surface 1359, as shown in FIG. 13C. The rover 1302 may then be operated (e.g., by the rover ECU) to raise the chassis 1303 of the rover with respect to the surface 1359, as shown in FIG. 13C, and may then proceed to retrieving a second modular payload or performing another action as instructed by the rover ECU.

It should be understood that the planetary lander 1382 and the crane system 1379 (e.g., including the lifting block 1377) shown in FIGS. 13A-13C are merely examples and that additional and/or alternative carriers and systems may be utilized to transport and/or deposit the rover 1302 and/or the modular payloads 1352.

Therefore, according to the above, some embodiments of the disclosure are directed to a vehicle for retrieval and transportation of a payload. In some embodiments, the vehicle comprises: a chassis configured to receive a respective payload; a plurality of control legs coupled to the chassis including a first control leg and a second control leg, wherein the first control leg and the second control leg each comprises a suspension system and the first control leg and the second control leg are each associated with a motor assembly; a plurality of propulsion components coupled to the plurality of control legs, including a first propulsion component configured to be driven by a motor assembly associated with the first control leg coupled to the first propulsion component, and a second propulsion component configured to be driven by a motor assembly associated with the second control leg coupled to the second propulsion component; and one or more processors in communication with the suspension system and the motor assembly associated with the first control leg and the suspension system and the motor assembly associated with the second control leg. In some embodiments, the one or more processors are programmed to: independently control the motor assembly associated with the first control leg and the motor assembly associated with the second control leg to selectively drive the first propulsion component and the second propulsion component, respectively, to cause a movement of the vehicle; and independently control the suspension system of the first control leg and the suspension system of the second control leg to selectively control the first control leg and the second control leg to lower the chassis with respect to a reference to retrieve the respective payload, and selectively control the first control leg and the second control leg to raise the chassis with respect to the reference to transport the respective payload in accordance with the selective driving of the first propulsion component and the second propulsion component.

Additionally or alternatively, in some embodiments, the reference includes a surface on which the propulsion components are configured to be placed.

Additionally or alternatively, in some embodiments, the one or more processors are further programmed to, in accordance with a determination that the surface includes unevenness relative to the first and second control legs during the selective driving of the first propulsion component and the second propulsion component, independently control the suspension system of the first control leg and the suspension system of the second control leg to, selectively adjust a distance of the first propulsion component with respect to the chassis by a first amount and a distance of the second propulsion component with respect to the chassis by a second amount to adjust a distance between a respective portion of the chassis and the surface, such that the chassis remains within a range of orientations with respect to the surface while at least one of the first propulsion component and the second propulsion component contacts the surface. In some embodiments, the first amount is different from the second amount.

Additionally or alternatively, in some embodiments, the first control leg and the second control leg each comprises: an upper portion integral to a side portion of the chassis, the upper portion including a first coupling and a second coupling; an upper four-bar link coupled to the first coupling and the motor assembly; and a lower four-bar link coupled to the second coupling and the motor assembly.

Additionally or alternatively, in some embodiments, the motor assembly associated with each of the first control leg and the second control leg comprises: a steering actuator coupled to the upper four-bar link, the steering actuator configured to cause a first propulsion-producing movement of the propulsion component coupled to the control leg associated with the steering actuator; and a wheel actuator coupled to the propulsion component coupled to the control leg associated with the wheel actuator, the wheel actuator configured to cause a second propulsion-producing movement, different from the first propulsion-producing movement, of the propulsion component.

Additionally or alternatively, in some embodiments, the suspension system for a given control leg is disposed in the upper portion. In some embodiments, the suspension system comprises: a rocker arm including a rocker angular encoder; a rocker shaft coupled to a first portion of the rocker arm, the rocker shaft including a spring; a linear actuator coupled to a second portion of the rocker arm, the linear actuator including a commutation angular encoder; and a yoke coupling coupled between the first coupling and the linear actuator, the first coupling including a link angular encoder.

Additionally or alternatively, in some embodiments, the one or more processors are programmed to determine a respective angle of the first coupling with respect to the reference using the link angular encoder. In some embodiments, independently controlling the suspension system of the first control leg and the suspension system of the second control leg to selectively control the first control leg and the second control leg to lower the chassis with respect to the reference to retrieve the respective payload comprises controlling the linear actuator to increase a length between the second portion of the rocker and the yoke coupling to increase the respective angle of the first coupling with respect to the reference to lower the upper four-bar link and the lower-four bar link with respect to the reference.

Additionally or alternatively, in some embodiments, independently controlling the suspension system of the first control leg and the suspension system of the second control leg to selectively control the first control leg and the second control leg to raise the chassis with respect to the reference to transport the respective payload in accordance with the selective driving of the first propulsion component and the second propulsion component comprises controlling the linear actuator to decrease a length between the second portion of the rocker and the yoke coupling to decrease the respective angle of the first coupling with respect to the reference to raise the upper four-bar link and the lower-four bar link with respect to the reference.

Additionally or alternatively, in some embodiments, the reference includes a surface on which the propulsion components are configured to be placed. In some embodiments, the one or more processors are programmed to: determine a respective angle of the rocker with respect to the surface using the rocker angular encoder; and independently control the suspension system of the first control leg and the suspension system of the second control leg to control the linear actuator of the first control leg to adjust a length between the second portion of the rocker and the yoke coupling of the first control leg by a first amount to adjust the respective angle of the first coupling of the first control leg with respect to the surface by a first respective amount to adjust a distance between a first portion of the chassis and the surface, and control the linear actuator of the second control leg to adjust a length between the second portion of the rocker and the yoke coupling of the second control leg by a second amount to adjust the respective angle of the first coupling of the second control leg with respect to the surface by a second respective amount to adjust a distance between a second portion of the chassis and the surface, such that the chassis remains within a range of orientations with respect to the surface as at least one of the first propulsion component and the second propulsion component contacts one or more uneven portions of the surface. In some embodiments, the first amount is different from the second amount, and the first respective amount is different from the second respective amount.

Additionally or alternatively, in some embodiments, the chassis comprises: a first side and an opposite second side; and a medial member extending between an upper portion of the first side and an upper portion of the second side, wherein the medial member at least partially forms a top of the chassis. In some embodiments, an interior of the first side and an interior of the second side are configured to surround a first side and a second side of the respective payload, respectively, during the retrieval of the respective payload, and an interior of the medial member is configured to be positioned over a top of the respective payload during the retrieval of the respective payload.

Additionally or alternatively, in some embodiments, the chassis further comprises a latch system. In some embodiments, the latch system comprises: a plurality of hooks configured to selectively protrude from interior portions of the chassis to interlock with a plurality of latch receptacles of the respective payload, the plurality of hooks coupled to a plurality of shafts disposed in the upper portion of each of the first side and the second side; a plurality of connecting devices coupled to the plurality of shafts, the plurality of connecting devices disposed in the medial member; and a plurality of motors associated with and configured to cause rotations of the plurality of connecting devices the plurality of motors disposed in the medial member.

Additionally or alternatively, in some embodiments, the one or more processors are in communication with the latch system. In some embodiments, the one or more processors are further programmed to, in accordance with a determination that the first control leg and the second control leg have been selectively controlled to lower the chassis with respect to the reference, control the plurality of motors to cause rotations of the plurality of connecting devices associated with the plurality of motors in a first direction to cause the plurality of shafts to rotate in a first respective direction to cause the plurality of hooks to protrude from the interior portions of the chassis to engage with the plurality of latch receptacles of the respective payload.

Additionally or alternatively, in some embodiments, the one or more processors are further programmed to control the plurality of motors to cause rotations of the plurality of connecting devices associated with the plurality of motors in a second direction, different from the first direction, to cause the plurality of shafts to rotate in a second respective direction, different from the first respective direction, to cause the plurality of hooks to contract toward the interior portions of the chassis to disengage from the plurality of latch receptacles of the respective payload.

Additionally or alternatively, in some embodiments, the respective payload comprises a first plurality of latch receptacles disposed on a first side of the respective payload and on a second side of the respective payload, opposite the first side. In some embodiments, the chassis comprises a second plurality of latch receptacles disposed on an upper exterior portion of a first side of the chassis and on an upper exterior portion of a second side of the chassis, opposite the first side. In some embodiments, the first side of the chassis corresponds to the first side of the respective payload, and the second side of the chassis corresponds to the second side of the respective payload.

Additionally or alternatively, in some embodiments, the vehicle further comprises a plurality of sensors coupled to the chassis and in communication with the one or more processors. In some embodiments, the one or more processors are further programmed to determine a respective location of the respective payload using the plurality of sensors.

Additionally or alternatively, in some embodiments, the chassis comprises a first side and an opposite second side, and a medial member extending between an upper portion of the first side and an upper portion of the second side, wherein the medial member at least partially forms a top of the chassis. In some embodiments, the vehicle further comprises one or more attachment interfaces disposed along the medial portion of the chassis, the one or more attachment interfaces configured to engage with one or more corresponding interfaces of a modular attachment.

Additionally or alternatively, in some embodiments, the plurality of propulsion components includes a plurality of wheels.

Additionally or alternatively, in some embodiments, the suspension system of each of the first control leg and the second control leg is disposed within a side portion of the chassis. In some embodiments, each of the first control leg and the second control leg comprises a first coupling configured to enable each of the first control leg and the second control leg to be selectively lowered and raised with respect to the reference.

Some embodiments of the disclosure are directed to a non-transitory computer-readable storage medium storing instructions, which when executed by one or more processors of a vehicle, cause the vehicle to perform a method. In some embodiments, the method comprises: independently controlling a motor assembly associated with a first control leg of the vehicle and a motor assembly associated with a second control leg of the vehicle to selectively drive a first propulsion component and a second propulsion component, respectively, to cause a movement of the vehicle; and independently control a suspension system of the first control leg and a suspension system of the second control leg to selectively control the first control leg and the second control leg to lower a chassis of the vehicle with respect to a reference to retrieve a respective payload, and selectively control the first control leg and the second control leg to raise the chassis with respect to the reference to transport the respective payload in accordance with the selective driving of the first propulsion component and the second propulsion component.

Some embodiments of the disclosure are directed to a vehicle, comprising: a chassis configured to attach to a respective payload; a plurality of control legs coupled to the chassis including a first control leg and a second control leg, wherein the first control leg and the second control leg each comprises a suspension system, the suspension system of each of the first control leg and the second control leg configured to cause respective movements of the first control leg and the second control leg to lower the chassis with respect to a reference to retrieve the respective payload, and the first control leg and the second control leg are each associated with a motor assembly; and a plurality of propulsion components coupled to the plurality of control legs, including a first propulsion component configured to be driven by a motor assembly associated with the first control leg coupled to the first propulsion component, and a second propulsion component configured to be driven by a motor assembly associated with the second control leg coupled to the second propulsion component.

Additionally or alternatively, in some embodiments, the motor assembly associated with each of the first control leg and the second control leg comprises: a steering actuator coupled to a given control leg, the steering actuator configured to cause a first propulsion-producing movement of the propulsion component coupled to the control leg coupled to the steering actuator; and a wheel actuator coupled to the propulsion component coupled to the control leg associated with the wheel actuator, the wheel actuator configured to cause a second propulsion-producing movement, different from the first propulsion-producing movement, of the propulsion component.

Additionally or alternatively, in some embodiments, the suspension system for a given control leg comprises: a rocker arm including a rocker angular encoder; a rocker shaft coupled to a first portion of the rocker arm, the rocker shaft including a spring; a linear actuator coupled to a second portion of the rocker arm, the linear actuator including a commutation angular encoder; and a yoke coupling coupled between the first coupling and the linear actuator, the first coupling including a link angular encoder.

Additionally or alternatively, in some embodiments, the chassis further comprises a latch system. In some embodiments, the latch system comprises: a plurality of hooks configured to selectively protrude from interior portions of the chassis to interlock with a plurality of latch receptacles of the respective payload, the plurality of hooks coupled to a plurality of shafts disposed in an upper portion of each of a first side and a second side of the chassis; a plurality of connecting devices coupled to the plurality of shafts, the plurality of connecting devices disposed in a medial member of the chassis; and a plurality of motors associated with and configured to cause rotations of the plurality of connecting devices, the plurality of motors disposed in the medial member.

Some embodiments of the disclosure are directed to a vehicle for retrieval and transportation of a payload. In some embodiments, the vehicle comprises: a chassis configured to receive a respective payload; a plurality of control legs coupled to the chassis including a first control leg and a second control leg, wherein the first control leg and the second control leg each comprises a suspension system, and the first control leg and the second control leg are each associated with a motor assembly; a plurality of propulsion components coupled to the plurality of control legs, including a first propulsion component configured to be driven by a motor assembly associated with the first control leg coupled to the first propulsion component, and a second propulsion component configured to be driven by a motor assembly associated with the second control leg coupled to the second propulsion component; and one or more processors in communication with the suspension system and the motor assembly associated with the first control leg and the suspension system and the motor assembly associated with the second control leg. In some embodiments, the one or more processors are programmed to: independently control the motor assembly associated with the first control leg and the motor assembly associated with the second control leg to selectively drive the first propulsion component and the second propulsion component, respectively, to cause a movement of the vehicle; and independently control the suspension system of the first control leg and the suspension system of the second control leg to selectively control the first control leg and the second control leg to adjust a height of the chassis to be a first height with respect to a reference to retrieve the respective payload, and selectively control the first control leg and the second control leg to adjust the height of the chassis to be a second height, different from the first height, with respect to the reference to transport the respective payload in accordance with the selective driving of the first propulsion component and the second propulsion component.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A vehicle for retrieval and transportation of a payload, the vehicle comprising:
  a chassis configured to receive a respective payload;
  a plurality of control legs coupled to the chassis including a first control leg and a second control leg, wherein:
    the first control leg and the second control leg each comprises a suspension system; and
    the first control leg and the second control leg are each associated with a motor assembly;
  a plurality of propulsion components coupled to the plurality of control legs, including a first propulsion component configured to be driven by a motor assembly associated with the first control leg coupled to the first propulsion component, and a second propulsion component configured to be driven by a motor assembly associated with the second control leg coupled to the second propulsion component; and
  one or more processors in communication with the suspension system and the motor assembly associated with the first control leg and the suspension system and the motor assembly associated with the second control leg, the one or more processors programmed to:
    independently control the motor assembly associated with the first control leg and the motor assembly associated with the second control leg to selectively drive the first propulsion component and the second propulsion component, respectively, to cause a movement of the vehicle; and
    independently control the suspension system of the first control leg and the suspension system of the second control leg to:
      selectively control the first control leg and the second control leg to lower the chassis with respect to a reference to retrieve the respective payload, and
      selectively control the first control leg and the second control leg to raise the chassis with respect to the reference to transport the respective payload in accordance with the selective driving of the first propulsion component and the second propulsion component;
  wherein the first control leg and the second control leg each comprises:
    an upper portion integral to a side portion of the chassis, the upper portion including a first coupling and a second coupling;

an upper four-bar link coupled to the first coupling and the motor assembly; and
a lower four-bar link coupled to the second coupling and the motor assembly.

2. The vehicle of claim 1, wherein the reference includes a surface on which the propulsion components are configured to be placed.

3. The vehicle of claim 2, wherein:
the one or more processors are further programmed to:
in accordance with a determination that the surface includes unevenness relative to the first and second control legs during the selective driving of the first propulsion component and the second propulsion component:
independently control the suspension system of the first control leg and the suspension system of the second control leg to, selectively adjust a distance of the first propulsion component with respect to the chassis by a first amount and a distance of the second propulsion component with respect to the chassis by a second amount to adjust a distance between a respective portion of the chassis and the surface, such that the chassis remains within a range of orientations with respect to the surface while at least one of the first propulsion component and the second propulsion component contacts the surface,
wherein the first amount is different from the second amount.

4. The vehicle of claim 1, wherein the motor assembly associated with each of the first control leg and the second control leg comprises:
a steering actuator coupled to the upper four-bar link, the steering actuator configured to cause a first propulsion-producing movement of the propulsion component coupled to the control leg associated with the steering actuator; and
a wheel actuator coupled to the propulsion component coupled to the control leg associated with the wheel actuator, the wheel actuator configured to cause a second propulsion-producing movement, different from the first propulsion-producing movement, of the propulsion component.

5. The vehicle of claim 1, wherein the suspension system for a given control leg is disposed in the upper portion, the suspension system comprising:
a rocker arm including a rocker angular encoder;
a rocker shaft coupled to a first portion of the rocker arm, the rocker shaft including a spring;
a linear actuator coupled to a second portion of the rocker arm, the linear actuator including a commutation angular encoder; and
a yoke coupling coupled between the first coupling and the linear actuator, the first coupling including a link angular encoder.

6. The vehicle of claim 5, wherein:
the one or more processors are programmed to determine a respective angle of the first coupling with respect to the reference using the link angular encoder; and
independently controlling the suspension system of the first control leg and the suspension system of the second control leg to selectively control the first control leg and the second control leg to lower the chassis with respect to the reference to retrieve the respective payload comprises:
controlling the linear actuator to increase a length between the second portion of the rocker and the yoke coupling to increase the respective angle of the first coupling with respect to the reference to lower the upper four-bar link and the lower-four bar link with respect to the reference.

7. The vehicle of claim 6, wherein:
independently controlling the suspension system of the first control leg and the suspension system of the second control leg to selectively control the first control leg and the second control leg to raise the chassis with respect to the reference to transport the respective payload in accordance with the selective driving of the first propulsion component and the second propulsion component comprises:
controlling the linear actuator to decrease a length between the second portion of the rocker and the yoke coupling to decrease the respective angle of the first coupling with respect to the reference to raise the upper four-bar link and the lower-four bar link with respect to the reference.

8. The vehicle of claim 5, wherein:
the reference includes a surface on which the propulsion components are configured to be placed;
the one or more processors are programmed to:
determine a respective angle of the rocker with respect to the surface using the rocker angular encoder; and
independently control the suspension system of the first control leg and the suspension system of the second control leg to:
control the linear actuator of the first control leg to adjust a length between the second portion of the rocker and the yoke coupling of the first control leg by a first amount to adjust the respective angle of the first coupling of the first control leg with respect to the surface by a first respective amount to adjust a distance between a first portion of the chassis and the surface; and
control the linear actuator of the second control leg to adjust a length between the second portion of the rocker and the yoke coupling of the second control leg by a second amount to adjust the respective angle of the first coupling of the second control leg with respect to the surface by a second respective amount to adjust a distance between a second portion of the chassis and the surface, such that the chassis remains within a range of orientations with respect to the surface as at least one of the first propulsion component and the second propulsion component contacts one or more uneven portions of the surface;
wherein the first amount is different from the second amount, and the first respective amount is different from the second respective amount.

9. The vehicle of claim 1, wherein the chassis comprises:
a first side and an opposite second side; and
a medial member extending between an upper portion of the first side and an upper portion of the second side, wherein the medial member at least partially forms a top of the chassis;
wherein:
an interior of the first side and an interior of the second side are configured to surround a first side and a second side of the respective payload, respectively, during the retrieval of the respective payload, and
an interior of the medial member is configured to be positioned over a top of the respective payload during the retrieval of the respective payload.

10. The vehicle of claim 9, wherein the chassis further comprises a latch system, the latch system comprising:
- a plurality of hooks configured to selectively protrude from interior portions of the chassis to interlock with a plurality of latch receptacles of the respective payload, the plurality of hooks coupled to a plurality of shafts disposed in the upper portion of each of the first side and the second side;
- a plurality of connecting devices coupled to the plurality of shafts, the plurality of connecting devices disposed in the medial member; and
- a plurality of motors associated with and configured to cause rotations of the plurality of connecting devices disposed in the medial member.

11. The vehicle of claim 10, wherein the one or more processors are in communication with the latch system, the one or more processors being further programmed to:
- in accordance with a determination that the first control leg and the second control leg have been selectively controlled to lower the chassis with respect to the reference:
  - control the plurality of motors to cause rotations of the plurality of connecting devices associated with the plurality of motors in a first direction to cause the plurality of shafts to rotate in a first respective direction to cause the plurality of hooks to protrude from the interior portions of the chassis to engage with the plurality of latch receptacles of the respective payload.

12. The vehicle of claim 11, wherein the one or more processors are further programmed to:
- control the plurality of motors to cause rotations of the plurality of connecting devices associated with the plurality of motors in a second direction, different from the first direction, to cause the plurality of shafts to rotate in a second respective direction, different from the first respective direction, to cause the plurality of hooks to contract toward the interior portions of the chassis to disengage from the plurality of latch receptacles of the respective payload.

13. The vehicle of claim 1, wherein:
- the respective payload comprises a first plurality of latch receptacles disposed on a first side of the respective payload and on a second side of the respective payload, opposite the first side;
- the chassis comprises a second plurality of latch receptacles disposed on an upper exterior portion of a first side of the chassis and on an upper exterior portion of a second side of the chassis, opposite the first side; and
- the first side of the chassis corresponds to the first side of the respective payload, and the second side of the chassis corresponds to the second side of the respective payload.

14. The vehicle of claim 1, further comprising:
- a plurality of sensors coupled to the chassis and in communication with the one or more processors;
- wherein the one or more processors are further programmed to determine a respective location of the respective payload using the plurality of sensors.

15. The vehicle of claim 1, wherein the chassis comprises a first side and an opposite second side, and a medial member extending between an upper portion of the first side and an upper portion of the second side, wherein the medial member at least partially forms a top of the chassis, the vehicle further comprising:
- one or more attachment interfaces disposed along the medial portion of the chassis, the one or more attachment interfaces configured to engage with one or more corresponding interfaces of a modular attachment.

16. The vehicle of claim 1, wherein the plurality of propulsion components includes a plurality of wheels.

17. The vehicle of claim 1, wherein:
- the suspension system of each of the first control leg and the second control leg is disposed within the side portion of the chassis; and
- the first coupling is configured to enable each of the first control leg and the second control leg to be selectively lowered and raised with respect to the reference.

18. A vehicle comprising:
- a chassis configured to attach to a respective payload;
- a plurality of control legs coupled to the chassis including a first control leg and a second control leg, wherein:
  - the first control leg and the second control leg each comprises a suspension system, the suspension system of each of the first control leg and the second control leg configured to cause respective movements of the first control leg and the second control leg to lower the chassis with respect to a reference to retrieve the respective payload; and
  - the first control leg and the second control leg are each associated with a motor assembly; and
- a plurality of propulsion components coupled to the plurality of control legs, including a first propulsion component configured to be driven by a motor assembly associated with the first control leg coupled to the first propulsion component, and a second propulsion component configured to be driven by a motor assembly associated with the second control leg coupled to the second propulsion component;
- wherein the suspension system for a given control leg comprises:
  - a rocker arm including a rocker angular encoder;
  - a rocker shaft coupled to a first portion of the rocker arm, the rocker shaft including a spring;
  - a linear actuator coupled to a second portion of the rocker arm, the linear actuator including a commutation angular encoder; and
  - a yoke coupling coupled between a first coupling disposed in the control leg and the linear actuator, the first coupling including a link angular encoder.

19. The vehicle of claim 18, wherein the motor assembly associated with each of the first control leg and the second control leg comprises:
- a steering actuator coupled to a given control leg, the steering actuator configured to cause a first propulsion-producing movement of the propulsion component coupled to the control leg coupled to the steering actuator; and
- a wheel actuator coupled to the propulsion component coupled to the control leg associated with the wheel actuator, the wheel actuator configured to cause a second propulsion-producing movement, different from the first propulsion-producing movement, of the propulsion component.

20. The vehicle of claim 18, wherein the chassis further comprises a latch system, the latch system comprising:
- a plurality of hooks configured to selectively protrude from interior portions of the chassis to interlock with a plurality of latch receptacles of the respective payload, the plurality of hooks coupled to a plurality of shafts disposed in an upper portion of each of a first side and a second side of the chassis;

a plurality of connecting devices coupled to the plurality of shafts, the plurality of connecting devices disposed in a medial member of the chassis; and a plurality of motors associated with and configured to cause rotations of the plurality of connecting devices, the plurality of motors disposed in the medial member.

21. A vehicle for retrieval and transportation of a payload, the vehicle comprising:

a chassis configured to receive a respective payload;

a plurality of control legs coupled to the chassis including a first control leg and a second control leg, wherein:
the first control leg and the second control leg each comprises a suspension system; and
the first control leg and the second control leg are each associated with a motor assembly;

a plurality of propulsion components coupled to the plurality of control legs, including a first propulsion component configured to be driven by a motor assembly associated with the first control leg coupled to the first propulsion component, and a second propulsion component configured to be driven by a motor assembly associated with the second control leg coupled to the second propulsion component; and one or more processors in communication with the suspension system and the motor assembly associated with the first control leg and the suspension system and the motor assembly associated with the second control leg, the one or more processors programmed to:
independently control the motor assembly associated with the first control leg and the motor assembly associated with the second control leg to selectively drive the first propulsion component and the second propulsion component, respectively, to cause a movement of the vehicle; and
independently control the suspension system of the first control leg and the suspension system of the second control leg to:
selectively control the first control leg and the second control leg to lower the chassis with respect to a reference to retrieve the respective payload, and
selectively control the first control leg and the second control leg to raise the chassis with respect to the reference to transport the respective payload in accordance with the selective driving of the first propulsion component and the second propulsion component, wherein the respective payload comprises a first plurality of latch receptacles disposed on a first side of the respective payload and on a second side of the respective payload, opposite the first side;

wherein the chassis comprises a second plurality of latch receptacles disposed on an upper exterior portion of a first side of the chassis and on an upper exterior portion of a second side of the chassis, opposite the first side; and wherein the first side of the chassis corresponds to the first side of the respective payload, and the second side of the chassis corresponds to the second side of the respective payload.

22. The vehicle of claim 21, further comprising:
a plurality of sensors coupled to the chassis and in communication with the one or more processors;
wherein the one or more processors are further programmed to determine a respective location of the respective payload using the plurality of sensors.

23. A vehicle comprising:
a chassis configured to attach to a respective payload;
a plurality of control legs coupled to the chassis including a first control leg and a second control leg, wherein:
the first control leg and the second control leg each comprises a suspension system, the suspension system of each of the first control leg and the second control leg configured to cause respective movements of the first control leg and the second control leg to lower the chassis with respect to a reference to retrieve the respective payload; and
the first control leg and the second control leg are each associated with a motor assembly;
a plurality of propulsion components coupled to the plurality of control legs, including a first propulsion component configured to be driven by a motor assembly associated with the first control leg coupled to the first propulsion component, and a second propulsion component configured to be driven by a motor assembly associated with the second control leg coupled to the second propulsion component; and
wherein the chassis further comprises a latch system, the latch system comprising:
a plurality of hooks configured to selectively protrude from interior portions of the chassis to interlock with a plurality of latch receptacles of the respective payload, the plurality of hooks coupled to a plurality of shafts disposed in an upper portion of each of a first side and a second side of the chassis;
a plurality of connecting devices coupled to the plurality of shafts, the plurality of connecting devices disposed in a medial member of the chassis; and
a plurality of motors associated with and configured to cause rotations of the plurality of connecting devices, the plurality of motors disposed in the medial member.

24. The vehicle of claim 23, wherein the motor assembly associated with each of the first control leg and the second control leg comprises:
a steering actuator coupled to a given control leg, the steering actuator configured to cause a first propulsion-producing movement of the propulsion component coupled to the control leg coupled to the steering actuator; and
a wheel actuator coupled to the propulsion component coupled to the control leg associated with the wheel actuator, the wheel actuator configured to cause a second propulsion-producing movement, different from the first propulsion-producing movement, of the propulsion component.

* * * * *